(12) United States Patent
Stettenheim et al.

(10) Patent No.: US 9,297,554 B2
(45) Date of Patent: Mar. 29, 2016

(54) CAVITY RECEIVERS FOR PARABOLIC SOLAR TROUGHS

(71) Applicants: Joel Stettenheim, Norwich, VT (US);
Troy O. McBride, Norwich, VT (US);
Oliver J. Brambles, Norwich, VT (US)

(72) Inventors: Joel Stettenheim, Norwich, VT (US);
Troy O. McBride, Norwich, VT (US);
Oliver J. Brambles, Norwich, VT (US)

(73) Assignee: NORWICH TECHNOLOGIES, INC., White River Junction, VT (US)

( * ) Notice: Subject to any disclaimer, the term of this patent is extended or adjusted under 35 U.S.C. 154(b) by 544 days.

(21) Appl. No.: 13/736,043

(22) Filed: Jan. 7, 2013

(65) Prior Publication Data
US 2013/0213387 A1   Aug. 22, 2013

Related U.S. Application Data

(60) Provisional application No. 61/583,585, filed on Jan. 5, 2012.

(51) Int. Cl.

| | | |
|---|---|---|
| *F24J 2/24* | (2006.01) | |
| *F24J 2/05* | (2006.01) | |
| *F03G 6/06* | (2006.01) | |
| *F24J 2/54* | (2006.01) | |
| *F24J 2/26* | (2006.01) | |
| *F24J 2/12* | (2006.01) | |
| *F24J 2/04* | (2006.01) | |
| *F24J 2/07* | (2006.01) | |
| *F24J 2/10* | (2006.01) | |
| *F24J 2/14* | (2006.01) | |
| *F24J 2/48* | (2006.01) | |
| *F24J 2/50* | (2006.01) | |
| *F24J 2/08* | (2006.01) | |
| *F24J 2/46* | (2006.01) | |

(52) U.S. Cl.
CPC . *F24J 2/055* (2013.01); *F03G 6/06* (2013.01); *F24J 2/0488* (2013.01); *F24J 2/05* (2013.01); *F24J 2/07* (2013.01); *F24J 2/1047* (2013.01); *F24J 2/12* (2013.01); *F24J 2/14* (2013.01); *F24J 2/24* (2013.01); *F24J 2/26* (2013.01); *F24J 2/485* (2013.01); *F24J 2/50* (2013.01); *F24J 2/54* (2013.01); *F24J 2/08* (2013.01); *F24J 2/4609* (2013.01); *F24J 2/541* (2013.01); *F24J 2002/508* (2013.01); *Y02E 10/41* (2013.01); *Y02E 10/44* (2013.01); *Y02E 10/45* (2013.01); *Y02E 10/46* (2013.01)

(58) Field of Classification Search
CPC .............. F24J 2/0488; F24J 2/055; F24J 2/05
USPC .................................. 126/654, 653, 651, 652
See application file for complete search history.

(56) References Cited

U.S. PATENT DOCUMENTS

| | | | | |
|---|---|---|---|---|
| 4,033,118 A | * | 7/1977 | Powell | 60/641.15 |
| 4,047,517 A | * | 9/1977 | Arnberg | 126/679 |
| 4,628,905 A | * | 12/1986 | Mills | 126/652 |
| 2010/0035081 A1 | * | 2/2010 | Clasen et al. | 428/650 |

* cited by examiner

*Primary Examiner* — Avinash Savani
(74) *Attorney, Agent, or Firm* — Milstein Zhang & Wu LLC; Joseph B. Milstein

(57) ABSTRACT

A tubular heat-absorbing element partly enclosed in an insulating layer or jacket, has absorbing surface that is accessible to solar radiation. The thermal insulation is designed to provide entry to solar radiation by way of a cavity. The absorbing surface can be substantially planar.

17 Claims, 47 Drawing Sheets

Side view

Cross-sectional view

Prior Art

FIG. 5A
PLOT 5A
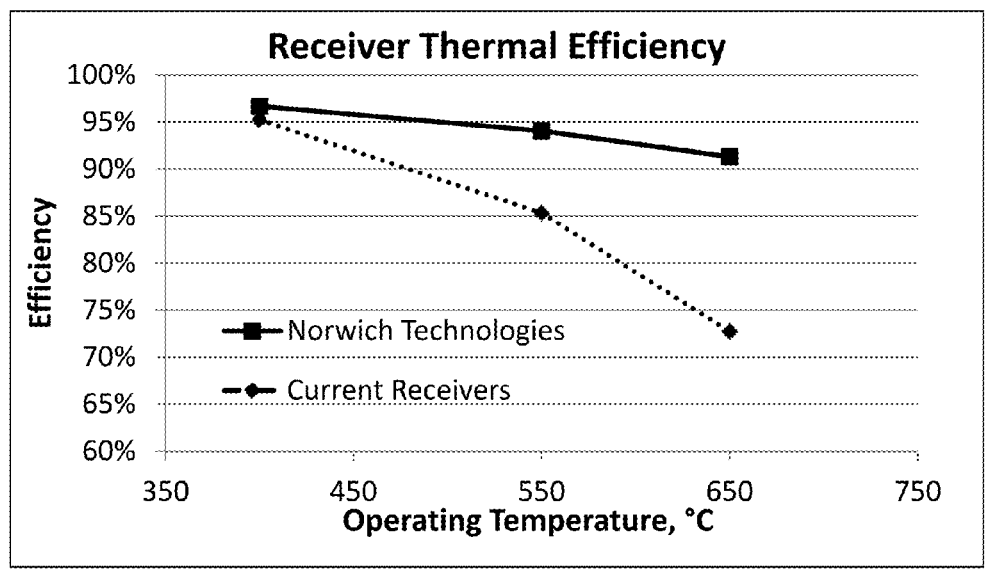
PLOT 5B
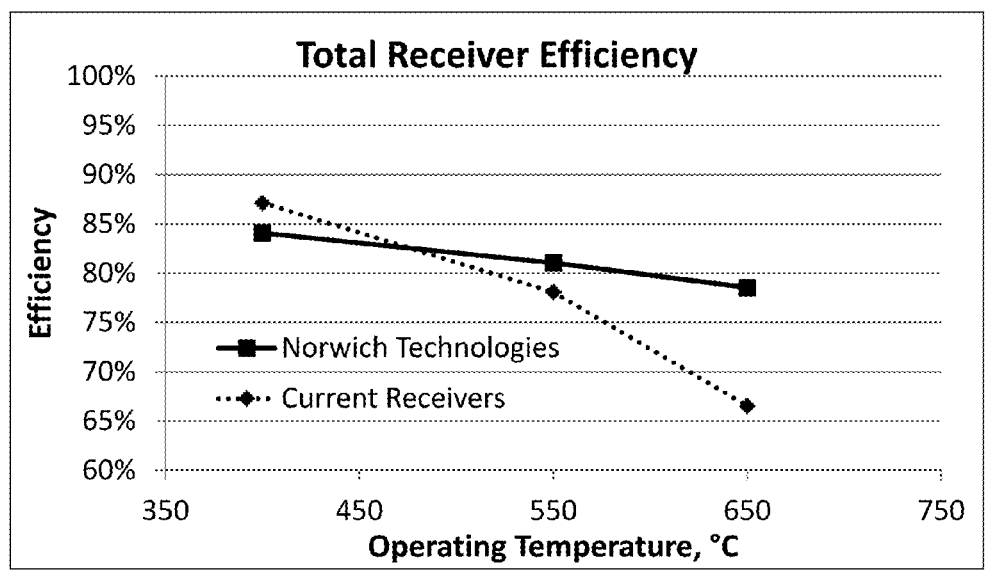

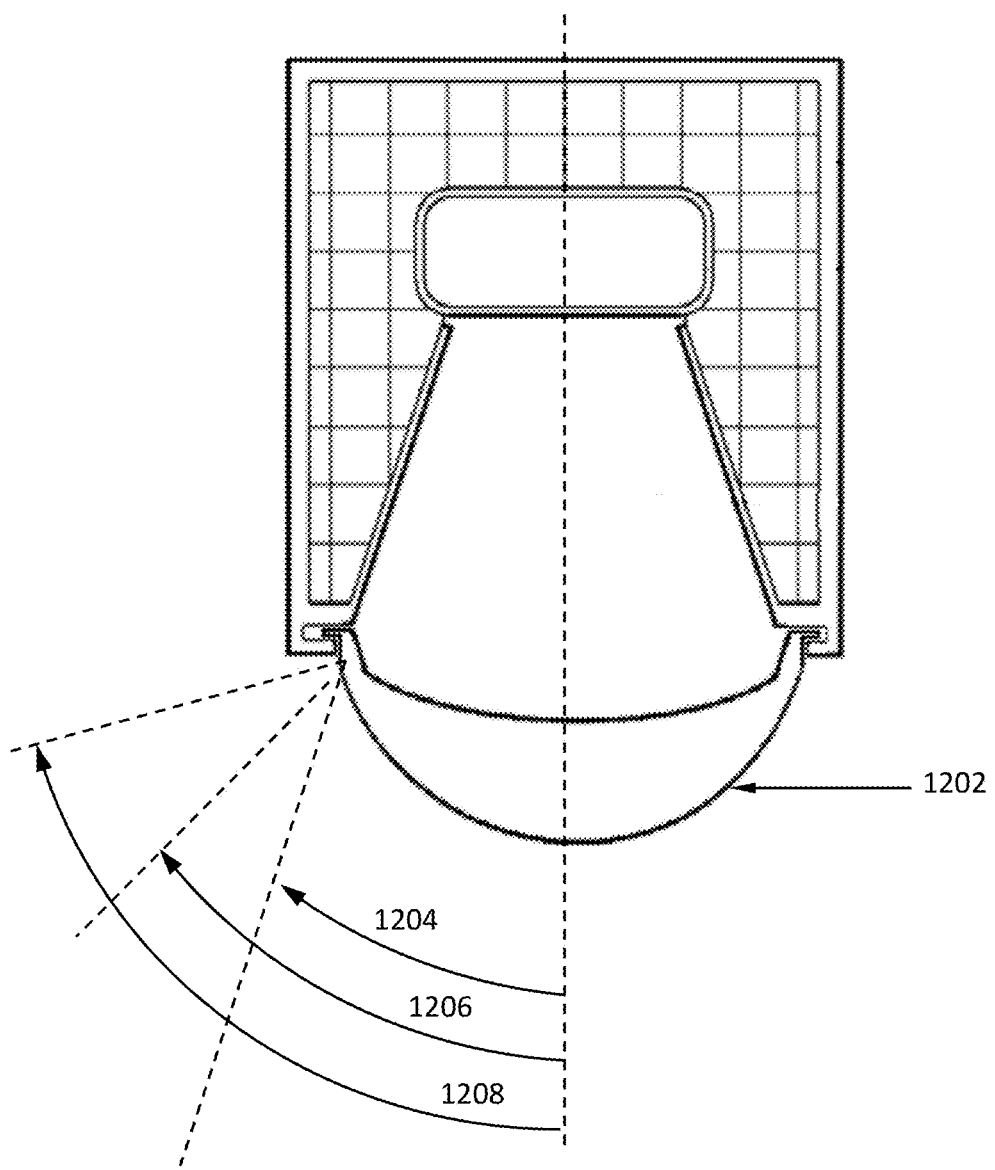

FIG. 13A            FIG. 13B            FIG. 13C
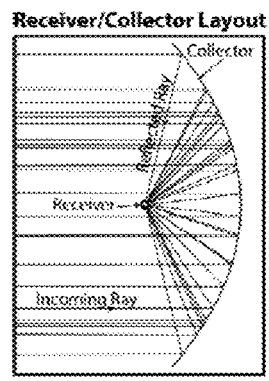
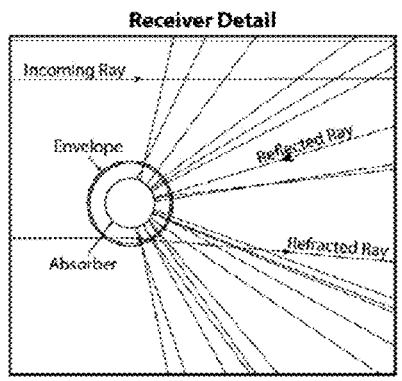
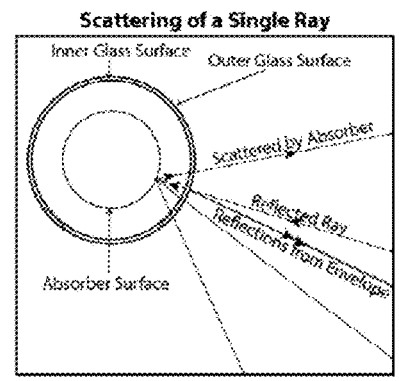
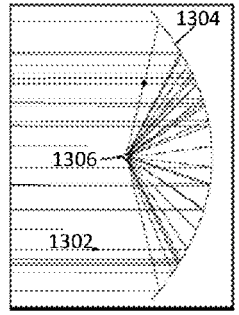
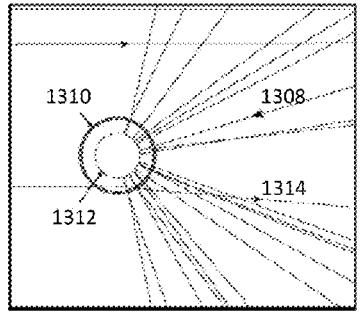
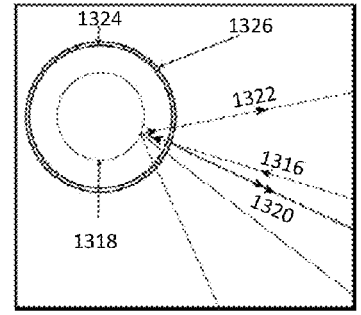
FIG. 13D            FIG. 13E            FIG. 13F Without Glass Covering With Glass Covering Without Glass
FIG. 19A1
100% Reflectivity
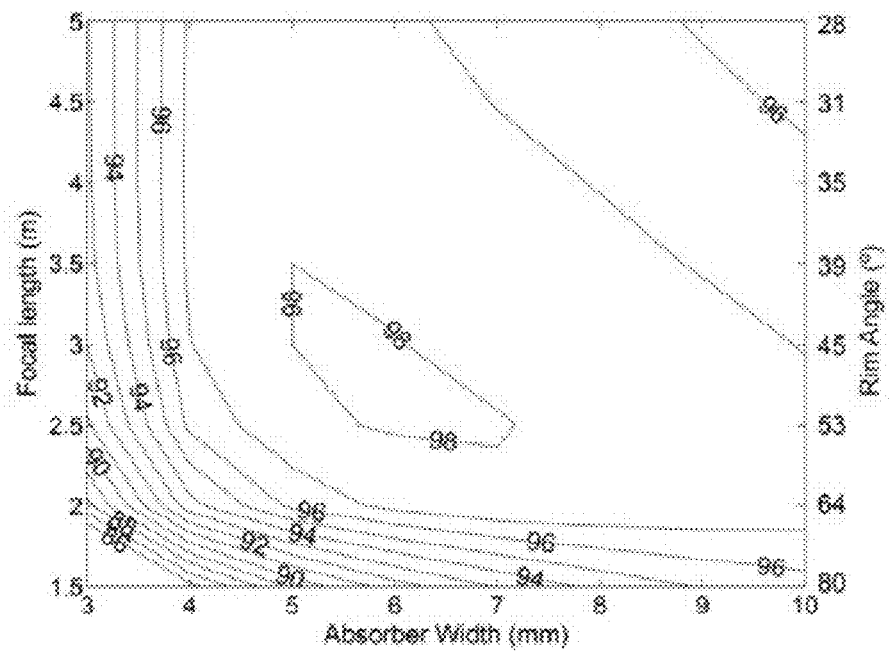
FIG. 19A2
95% Reflectivity
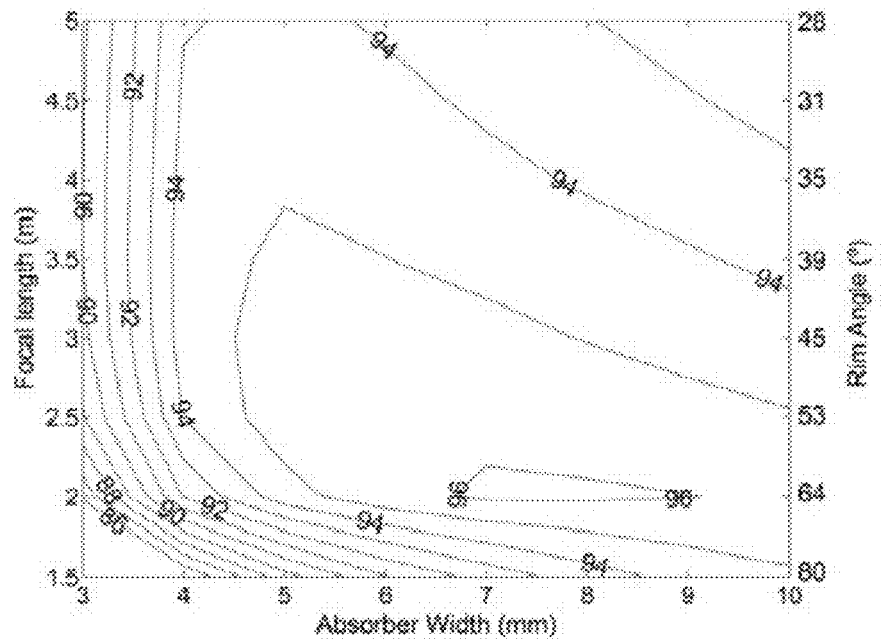

With Glass
FIG. 19B1
100% Reflectivity
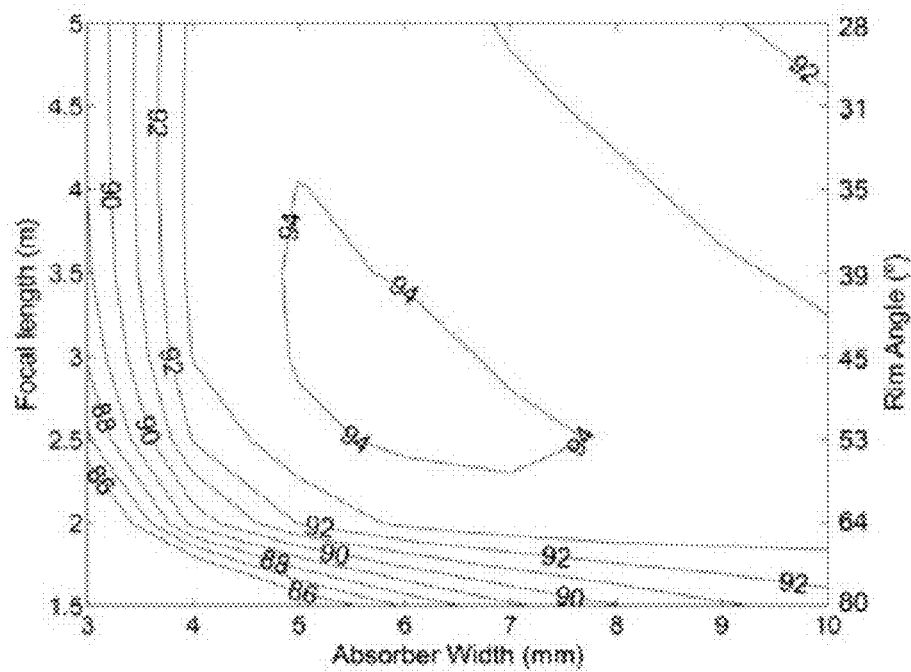
FIG. 19B2
95% Reflectivity
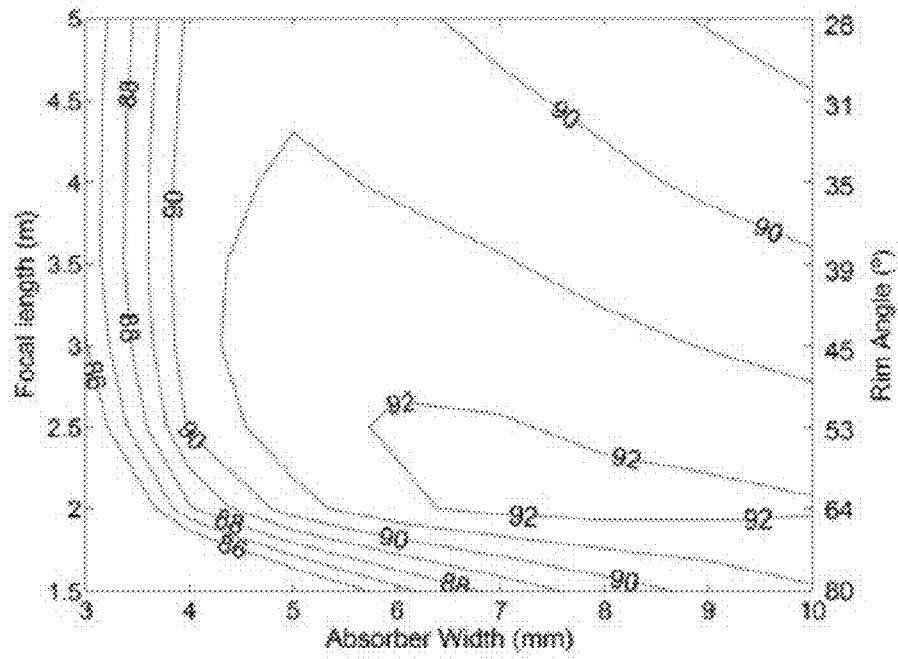

FIG. 22A1 　　　　　　　　FIG. 22A2
Contours of Constant Temperature
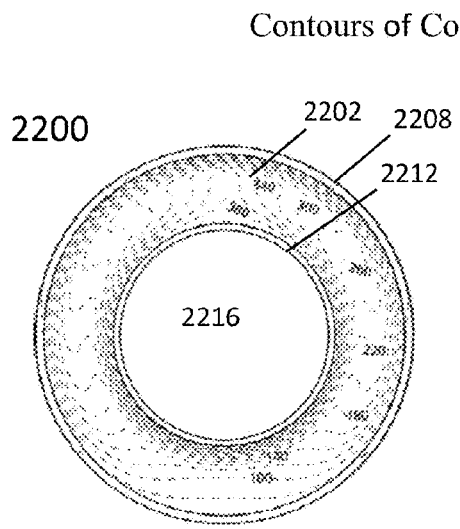
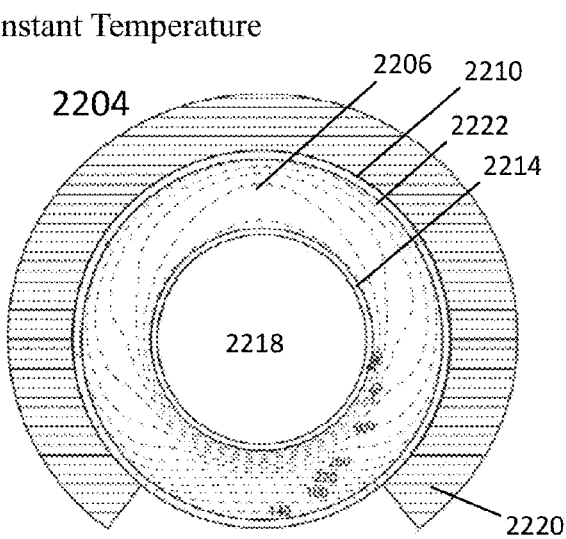
FIG. 22A3　　Velocity Vectors　　FIG. 22A4
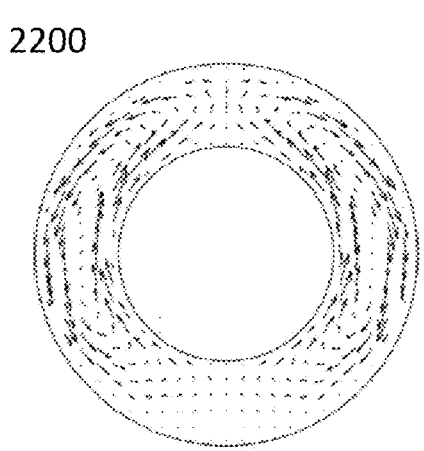
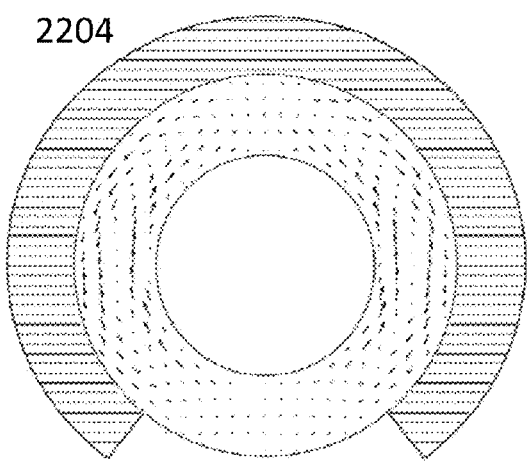

FIG. 22B1
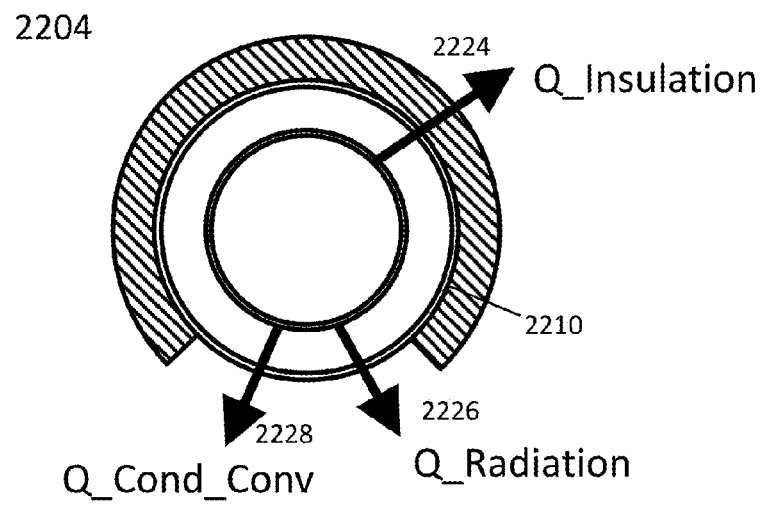
FIG. 22B2
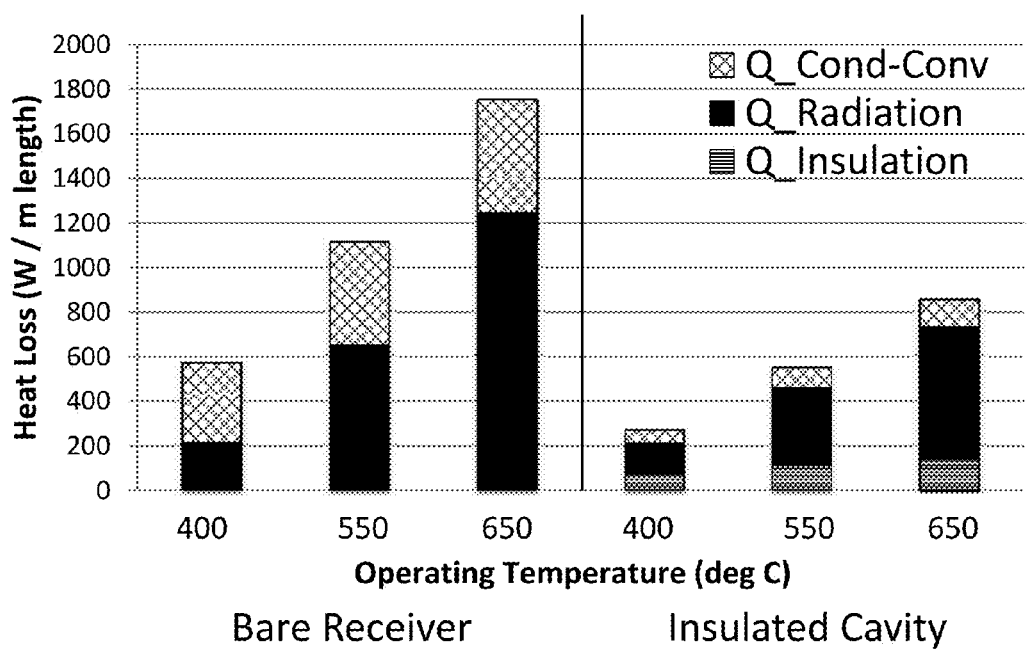

Dividers    FIG. 23A
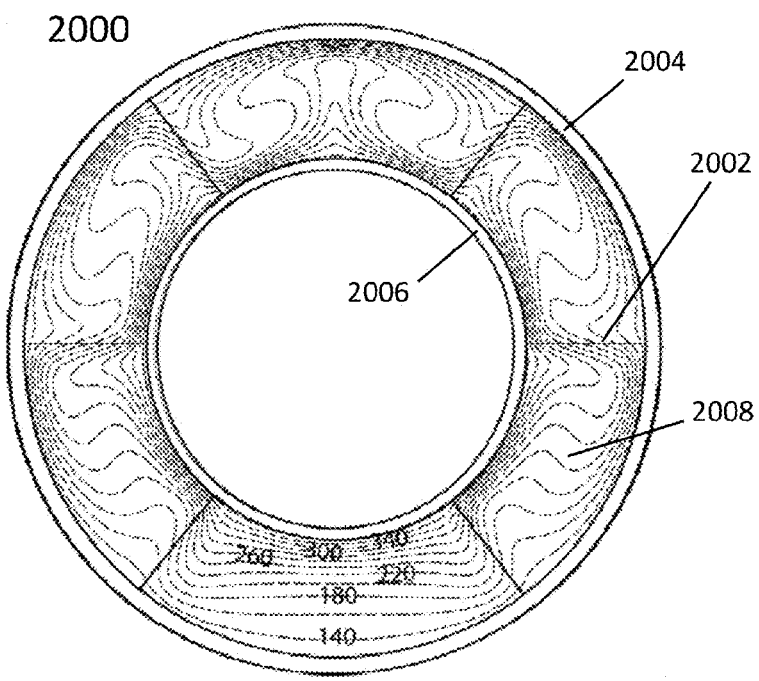
FIG. 23B
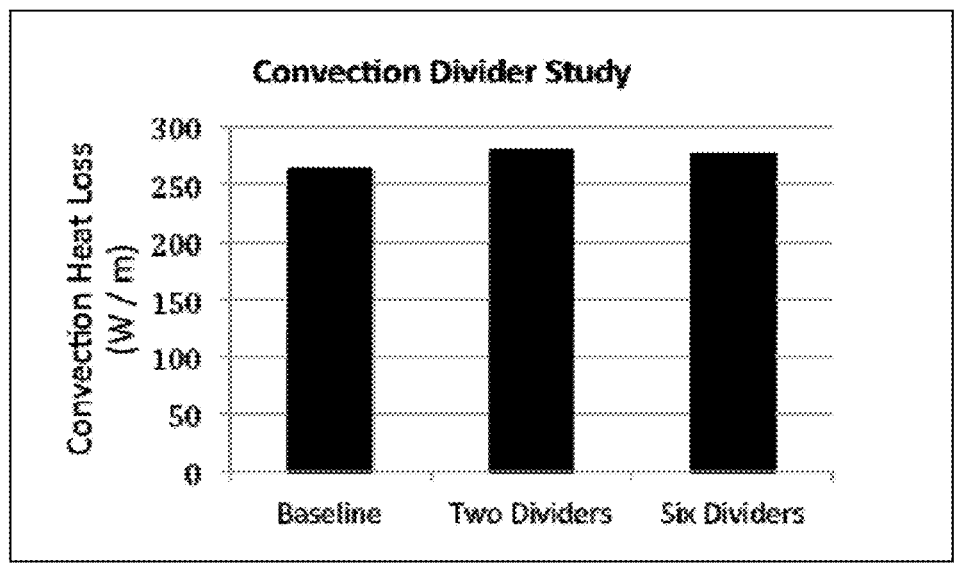
400 deg C Operating Temperature

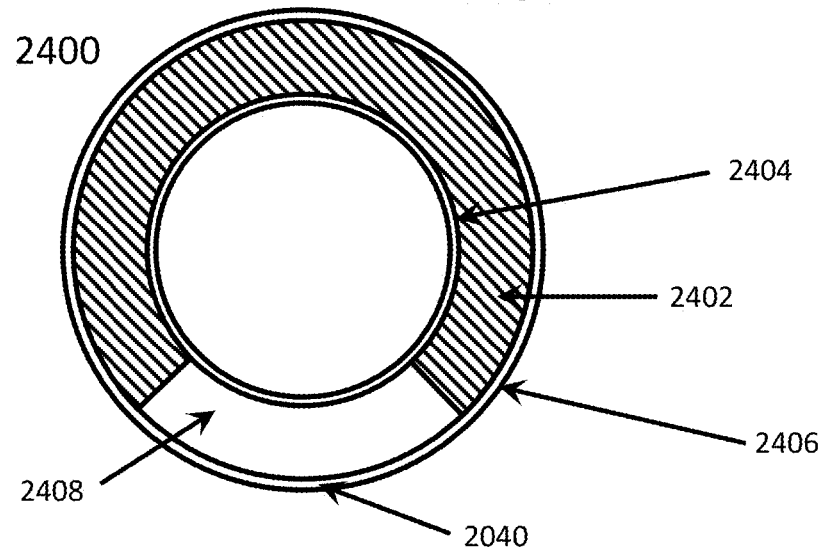
FIG. 24A1
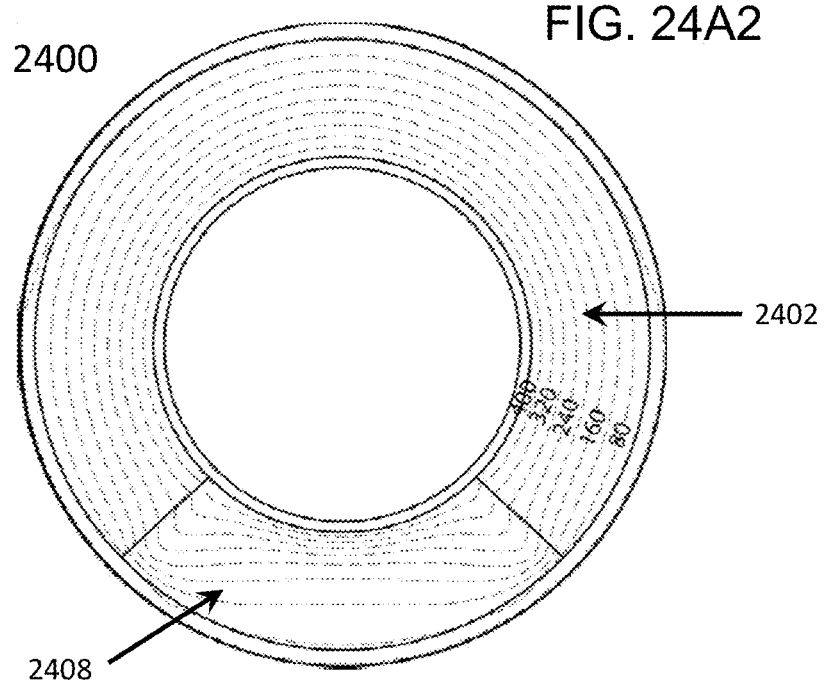
FIG. 24A2

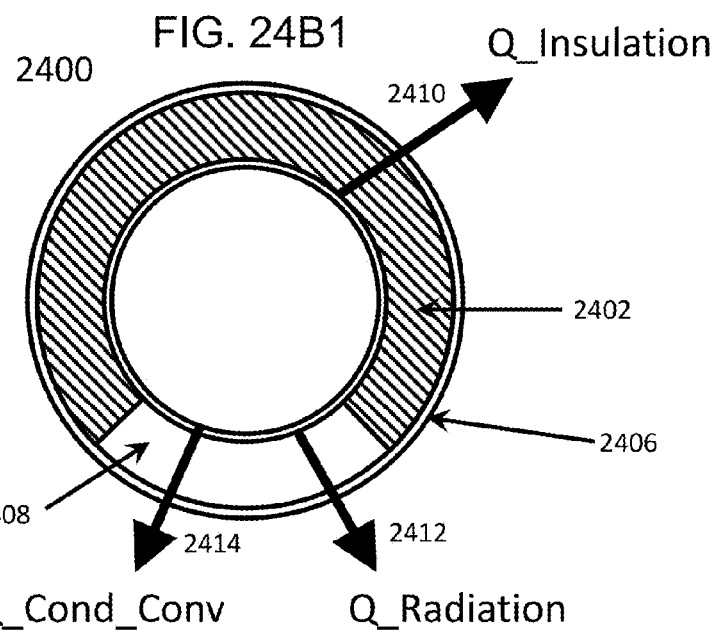
FIG. 24B1
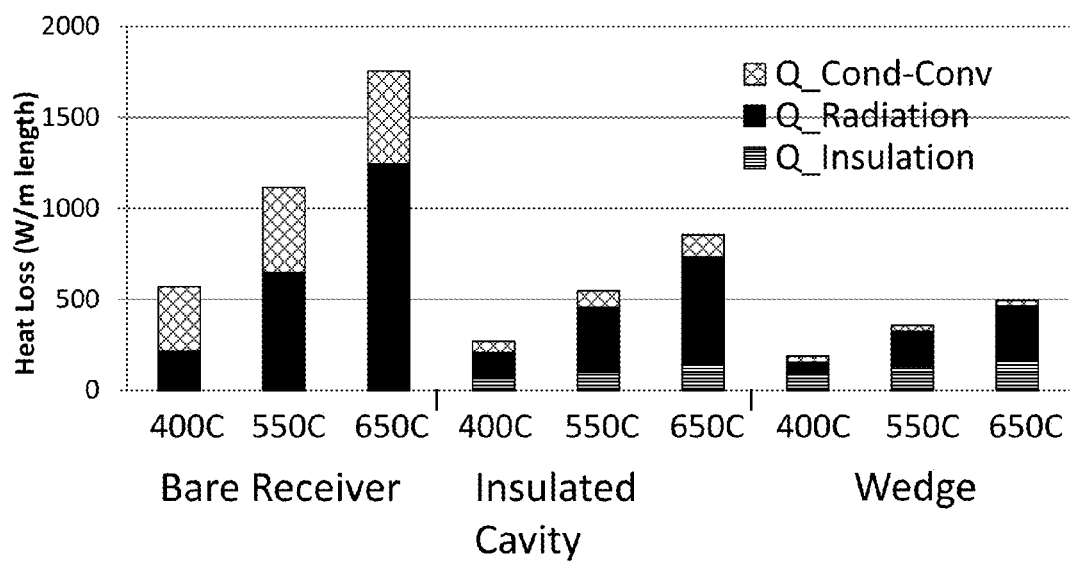
FIG. 24B2

- Convective losses increase at larger tilt angle.
- Heat loss increased ~17 % at 80º at 650C Operating Temperature.

FIG. 25C
0° Tilt (2520)
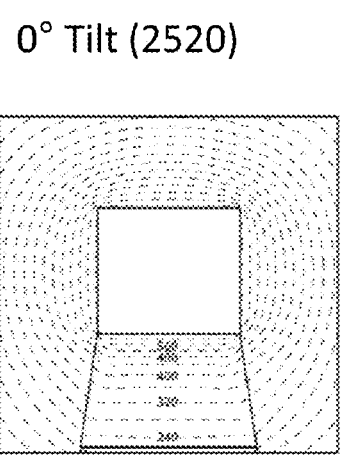
40° Tilt (2522)
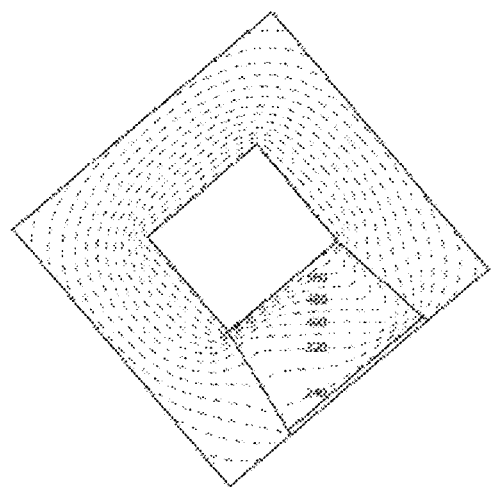
80° Tilt (2524)
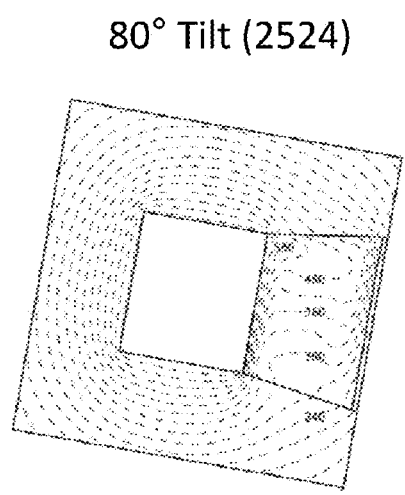

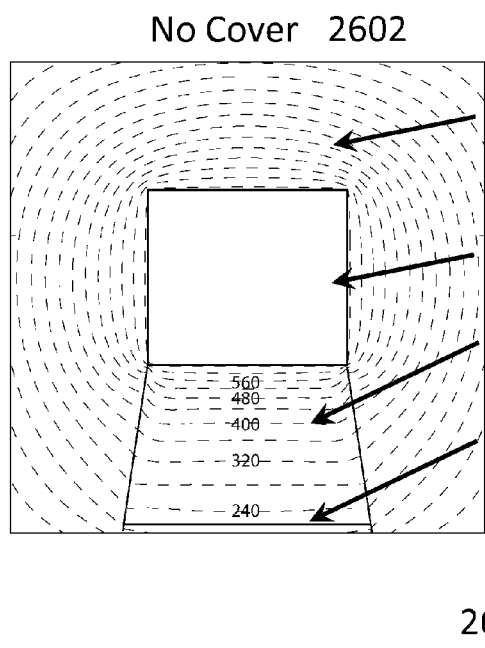
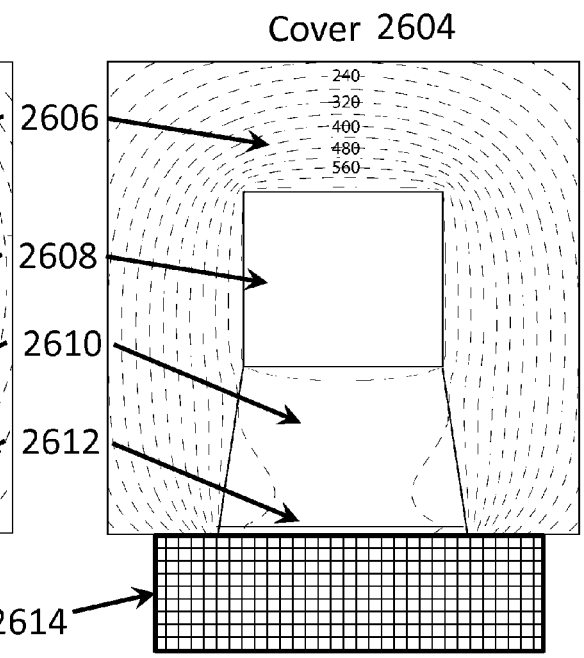
FIG. 26A
No Cover 2602
FIG. 26B
Cover 2604

FIG. 27
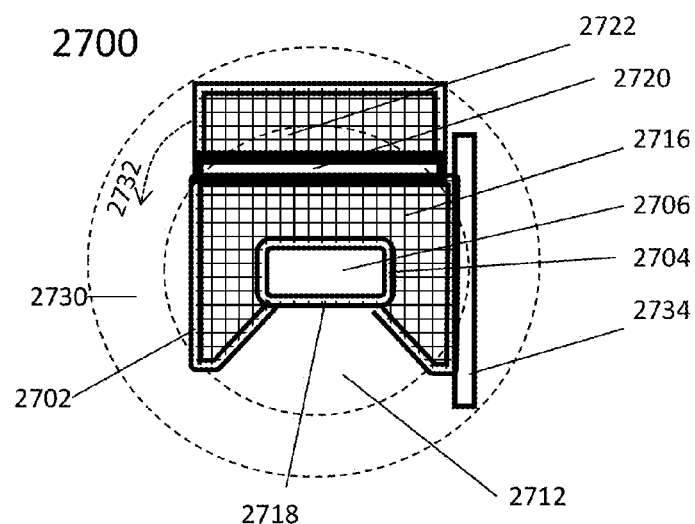
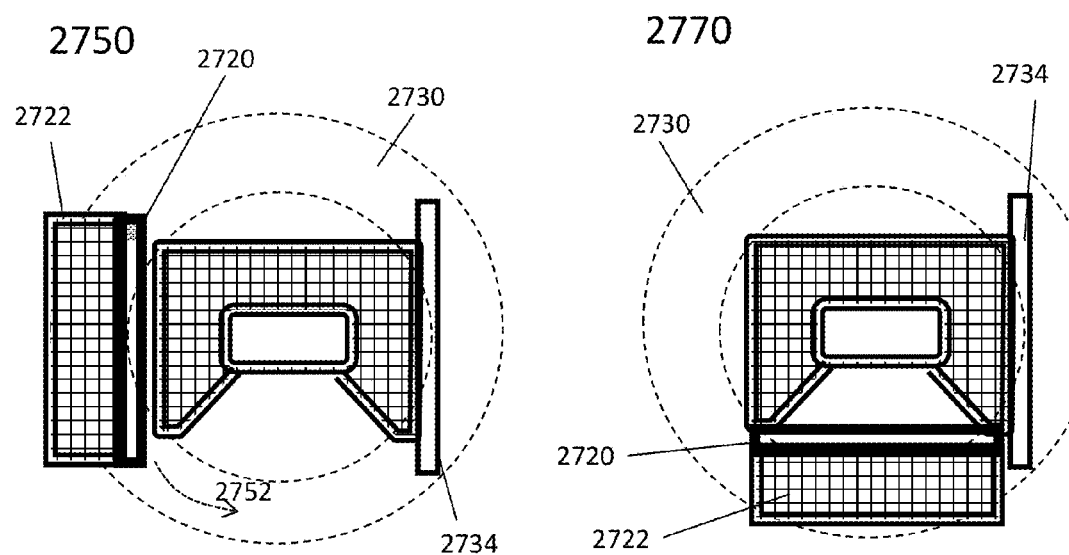

FIG. 29

| Glass Cover? | Wind Direction | Wind Speed (m/s) | Cavity Condition | Heat Loss (W/m) |
|---|---|---|---|---|
| Yes | N/A | N/A | Air at 1atm Natural Convection | 342 |
| Yes | N/A | N/A | Vacuum | 293 |
| No | Horizontal | 2.2 | Open | 450-580 |
| No | 15° upward | 2.2 | Open | 380-450 |
| No | 30° upward | 2.2 | Open | 605-615 |
| No | 15° down | 2.2 | Open | 385-430 |

3402

3404
3406
3408

3422

3424 [Ni nanochains]

3426
3428

CAVITY RECEIVERS FOR PARABOLIC SOLAR TROUGHS

CROSS-REFERENCE TO RELATED APPLICATIONS

This application claims priority to and the benefit of U.S. provisional patent application Ser. No. 61/583,585, filed Jan. 5, 2012, which application is incorporated herein by reference in its entirety.

STATEMENT REGARDING FEDERALLY FUNDED RESEARCH OR DEVELOPMENT

This invention was made with government support under DE-EE0005803 awarded by the DOE. The government has certain rights in the invention.

FIELD OF THE INVENTION

The invention relates to concentrating solar power in general and particularly to a system that employs reflective troughs to focus solar radiation upon a linear receiver.

BACKGROUND OF THE INVENTION

Solar parabolic troughs, which focus sunlight on tubes carrying a fluid that conveys heat for steam generation (e.g. to a steam-driven electric generator, or for industrial process heat) or to a body of material for energy storage, are a proven, reliable, and relatively low-cost technology for collecting energy. The tubes upon which the light is focused in such systems are typically termed "receiver tubes," "receivers," or "heat collection elements." At a typical electric generation plant employing solar parabolic troughs, many receivers (e.g., thousands) are arrayed with reflective troughs in parallel rows to form a "field" that can collect sufficient energy for a generating system of economical size. At present, receivers represent approximately 12% of the capital cost of a concentrating solar power installation employing solar parabolic troughs.

In a typical receiver constructed according to the prior art, a central liquid-carrying tube with an outer optical absorption coating is surrounded by a vacuum held within a transparent concentric envelope. Light focused on the receiver by a mirror (also known as a "collector") passes through the transparent concentric envelope and through the vacuum and impinges on the central liquid-carrying tube. The coating on the central tube absorbs most (preferably all, although this cannot be realized in practice) of the energy incident upon it and is thus heated. This heat is transmitted by conduction through the wall of the central tube and thence to the tube's liquid contents. The heated liquid is pumped through the receiver and, in general, through additional receivers, being thus raised to a high temperature (e.g., 400° C.) before being pumped to a boiler, or energy storage device (e.g., reservoir of hot fluid). The function of the vacuum between the inner, fluid-carrying tube and the outer, transparent envelope is to prevent loss of heat from the receiver by convection and conduction to the outer envelope and thence, by radiation and conduction, to the environment.

A number of problems in the use of standard vacuum-containing receiver tubes have been observed. These include, but are not limited to, the following: (a) The absorption coatings on the inner, fluid-carrying tube are expensive to manufacture. (b) Degradation of a receiver's vacuum entails increased thermal losses from the receiver and, if severe enough, requires replacement of the receiver. In practice, vacuum degradation causes failure of 1-5% of receiver tubes per year. (c) The tubular outer glass envelope of a conventional receiver must be thick enough to withstand the stresses imposed by containing a vacuum as well as by wind and its own weight. This strength requirement increases the cost of the envelope. (d) The absorptive coating upon the inner, fluid-containing tube of a receiver not only absorbs radiant energy but emits it, particularly in the infrared part of the spectrum. Emission losses increase with coating temperature T approximately as the fourth power of T (i.e., as $T^4$). Energy thus emitted is for the most part lost to the environment, diminishing the receiver's efficiency. Moreover, the absorptive coating may be destroyed by sufficiently high T. Prohibitively large $T^4$ radiation losses, coupled with high-temperature instability of the absorber coating, today prevent practical operation of solar parabolic-trough generating plants at elevated temperatures (>500° C.). Yet, for fundamental thermodynamic reasons it is more efficient to operate any thermal generating plant at higher peak T.

There is thus a need for receivers for parabolic-trough solar power that are less costly to acquire and maintain than are receivers constructed according to the prior art and that allow operation at higher temperature.

SUMMARY OF THE INVENTION

In particular, the invention addresses the following issues and provides advantages over the prior art. Receivers are provided that, relative to state-of-the-art receivers, do not suffer from vacuum degradation, whose absorptive coatings and other components are less costly and simpler to manufacture, that operate durably with undiminished or improved overall energetic efficiency at today's typical operating temperatures (e.g., 350° C.) or at higher temperatures (e.g., at 600° C. or above), and that can be used either in the construction of new power plants or as drop-replacements for defunct conventional receivers in existing power plants. Such improved receivers are expected to lower the levelized cost of energy for concentrating solar power produced using solar parabolic troughs.

Moreover, for most thermal energy storage systems, the operational temperature range has an effect on the cost of storage: that is, increased temperature tends to decrease cost. The increased operating temperature enabled by embodiments of the invention will reduce the amount of thermal storage media required for thermal energy storage compared to the current approaches known in the art, which, for linear, trough-style collection systems, typically operate in the range of 300° C.-400° C. For example, for a system employing salt (or other thermal storage medium storing thermal energy in sensible heat capacity, such as gravel, ceramics, oils, and other solids and fluids) as the thermal storage media, the mass of salt required to store a given quantity of energy is inversely proportional to the temperature differential in the storage system. Thus, a trough system operating from 300° C.-600° C. requires approximately three times less storage salt for a given quantity of energy than does a trough system operating from 300° C.-400° C. This reduction in storage-material mass and the associated reduction in costs make it possible to economically add higher thermal-energy storage capacities.

As used hereinafter, a "tube" or object having a "tubular" form is any elongated, two-ended, hollow body whose cross-sectional form is a simple closed figure (e.g., circle, rectangle, rectangle with rounded corners); a tube may be either closed or open at its ends. The invention pertains to a tubular receiver or heat-absorbing element for use in concentrating solar power systems. Light is focused along the length of the receiver by a trough-shaped collector having a reflective surface that is typically parabolic in cross-section.

According to one aspect, the invention features a central tube or pipe (herein also termed "the radiation-absorbing element") through which a fluid heat-transfer medium flows. A portion of the energy focused upon the receiver by the collector is ultimately absorbed by the fluid medium (e.g., the fluid medium is heated and/or undergoes a phase change). The fluid is then circulated through the radiation-absorbing element and circulated through piping in order to transport the heat energy to a boiler, to a storage unit, or to another destination.

The invention also features a solar absorber coating on part or all of the exterior surface of the radiation-absorbing element. The portion of the radiation-absorbing element's surface that is coated with the absorbent coating is herein termed the "absorbing surface." The solar absorber coating is designed to absorb a large portion of the light that impinges upon it, converting this energy to the form of heat; is designed to be stable at temperatures up to and in excess of 400° C.; and is designed to have both high optical absorptance and low thermal emissivity. That is, the solar absorber coating effectively absorbs light, especially in the visible part of the spectrum, but tends not to re-radiate the energy thus absorbed as infrared light. Thus, energy collected by the radiation-absorbing element tends to be retained rather than dissipated to the environment in the form of infrared radiation.

The invention also features a substantially opaque, thermally insulating jacket around at least a portion of the radiation-absorbing element.

The invention also features a second tube (herein termed the "shell") that surrounds the radiation-absorbing element and thermally insulating jacket. The shell admits light through a non-opaque strip or segment (herein also termed the "aperture") that runs lengthwise along the shell.

In various embodiments, the aperture may be covered partly or wholly by one or more strips of a solid, transparent material (e.g., glass) or may consist partly or wholly of an unobstructed opening. The heat-absorbing element is located within the shell, aligned with the shell, and separated from the shell by an intervening space at most points. The space between the pipe and the shell is herein also termed the "cavity." The absorbing surface of the heat-absorbing element is exposed to light that enters through the aperture. Light that has entered through the aperture may impinge directly on the absorbing surface, or may undergo one or more reflections or be absorbed and re-emitted one or more times before impinging on the absorbing surface. The portion of the cavity through which light can pass after entering the aperture or being reflected or re-emitted within the cavity is herein termed the "optical cavity"; the absorbing surface is exposed to (i.e., forms one surface or wall of) the optical cavity. The portion of the cavity between the heat-absorbing element and the shell that is not the optical cavity is filled with the thermally insulating jacket and is herein termed the "insulation cavity." Portions of the cavity not occupied by some solid material are occupied by a gas (e.g., ordinary air) at or near ambient atmospheric pressure.

In one embodiment, the optical cavity and the insulation cavity are separated by two barriers that are herein termed the "sidewalls." The sidewalls bound the sides of the optical cavity and may consist essentially of strips of a relatively thin material. The sidewalls prevent or impede the mixing of gas in the insulation cavity with gas in the optical cavity. The aperture, the absorbing surface, and the sidewalls are positioned and sized so that when the receiver is approximately aligned with the focus of a trough-shaped mirror of specific dimensions, light reflected from any portion of the mirror enters the aperture along a path that leads directly to the absorbing surface of the collector. Light focused from the mirror does not impinge substantially upon the sidewalls. The sidewalls may be opaquely absorbent, opaquely reflective, or transparent.

In another embodiment, the optical cavity and the insulation cavity are separated by sidewalls that are parabolic in cross-section. Each sidewall is reflective on the side facing the optical cavity. The aperture, absorbing surface, and parabolic sidewalls are sized and shaped so that when the receiver is placed approximately at the focus of a trough-shaped mirror of specific dimensions, light reflected from every portion of the mirror either (a) enters the aperture along a path that leads directly to the absorbing surface or (b) after entering the aperture is reflected from a parabolic sidewall and then impinges on the absorbing surface.

In yet another embodiment, sidewalls bound the optical cavity on two sides and the opening is covered wholly or partly by a linear strip of transparent material (e.g., glass) having a cross-section that causes the strip to act as a lens. The lens, aperture, absorbing surface, and sidewalls are positioned and sized so that when the receiver is approximately aligned with the focus of a trough-shaped mirror of specific dimensions, light reflected from every portion of the mirror impinges on the lens and is refracted thereby into the optical cavity. Light reflected by any portion of the mirror and passing through the lens does not impinge substantially upon the sidewalls. The sidewalls may be opaquely absorbent, opaquely reflective, or transparent.

In a further embodiment, the absorbing surface of the heat-absorbing element is planar or approximately planar.

In still another embodiment, sidewalls bound the optical cavity on two sides and the receiver features a concentric outer tube (herein also termed "the cover") that encloses the shell. The cover includes a transparent strip or segment (herein also termed "the window") that runs along its length. The window may consist substantially of a transparent solid material or an opening. The cover tube also includes an opaque strip or segment (herein also termed "the cap") that runs along its length. The cap may feature one or more of a reflective inward-facing surface and an insulating layer. Both the window and the cap are wide enough and long enough to at least cover the aperture. The cover may be rotated around its long axis so as to bring either the cover window or the cap into alignment with the aperture. The function of the window is to admit light into the optical cavity; the function of the cap is to prevent or reduce radiative and/or convective losses of energy from the interior of the receiver. To admit light into the receiver, the cover is rotated so that the cover window is over the aperture. To conserve heat within the receiver, the cover is rotated so that the cap is over the aperture. The cover window (if solid) and/or the cap may make a partially or wholly airtight seal with the shell of the receiver.

In a further embodiment, the outer surface of the receiver (e.g., in various embodiments, the shell; e.g., in various other embodiments, the cover) is shaped aerodynamically, i.e., in a manner that minimizes the average force exerted upon the receiver by winds.

According to one aspect, the invention features a linear solar receiver for use in a concentrating solar power system. The linear solar receiver comprises a solar radiation absorbing element having an outer surface configured to circumscribe an interior volume, the interior volume designed to contain a heat transfer medium, the solar radiation absorbing element designed to absorb an incident flux of solar radiation and transfer an absorbed flux of energy to the heat transfer medium, the heat transfer medium designed to receive and transport at least a portion of the absorbed flux of energy, the heat transfer medium when transporting at least a portion of the absorbed flux of energy being primarily in a fluid phase; a solar selective absorber located on a first portion of the outer surface of the solar radiation absorbing element, the solar selective absorber having a thermal emittance value and an optical absorptance value, the optical absorptance value being different from the thermal emittance value, being exposed to ambient atmospheric pressure; an substantially opaque thermally insulating jacket, the substantially opaque thermally insulating jacket in contact with a second portion of the outer surface of the solar radiation absorbing element; and a solar radiation admitting region having an interior surface, at least a portion of the solar radiation admitting region being surrounded by at least a portion of the substantially opaque thermally insulating jacket, the solar radiation admitting region designed to allow transmission of at least a portion of the incident flux of solar radiation to be incident on the solar selective absorber, the solar radiation admitting region being symmetric with respect to a plane parallel to a length dimension of the solar radiation absorbing element, the plane oriented in a perpendicular direction to the outer surface of the solar radiation absorbing element.

According to another aspect, the invention relates to a linear solar receiver for use in a concentrating solar power system. The linear solar receiver comprises a solar radiation absorbing element having an outer surface configured to circumscribe an interior volume, the interior volume designed to contain a heat transfer medium, the solar radiation absorbing element designed to absorb an incident flux of solar radiation and transfer an absorbed flux of energy to the heat transfer medium, the heat transfer medium designed to receive and transport at least a portion of the absorbed flux of energy, the heat transfer medium when transporting at least a portion of the absorbed flux of energy being primarily in a fluid phase, the solar radiation; a solar selective absorber located on a first portion of the outer surface of the solar radiation absorbing element, the solar selective absorber having a thermal emittance value and an optical absorptance value, the optical absorptance value being different from the thermal emittance value, the solar selective absorber being exposed to ambient atmospheric pressure; an substantially opaque thermally insulating jacket, the substantially opaque thermally insulating jacket in contact with a second portion of the outer surface of the solar radiation absorbing element; and a solar radiation admitting region having an interior surface, at least a portion of the solar radiation admitting region being surrounded by at least a portion of the substantially opaque thermally insulating jacket, the solar radiation admitting region designed to allow transmission of at least a portion of the incident flux of solar radiation to be incident on the solar selective absorber, wherein the receiver is designed to be located symmetrically between outer edges of a solar mirror collector system such that at least a portion of the receiver shades at least a portion of the solar mirror collector from incident solar radiation.

According to another aspect, the invention relates to a system for generating energy from solar radiation as part of a solar power system. The system comprises a plurality of linear receivers, each of the plurality of linear receivers including at least a solar radiation absorbing element designed to absorb an incident flux of solar radiation and transfer an absorbed flux of energy to a heat transfer medium, the heat transfer medium designed to receive and transport at least a portion of the absorbed flux of energy, at least a portion of the radiation absorbing element being covered with a solar selective absorber, the solar selective absorber having a thermal emittance value and an optical absorptance value, the optical absorptance value being different from the thermal emittance value; a parabolic trough mirror collector for concentrating solar radiation onto the plurality of linear receivers; a control system for directing the parabolic trough mirror at the sun, wherein the heat transfer medium circulating in a first receiver in the plurality of linear receivers is heated by solar radiation from a first elevated temperature T1 to a second elevated temperature T2 over a first distance corresponding to a length of the first receiver and the heat transfer medium circulating in a second receiver in the plurality of linear receivers is heated by solar radiation from a third elevated temperature T3 to a fourth elevated temperature T4 over a second distance corresponding to a length of the second receiver, where T4>T3≤T2>T1, the first receiver and the second receiver having structures designed for operation in different temperature ranges.

According to another aspect, the invention relates to a concentrating solar power system. The system comprises a plurality of linear solar receivers connected in series, the plurality of linear solar receivers connected in series arranged such that a heat transfer medium flowing therethrough exhibits an increase in temperature as it passes from a first end to a second end of the plurality of linear receivers connected in series, at least one of the plurality of linear receivers comprising: a solar radiation absorbing element having an outer surface configured to circumscribe an interior volume, the interior volume designed to contain a heat transfer medium, the solar radiation absorbing element designed to absorb an incident flux of solar radiation and transfer an absorbed flux of energy to the heat transfer medium, the heat transfer medium designed to receive and transport at least a portion of the absorbed flux of energy, the heat transfer medium when transporting at least a portion of the absorbed flux of energy being primarily in a fluid phase; a solar selective absorber located on a first portion of the outer surface of the solar radiation absorbing element, the solar selective absorber having a thermal emittance value and an optical absorptance value, the optical absorptance value being different from the thermal emittance value, the solar selective absorber being exposed to ambient atmospheric pressure; an substantially opaque thermally insulating jacket, the substantially opaque thermally insulating jacket in contact with a second portion of the outer surface of the solar radiation absorbing element; and a solar radiation admitting region having an interior surface, at least a portion of the solar radiation admitting region being surrounded by at least a portion of the substantially opaque thermally insulating jacket, the solar radiation admitting region designed to allow transmission of at least a portion of the incident flux of solar radiation to be incident on the solar selective absorber, the solar radiation admitting region being symmetric with respect to a plane parallel to a length dimension of the solar radiation absorbing element, the plane oriented in a perpendicular direction to the outer surface of the solar radiation absorbing element; a parabolic trough reflector in optical registry with the at least one of the plurality of linear receivers such that when incident solar radiation falls on the parabolic trough reflector, the incident solar radiation is directed to the solar radiation admitting region; and device configured to extract thermal energy from the heat transfer medium that exits the second end of the plurality of linear receivers connected in series, thereby cooling the heat transfer medium, and configured to return cooled heat transfer medium to the first end of the plurality of linear receivers connected in series.

According to another aspect, the invention relates to a linear solar receiver for use in a concentrating solar power system. The receiver comprises a solar radiation absorbing element having an outer surface configured to circumscribe an interior volume, the interior volume designed to contain a heat transfer medium, the solar radiation absorbing element designed to absorb an incident flux of solar radiation and transfer an absorbed flux of energy to the heat transfer medium, the heat transfer medium designed to receive and transport at least a portion of the absorbed flux of energy, the heat transfer medium when transporting at least a portion of the absorbed flux of energy being primarily in a fluid phase; a solar selective absorber located on a first substantially planar portion of the outer surface of the solar radiation absorbing element, the solar selective absorber having a thermal emittance value and an optical absorptance value, the optical absorptance value being different from the thermal emittance value, the solar selective absorber being exposed to ambient atmospheric pressure; an substantially opaque thermally insulating jacket, the substantially opaque thermally insulating jacket in contact with a second portion of the outer surface of the solar radiation absorbing element, the second portion of the outer surface of the solar radiation absorbing element comprising at least 50% of an area of the outer surface of the solar radiation absorbing element determined on a per unit length basis; a solar radiation admitting region having an interior surface defined in an external region, at least a portion of the external region in contact with at least a portion of the substantially opaque thermally insulating jacket, the solar radiation admitting region designed to allow transmission of at least a portion of the incident flux of solar radiation to be incident on the solar selective absorber; and a parabolic mirror collector having a rim angle of less than 75 degrees, the parabolic mirror collector configured to reflect solar radiation on to the solar radiation admitting region.

According to another aspect, the invention relates to a linear solar receiver for use in a concentrating solar power system. The receiver comprises a solar radiation absorbing element having an outer surface configured to circumscribe an interior volume, the interior volume designed to contain a heat transfer medium, the solar radiation absorbing element designed to absorb an incident flux of solar radiation and transfer an absorbed flux of energy to the heat transfer medium, the heat transfer medium designed to receive and transport at least a portion of the absorbed flux of energy, the heat transfer medium when transporting at least a portion of the absorbed flux of energy being primarily in a fluid phase; a solar selective absorber located on the solar radiation absorbing element, the solar selective absorber having a thermal emittance value and an optical absorptance value, the optical absorptance value being different from the thermal emittance value; and wherein the receiver has a thermal efficiency defined as one minus a heat loss divided by the absorbed flux of energy, the thermal efficiency equal to or greater than at least one of 94 percent at 450 degrees Celsius and 92 percent at 500 degrees Celsius.

In one embodiment of the apparatus as previously described, the first portion of the outer surface of the solar radiation absorbing element is substantially planar.

In another embodiment of the apparatus as previously described, the first portion of the outer surface of the solar radiation absorbing element comprises a fraction in the range of 0.50 to 0.20 of an area of the outer surface of the solar radiation absorbing element determined on a per unit length basis.

In another embodiment of the apparatus as previously described, the apparatus further comprises a symmetric parabolic trough collector mirror having a rim angle of less than 75 degrees.

In another embodiment of the apparatus as previously described, the interior surface of the solar radiation admitting region is substantially parabolic in cross section as viewed parallel to the length dimension of the solar radiation absorbing element.

In another embodiment of the apparatus as previously described, the interior surface of the solar radiation admitting region is a reflective surface.

In another embodiment of the apparatus as previously described, the heat transfer medium is selected from the group consisting of a heat transfer salt, a low-melting-point inorganic nitrate salt fluid, a hybrid organic siloxane-based fluid, a molecular silicone-based fluid, an oil and steam.

In another embodiment of the apparatus as previously described, a thermal efficiency of the linear solar receiver as a function of temperature is at least as high as given in any of the four rightmost columns of Table 1.

In another embodiment of the apparatus as previously described, the apparatus appears in combination with an energy collection system configured to operate an energy recovery machine that relies upon the Carnot cycle for recovery of energy from the heat transfer fluid.

In another embodiment of the apparatus as previously described, the apparatus appears in combination with a machine that generates steam.

In another embodiment of the apparatus as previously described, the apparatus appears in combination with a machine that generates electricity.

In another embodiment of the apparatus as previously described, the apparatus appears in combination with a thermal energy storage device.

In another embodiment of the apparatus as previously described, the apparatus appears in combination with a controller that controls the rate of generation of energy.

In another embodiment of the apparatus as previously described, the apparatus has a thermal efficiency and an optical efficiency such that increasing the thermal efficiency by increasing a thickness of the substantially opaque thermally insulating jacket decreases the optical efficiency due to increased shading of the collector by the receiver.

In another embodiment of the apparatus as previously described, the solar radiation absorbing element, substantially opaque thermally insulating jacket, and the solar radiation admitting region are symmetric with respect to a bisecting plane that is parallel to the axis of the linear solar receiver.

In another embodiment of the apparatus as previously described, the apparatus further comprises a glass cover enclosing the solar radiation admitting region.

In another embodiment of the apparatus as previously described, an inert gas is introduced into the radiation admitting region.

In another embodiment of the apparatus as previously described, the apparatus appears in combination with a plurality linear solar receivers, the linear solar receivers each including at least solar radiation absorbing elements, adjacent solar radiation absorbing elements forming a nearly continuous absorbing surface.

In another embodiment of the apparatus as previously described, the apparatus appears in combination with a plurality linear solar receivers, a first one of the plurality of receivers operating at a first temperature and a second one of the plurality of receivers operating at a second temperature, the first receiver and the second of the plurality of receivers having different designs, the first and the second temperatures being different.

In another embodiment of the apparatus as previously described, the apparatus further comprises a symmetric parabolic trough collector mirror structure, the symmetric parabolic trough collector mirror structure being held in a substantially rigid form with cable suspension.

In another embodiment of the apparatus as previously described, the solar selective absorber is a plasmonic nanochain cermet structure.

According to another aspect, the invention relates to a method of generating energy from solar radiation. The method comprises the steps of concentrating a flux of solar radiation incident on a parabolic trough collector mirror onto a linear receiver, the linear receiver being symmetric with respect to a plane bisecting the linear receiver and parallel to a linear axis of the linear receiver, the linear receiver including at least a heat transfer conduit; absorbing a portion of the flux of solar radiation with a solar selective absorber disposed on at least a portion of the heat transfer conduit, the solar selective absorber having a thermal emittance value and an optical absorptance value, the optical absorptance value being different from the thermal emittance value, the portion of the flux of solar radiation constituting absorbed solar radiation; heating a heat transfer medium circulating with the heat transfer conduit to a temperature exceeding 350 degrees Celsius by transferring a first portion of the absorbed solar radiation to the heat transfer medium, the first portion of the absorbed solar radiation constituting transferred solar radiation; controlling the parabolic trough collector mirror with a control system to maintain directional focus at the sun, wherein the receiver has a thermal efficiency defined as one minus a heat loss divided by the absorbed flux of energy, the thermal efficiency equal to or greater than at least one of 94 percent at 450 degrees Celsius and 92 percent at 500 degrees Celsius.

According to another aspect, the invention relates to a method of generating energy from solar radiation. The method comprises the steps of concentrating a flux of solar radiation incident on a parabolic trough collector mirror onto a linear receiver; controlling the parabolic trough collector mirror with a control system to maintain directional focus at the sun; and maintaining the parabolic trough collector mirror in a rigid shape with a cable suspension system, the cable suspension system attached to an upper suspension element above the parabolic trough collector mirror and attached to a lower suspension element below the parabolic trough collector mirror, the upper suspension element and the lower suspension element attached to a plurality of support elements, the plurality of support elements attached to a frame of the trough collector mirror.

In another embodiment of the method as previously described, a weight of the cable suspension system is less than a support structure of a traditional parabolic trough mirror collector.

In another embodiment of the method as previously described, at least a portion of the linear receiver functions as the upper suspension element.

In another embodiment of the method as previously described, the linear receiver includes at least an absorber conduit recessed within substantially opaque insulation.

In another embodiment of the method as previously described, the thermal efficiency is greater than or equal to at least one of 89 percent at 550 degrees Celsius, 85 percent at 600 degrees Celsius, and 80 percent at 650 degrees Celsius.

In another embodiment of the method as previously described, the at least a portion of the heat transfer conduit having the solar selective absorber disposed is substantially planar.

In another embodiment of the method as previously described, a portion of the heat transfer conduit is covered by substantially opaque thermal insulation.

In another embodiment of the method as previously described, at least a portion of the substantially opaque thermal insulation has a thermal conductivity of less than 40 milliWatts per meter per degree Kelvin.

In another embodiment of the method as previously described, the substantially opaque thermal insulation is pyrogenic silica.

In another embodiment of the method as previously described, the solar selective absorber is a plasmonic nanochain cermet structure.

In another embodiment of the method as previously described, the plasmonic nanochain cermet structure is a Ni nanochain-$Al_2O_3$ cermet.

In another embodiment of the method as previously described, the parabolic trough collector mirror has a rim angle less than 75 degrees.

These and other objects, along with the advantages and features of the present invention herein disclosed, will become apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 5A, PLOT 5A is a graph that shows the receiver thermal efficiency as a function of temperature for a prior art receiver and a receiver constructed according to the principles of the present invention.

FIG. 5A, PLOT 5B is a graph that shows the receiver total efficiency as a function of temperature for a prior art receiver and a receiver constructed according to the principles of the present invention.

FIG. 12 is a schematic diagram of an illustrative embodiment of an advanced cavity receiver according to the invention, including a different lenticular aperture cover.

FIG. 13A through FIG. 13F show ray tracings for light focused upon a concentric-tube receiver geometry.

FIG. 19A1 and FIG. 19A2 graph the optical efficiencies of receiver having a planar absorbing surface, 100% or 95% reflective compound parabolic concentrators, with an uncovered aperture.

FIG. 19B1 and FIG. 19B2 graph the optical efficiencies of receiver having a planar absorbing surface, 100% or 95% reflective compound parabolic concentrators, and a glass-covered aperture.

FIG. 22A1, FIG. 22A2, FIG. 22A3 and FIG. 22A4 graph the circulation of heat within, a receiver partially covered by insulation and a receiver not covered by insulation.

FIG. 22B1 and FIG. 22B2 show categories of heat loss from a receiver partially covered by insulation.

FIG. 23A graphs the circulation of heat within a receiver having internal dividers.

FIG. 23B graphs the convection heat loss from a receiver having internal dividers.

FIG. 24A1 is a schematic diagram of a receiver having internal insulation.

FIG. 24A2 graphs the circulation of heat within a receiver having internal insulation.

FIG. 24B1 shows categories of heat loss for a receiver with internal insulation.

FIG. 24B2 graphs heat loss as a function of temperature for a receiver with internal insulation and others.

FIG. 25A, FIG. 25B, and FIG. 25C graph the circulation of heat within the optical cavity of, and heat loss from, a cavity receiver at various angles of tilt.

FIG. 26A is a graph of lines of constant temperature for a cavity receiver both without an external cover over its cavity.

FIG. 26B is a graph of lines of constant temperature for a cavity receiver with an external cover over its cavity.

FIG. 27 is a schematic diagram of an illustrative cavity receiver with provisions for moving an external cover into place over its cavity and removing said cover at will.

FIG. 29 is a table of heat losses from various receivers when blown upon by wind at various angles.

DETAILED DESCRIPTION

Figure 1:
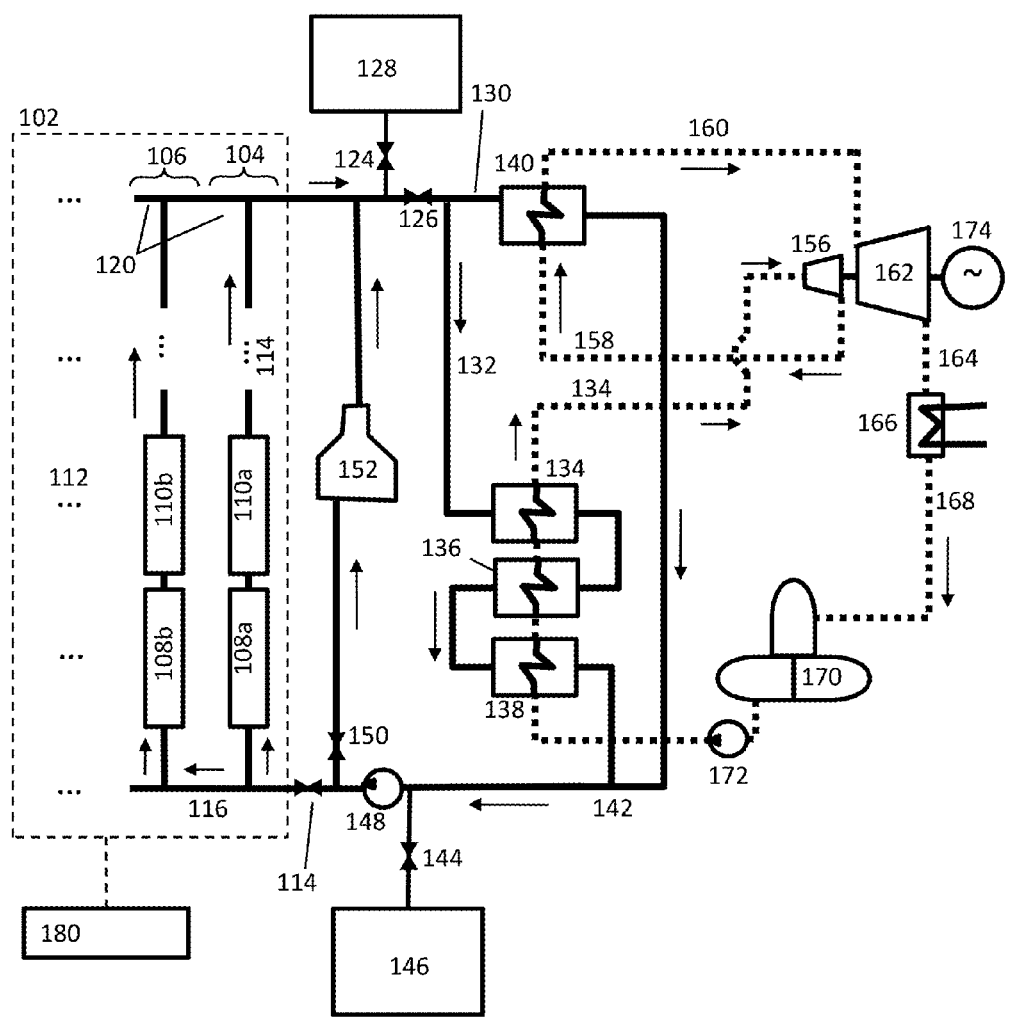
FIG. 1 is a schematic diagram of a concentrating solar-power electrical generation facility.

FIG. 1 depicts an illustrative system 100 for the collection of solar energy in the form of heat and the conversion of the collected heat to electricity. Subsequent figures will clarify the application of embodiments of the invention to such a system and similar systems which use the collected heat in other manners, such as to generate steam for industrial processes. The system 100 depicted in FIG. 1 comprises a solar field 102 for the collection of solar energy. The solar field 102 comprises a plurality N rows (e.g., row 104, row 106), depicted in FIG. 1 as viewed from above, where each row comprises a plurality M receivers (e.g., receivers 108a, 108b; receivers 110a, 110b, etc.) upon which solar radiation is focused by parabolic collectors (not depicted). The plurality of the N rows is indicated in FIG. 1 by horizontal ellipses (e.g., ellipsis 112); the plurality of M receivers in each of the N rows is indicated in FIG. 1 by vertical ellipses (e.g., ellipsis 114). The number of receivers K in the solar field of the illustrative system 100 is therefore K=NM. In other embodiments, the number of receivers may vary from row to row.

Each receiver (e.g., receiver 108a) may be either a conventional receiver constructed according to the prior art or a novel cavity receiver according to embodiments of the invention as described herein. In other words, it is possible to build a system 100 using receivers of the present invention as new construction, or to retrofit some or all of an existing system 100 with receivers of the present invention.

In one state of operation, a heat-transfer fluid (e.g., molten salt, refractory oil, a gas) is admitted to an entry manifold 116 by a valve 118. In FIG. 1, any piping through which the heat-transfer fluid may flow in some state of operation of the system 100 is denoted by a thick dark line. The heat-transfer fluid is distributed by the entry manifold to the N rows and, in each row, passes sequentially through the M receivers in that row. In general, an approximately equal amount of solar radiation $Q_c$ is gathered by the collector associated with each receiver, and absorbed by the fluid in each receiver with a collector efficiency $\eta_r$. Thus, an approximately equal quantity of solar energy $Q_r = Q_c \times \eta_r$ is added to the heat-transfer fluid during its passage through each receiver. In passing through the M receivers in each row, the heat-transfer fluid therefore gains an amount of energy approximately equal to $Q_r \times M$ before entering an exit manifold 120. The total amount of thermal energy $Q_{total}$ added to the heat-transfer fluid that enters through manifold 116, passes through the solar field 102, and exits through manifold 120 is therefore, to a first approximation, $Q_t = Q_r \times M \times N$. However, in practice the amount of energy will be a lesser quantity $Q'_t < Q_t$ because of losses from collectors and other components. Where the receivers are vacuum-containing tubes according to the prior art, receiver losses are dominated by, but not restricted to, radiation losses from collectors, i.e., infrared radiation emitted by the hot coating on each collectors' heat-absorbing element. Because emissive losses tend to increase by approximately the fourth power of T, losses are greater from hotter tubes, i.e., those closer to the exit manifold 120. Energy losses are therefore not uniform throughout the solar field 102. The overall efficiency of the solar field, $\eta_f$, depends complexly on direction and intensity of insolation (solar radiation impinging on the solar field 102), collector efficiency, absorber coating absorptivity and emissivity as a function of temperature, receiver geometry, convection and conduction losses from receivers, heat-transfer fluid characteristics, and other factors.

Heated heat-transfer fluid leaving the solar field 102 through the exit manifold 120 is gated by a valve 122. Two additional valves 124, 126 direct the heat-transfer fluid from the exit manifold 120 to at least one of a hot-fluid reservoir 128, piping 130, and piping 132. Fluid may also be extracted from hot reservoir 128 by a pump (not depicted).

Heat-transfer fluid passing through piping 132 encounters three devices in which the fluid exchanges heat with liquid water or steam, i.e., a superheater 134, a heater 136, and a preheater 138. In each of the three heat-exchange devices 134, 136, 138, the heat-transfer fluid gives up some of its thermal energy to liquid water or steam passing through the same three devices 134, 136, 138 in the opposite direction. In FIG. 1, any piping through which water and/or steam may flow in some state of operation of the system 100 is denoted by a thick dashed line. Heat-transfer fluid passing through piping 130 passes through a fourth heat-exchange device (reheater) 140, giving up some of its thermal energy to steam passing through the reheater 140 in the opposite direction. Heat-transfer fluid that has flown through the heat-exchange devices 134, 136, 1348, and 140 is re-united in piping 142. The fluid may be directed through a valve 144 to a "cool" storage reservoir 146. Fluid may also be extracted from cool reservoir 146 by a pump (not depicted). Heat-transfer fluid not directed to the cool reservoir 146 passes through a pump 148 and is pressurized sufficiently to enable circulation of the fluid through the solar field 102. Booster pumps for heat-transfer fluid and water and/or steam that are not depicted in FIG. 1 may be present in the system 100. Valves 118 and 150 direct the heat-transfer fluid pressurized by the pump 148 to at least one of the solar field 102 and a boiler 154. The boiler 154 may burn a fossil fuel (e.g., natural gas) or derive thermal energy from some other source in order to heat the heat-transfer fluid passing therethrough. When the solar field 102 is not capable of maintaining the temperature of the heat-transfer fluid throughout system 100 at or above an acceptable minimum (due to, e.g., lack of insolation), the boiler 152 may be employed to heat the heat-transfer fluid. Alternatively or additionally, the boiler 152 may be used as a backup source of heat to drive energy generation by the system 100.

Water heated in the preheater 138 is boiled to steam in the heater 136 and the steam is further heated in the superheater 134. Steam from the superheater 134 is directed through piping 154 to a first turbine stage 156. After expanding in the first turbine stage 156, imparting energy thereto and declining in temperature, the steam is directed through piping 158 to the reheater 140, where it is heated by maximum-temperature heat-transfer fluid direct from the solar field 102 or from the hot-fluid reservoir 128. The steam is then directed through piping 160 to a second turbine stage 162. After expanding in the second turbine stage 162, imparting energy thereto and declining in temperature, the steam is directed through piping 164 to a condenser 166, where it gives up further energy (to, e.g., a preheater flow of heat-transfer fluid not depicted in FIG. 1) and is condensed to water. The water from condenser 166 is directed through piping 168 to a water reservoir 170. Water exiting the reservoir 170 passes through a pump 172. Water pressurized by the pump 172 enters the initial heating loop (devices 138, 136, 134) and continues as already described.

The turbine stages 156, 162 turn a generator 174 that produces electricity. In other embodiments, the heat or generated steam may be used for other processes such as industrial processes.

A controller (e.g., a general purpose programmable computer that operates under the control of one or more instructions recorded on a machine readable memory) 180 receives data from the solar field 102 (on, e.g., fluid temperature and pressure in different parts of the field; collector orientation; insolation intensity and direction) and sends control signals to various parts of the solar field 102 to optimize its importance. For example, the controller may progressively tilt collectors as the sun moves across the sky in order to collect maximum energy.

In an ordinary state of energy-producing operation, the sole source of energy input to the system 100 is sunlight falling on the collectors of the solar field 102. The efficiency with which this solar energy is converted to heat by absorption in the receivers (108a, 110a, ..., 108b, 110b, ... ), and retention of the energy thus absorbed by the heat-transfer fluid as it passes through the solar field 102, are therefore influence the cost of electricity produced by the system 100.

Figure 2:
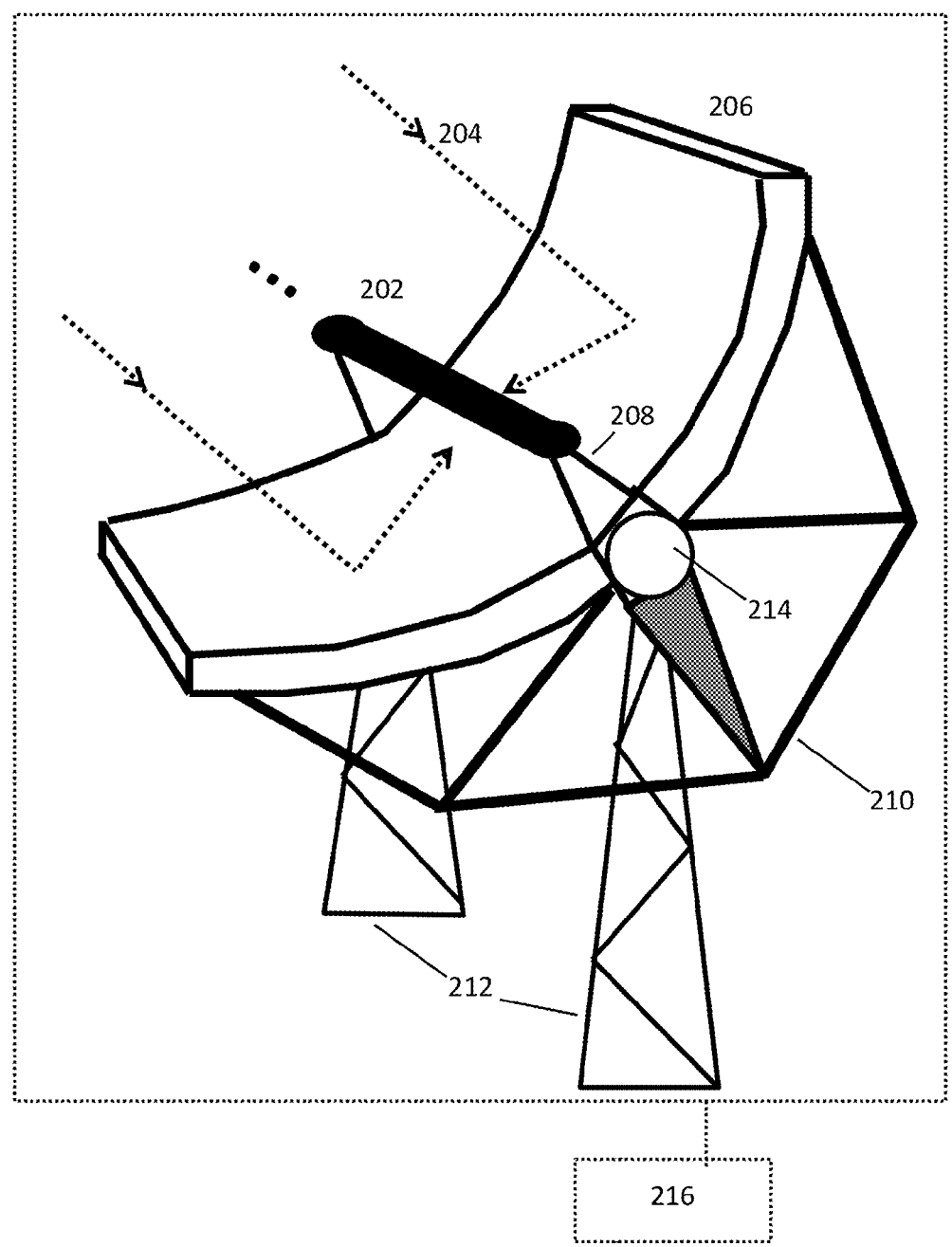
FIG. 2 illustrates exemplary embodiments of a system supporting a parabolic trough mirror and receiver tube.

FIG. 2 depicts an illustrative assembly 200 for the collection of solar energy in the form of heat that may be part of a larger system for the conversion of solar energy to thermal and/or electrical energy. Assembly 200 is typical of receiver-and-trough assemblies, according to the prior art, that could be used in the solar field 102 of a power-generating system similar to that illustrated in FIG. 1. Receivers embodying the invention could also be employed, advantageously, in assembly 200 and in solar field 102 in FIG. 1.

Illustrative assembly 200 comprises a receiver tube 202. Solar radiation 204 is reflected from a trough-shape collector 206 having a parabolic cross-section and impinges on the receiver 202. The receiver 202 is held in place at the focus of the parabolic trough 206 by struts 208. The approximately rigid assembly comprising receiver 202, struts 208, and trough 206 is held in place by a truss-type support structure 210 which is in turn mounted upon supports 212 and can be rotated on a joint or bearing mechanism 214 so that the trough 206 faces the sun (i.e., is tilted at an angle equal to the elevation of the sun above the horizon at a given moment). Movement of the assembly 200 for sun-track, or operation of other controllable features of the assembly 200, may be controlled by a controller (e.g., a general purpose programmable computer that operates under the control of one or more instructions recorded on a machine readable memory) 216.

Figure 3A:
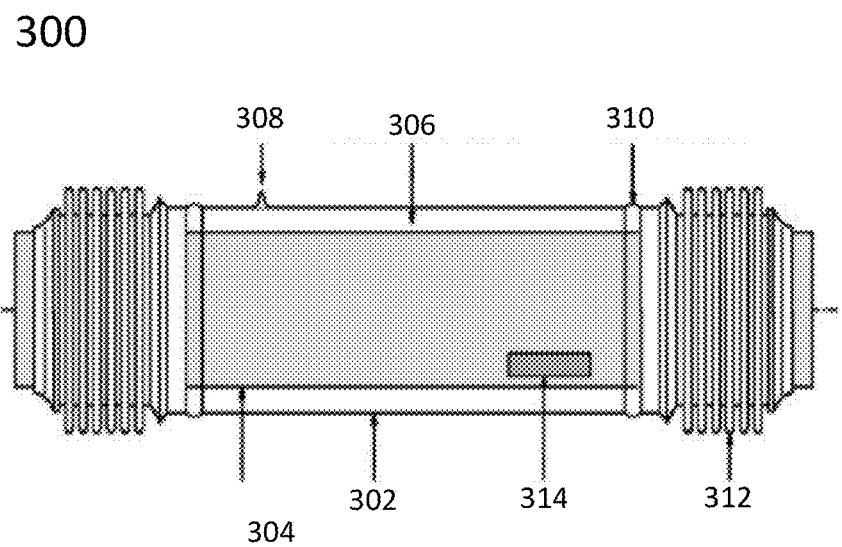
FIG. 3A and FIG. 3B illustrates aspects of the prior art for vacuum-containing receiver tubes.
Figure 3B:
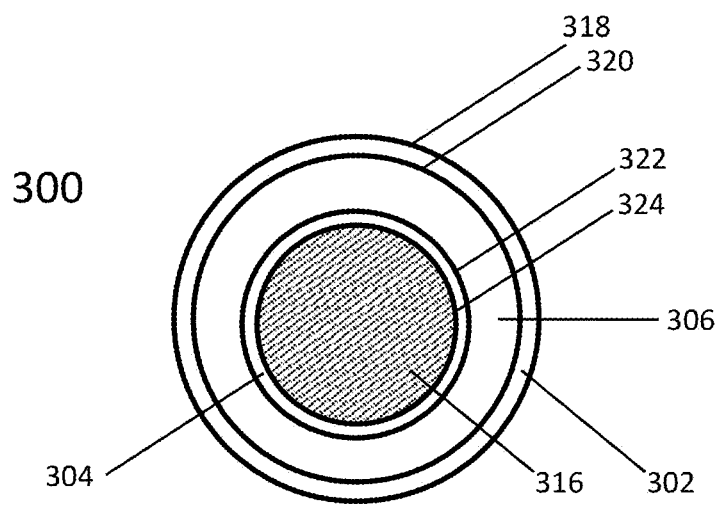

FIG. 3A (side view) and FIG. 3B (cross-sectional view) depict some of the features of a typical receiver tube 300 according to the prior art. The tube 300 is typical of tubes that would presently be used in the solar field 102 of a power-generating system similar to that illustrated in FIG. 1. In receiver 300, a transparent glass envelope 302 contains a steel absorber tube (heat-absorbing element) 304. Between the envelope 302 and the tube 304 is a vacuum (evacuated annulus) 306. An evacuation nozzle 308 permits removal of air from the space between the envelope 302 and tube 304 during manufacture of the receiver 300. At each end of the receiver 300, a metal bellows 310 flexibly accommodates changing forces due to thermal expansion and contraction and to wind, and provides a point of attachment for the struts (e.g., struts 208 in FIG. 2) that support the receiver 300. A glass-to-metal seal 312 preserves the vacuum 306. A "getter" insert 314 absorbs some of the hydrogen that infiltrates the vacuum 306.

FIG. 3B makes clear that the tube 304 is coaxial with the envelope 302, with the vacuum 306 between them. In various embodiments according to the prior art, coatings to selectively absorb and reflect radiation, conduct heat, resist corrosion, or achieve other purposes are applied to the outer surface 318 and inner surface 320 of the envelope 302 and to the outer surface 322 and inner surface 324 of the tube 304. Heat-transfer fluid 316 circulates within the tube 304.

Figure 4:
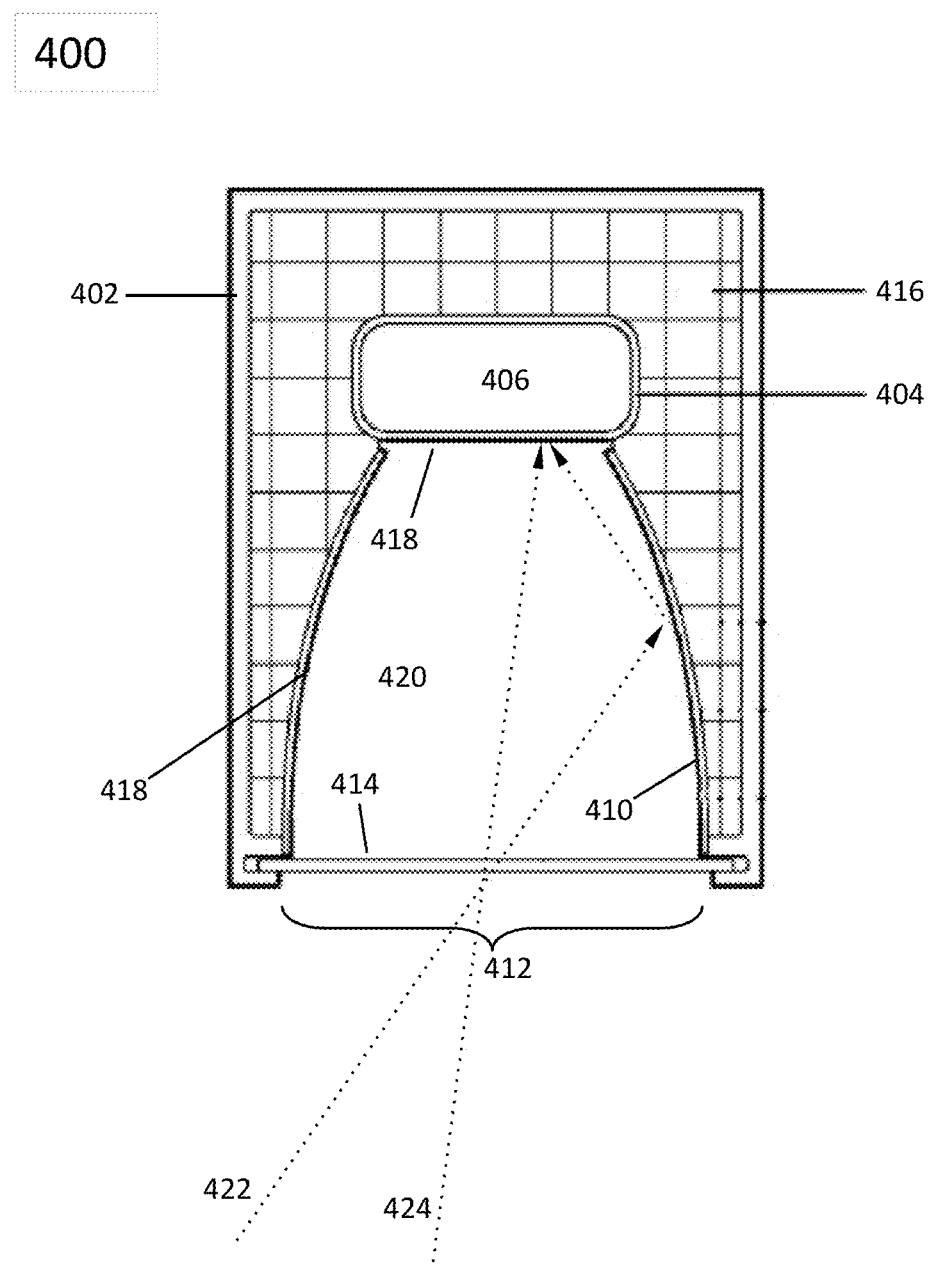
FIG. 4 is a cross sectional view of a receiver according to principles of the invention.

FIG. 4 pertains to one embodiment of the invention. Before describing FIG. 4 in detail, we note the following general considerations, which pertain to various embodiments of the invention: Various embodiments, including that depicted in FIG. 4, comprise a tubular heat-absorbing element partly enclosed in an insulating layer or jacket, with a recess or cavity (also herein termed the "optical cavity"), transparent to light on one side along an aperture, below an exposed surface (also termed "the absorbing surface") of the heat-absorbing element. In cross-section, the insulation jacket has approximately the form of a letter "C" that can be turned, or is permanently turned, so that the opening of the "C" faces toward a parabolic collector that focuses light thereon. In this analogy, the gap in the "C" corresponds to the optical cavity, and the width of the gap in the "C" corresponds roughly to the width of the receiver aperture. A portion of the heat-absorbing element, herein termed the "absorbing surface," is exposed to light entering the optical cavity through the aperture. Making the absorbing surface planar (i.e., flat) rather than another shape (e.g., an arc) reduces the absorbing surface's area for a given aperture width; the advantages realized by doing so are discussed further below.

An additional design consideration in various embodiments is the inclusion or omission of a transparent aperture cover (e.g., of glass) enclosing the recessed optical cavity. Omitting the aperture cover tends to improve optical performance but hinder thermal performance in some circumstances (e.g., wind directed along cavity) and tends to expose the absorber surface to potential contamination (e.g., by dust). A transparent aperture cover may be shaped to act as a lens that concentrates light that is incident on the aperture (especially light incident on the aperture at a low angle) into a narrower cavity. A lensing aperture cover can enable further reduction in absorbing-surface size, as clarified in later Figures and descriptions.

An additional design consideration in various embodiments is the inclusion or omission of reflective parabolic sidewalls that bound the lateral faces of the recessed optical cavity. Such reflectors, also herein termed "compound parabolic concentrators" because they constitute a stage of parabolic concentration additional to that of the collector trough, can enable further reduction in absorbing-surface size, aperture width, and overall receiver width, as clarified in later Figures and descriptions. If compound parabolic concentrators are omitted, the sidewalls of the optical cavity may be oriented and shaped so as to intercept essentially none of the light-rays directed into the optical cavity by the collector, with or without passage through a lensing aperture cover. Such non-intercepting sidewalls are also herein termed "passive" sidewalls. Reflective sidewalls having non-parabolic geometries may also be employed.

Receiver designs incorporating (a) a tubular heat-absorbing element partially surrounded by an insulating jacket, (b) a recessed optical cavity with sidewalls (either passive sidewalls or compound parabolic concentrators), and (c) a portion of the heat-absorbing element that is exposed to light in at least some states of operation of the receiver and which, when exposed to light, acts as absorbing surface (either planar or curved), are herein also referred to as illustrative of the "advanced cavity receiver geometry." Various embodiments of the advanced cavity receiver geometry may also include one or more of the following features, among others: (a) a tubular shell around the insulation layer, (b) an outermost tubular cover that may be moveable, or with respect to which the other components of the receiver may be moveable, and which may incorporate transparent or insulating covers that can cover the aperture in various states of operation, (c) gas (e.g., air) within the optical cavity and/or other portions of the receiver, which gas may be at atmospheric pressure, (d) a vacuum within the optical cavity and/or other portions of the receiver, and (e) a transparent cover over part or all of the aperture, which cover may be shaped to act as a lens, (f) various specialized optical and thermal coatings over the surfaces of any of the components (e.g., over a transparent aperture cover), (g) the capability to flow/insert an inert gas into the aperture.

Figure 10:
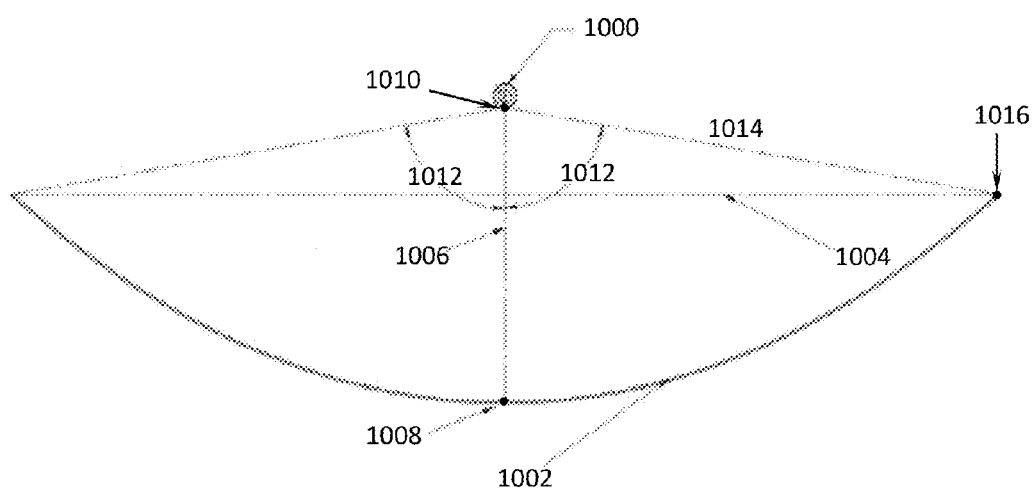
FIG. 10 illustrates terms used herein to describe the geometry of a receiver mounted above a collector.

The geometric details of various embodiments of the advanced cavity receiver, particular the depth of the optical cavity and the angles and shapes of the sidewalls of the optical cavity, are influenced by the collector rim angle (this term is clarified in FIG. 10). Variations on the advanced cavity receiver design seek to minimize absorbing-surface width and overall cavity width, to maintain sufficient cavity depth for insulating purposes, and to operate efficiently in conjunction either with existing trough collectors or new collectors having similar key dimensions.

FIG. 4 is a cross-sectional diagram that depicts features of an illustrative novel receiver that incorporates aspects of the invention and shows one possible response to the range of design considerations discussed in the foregoing paragraphs. In this novel design, an advanced cavity receiver 400, is a dramatic departure from the construction of prior art receivers (e.g., as depicted in FIG. 3A and FIG. 3B). This illustrative advanced cavity receiver is simpler to manufacture and maintain than the conventional receiver of FIG. 3B because it does not contain a vacuum and reduces the exposed glass component. Elimination of the vacuum confers a number of advantages, including obviation of the airtight seal 312 in FIG. 3 and the "getter" insert 314, elimination of vacuum failure (responsible for failure of ~1-5% of conventional vacuum-containing receivers per year in real-world usage), and possible easing of design constraints on the bellows 310 or equivalent contrivances for accommodating structural stresses and movements (since there is no airtight seal that needs to be protected against mechanical failure). In additional, the removal of vacuum baffles allows for adjacent receivers to be nearly continuous.

The illustrative advanced cavity receiver 400 comprises a tubular shell 402, a heat-absorbing element 404 through which a heat-transfer fluid 406 can flow, reflective parabolic sidewalls 408, 410, an aperture 412, a transparent aperture cover 414 spanning the aperture 412, an insulating jacket 416 partially surrounding the heat-absorbing element 404, a planar (flat) absorbing surface 418 coated with an absorbent coating and exposed to light entering the aperture 412, and an optical cavity 420 bounded by the absorbing surface 418, sidewalls 408, 410, and aperture cover 414. The shell 402 and insulation 416 may be substantially opaque or be optical transmitting. Substantially opaque insulation blocks most but not necessarily all of the radiation. Optical transmitting insulation has a transmittance of above 80%. The receiver 400 is approximately uniform in cross-section along its entire length, apart from mounting and other hardware (not shown) at each end. The optical cavity or other portions of the collector 400 may be evacuated or filled with a gas (e.g., air) at approximately ambient atmospheric pressure. If the gas is air, the advantage is gained over the prior art that no provision need be made to exclude ambient air from any portion of the receiver 400 except the fluid-containing heat-absorbing element 404.

The specific dimensions of the components of a receiver having a schematic cross-section like receiver 400 are chosen to optimize performance (i.e., solar energy collected) when the receiver 400 is mounted at the focus of a trough-shaped collector of specific dimensions whose reflective surface is parabolic in cross-section. That is, the design of a receiver cannot be considered entirely apart from the dimensions of the collector with which it is intended to work. Geometric and other considerations pertaining to the design of a receiver resembling receiver 400 in FIG. 4 are described and clarified further in FIG. 18 and other Figures below.

In various embodiments, the selective absorber coating on the absorbing surface 418 is a spectrally selective plasmonic nickel nanochain cermet (ceramic-metal blend) material that may be created using solution-chemical fabrication. The advantages offered by advanced coating materials of this type include, but are not limited to, simpler fabrication than conventional cermet absorber coatings, tolerance of higher temperatures, and desirable absorbance and emissivity properties. Such materials have been demonstrated in the laboratory by Prof. Jifeng Liu and colleagues at Dartmouth College, NH and disclosed in, e.g., Wang X, Li H, Yu X, Shi X, and Liu J, "High-performance solution-processed plasmonic Ni nanochain-$Al_2O_3$ selective solar thermal absorbers," *Appl. Phys. Lett.* 101, 203109 (2012), but have not hitherto been disclosed as part of any novel receiver design such as the advanced cavity receiver 400.

In brief, receiver 400 operates as follows: light rays 422, 424 are focused across a range of angles upon the aperture 412 by a parabolic collector (not shown). All light rays passing through the transparent aperture cover 414 strike the absorber surface 418 after either (a) traversing the optical cavity 420 directly, as does ray 424, or (b) reflecting off a parabolic sidewall 408 or 410, as does ray 422. The absorber surface 418 absorbs a large portion of the solar radiation incident upon it and is heated thereby. Because the absorber surface 418 is planar, in a departure from the prior art, it minimizes the surface area over which infrared light is emitted by the heated absorber coating. Any non-planar absorber surface in a receiver otherwise identical to receiver 400 would, by straightforward geometry, have a larger surface area than the planar absorber surface 418. Consequently, for a given coating composition at a given temperature, the planar absorber surface of FIG. 4 will radiate less energy than a non-planar absorber surface simply because its area is smaller. In an extreme case, the absorber coating of a receiver constructed according to the prior art is 100% of the lateral surface of the tubular heat-absorbing element. By contrast, in various embodiments incorporating aspects of the invention, the absorbing surface (e.g., absorbing surface 418 in FIG. 4) may occupy only 20% of the lateral surface area of the heat-absorbing element, and at most 50% of the lateral surface of the heat-absorbing element.

Moreover, the receiver geometry and advanced coatings proposed for the absorber surface 418 will allow operation of the receiver 400 at higher temperatures than can be tolerated by the absorber coatings of vacuum-tube receivers constructed according to the prior art. Operation at higher temperature (i.e., temperature of absorber surface 418, heat-absorbing element 404, and heat-transfer fluid 406) in energy-generating facility such as system 100 in FIG. 1 will, in general, operate more efficiently if the temperature of the heat-transfer fluid exiting the solar field 102 is higher: preferably, as high as the material construction of the system 100 permits.

These and other advantages of the invention will be made clear in subsequent Figures and descriptions.

In order to operate a solar field 102 at elevated temperatures, it is desirable that heat-transfer fluid be available which can tolerate such elevated temperatures and have other advantageous properties (e.g., does not freeze ambient environmental temperatures). Candidate heat-transfer fluids include, e.g., molten solar salt, steam, superheated steam, high-pressure steam, Coastal Chemical's HITEC® heat transfer salt ("HITEC Heat Transfer Salt," Coast Chemical Co., LLC, www.coal2nuclear.com/MSR%20-%20HITEC%20Heat%20Transfer%20Salt.pdf, accessed Jan. 6, 2012), Sandia National Laboratory's low-melting-point inorganic nitrate salt fluid ("Low-melting point inorganic nitrate salt heat transfer fluid," U.S. Pat. No. 7,588,694, issued Sep. 15, 2009), the hybrid organic siloxane-based fluid being developed by Los Alamos National Laboratory ("Hybrid Organic Silicone HTF Utilizing Endothermic Chemical Reactions for Latent Heat Storage," http://www1.eere.energy.gov/solar/sunshot/csp_recoveryact_lanl.html, accessed Jan. 6, 2012), and CX500, a molecular silicone-based fluid with exceptional thermal stability (to at least 500° C.) and low freezing point (−40° C.) developed at Los Alamos National Laboratory by Dr. Stephen Obrey and colleagues (P. C. DeBurgomaster, S. J. Obrey, L. N. Lopez, "Rational Tailoring of Functional Siloxanes for Enhanced Thermal Performance," Presentation at the American Chemical Society National Meeting in Anaheim, Calif., 2011, at http://permalink.lanl.gov/object/tr?what=info:lanl-repo/lareport/LA-UR-11-01885, accessed Jan. 6, 2012).

FIG. 5A includes two data plots, Plot 5A and Plot 5B, which compare aspects of performance of a state-of-the-art conventional receiver (i.e., the Schott PTR70) and of an illustrative advanced cavity receiver that resembles receiver 400 in FIG. 4 and incorporates aspects of the invention. Figures for Schott PTR70 conventional receiver performance are derived from Burkholder F, Kutscher C, "Heat Loss Testing of Schott's 2008 PTR70 Parabolic Trough Receiver,"

National Renewable Energy Laboratory (NREL) Technical Report NREL/TP-550-45633, May 2009. Testing by Burkholder and Kutscher did not exceed 500° C., and the cermet absorber coating of the Schott PTR70 cannot endure prolonged exposure to a temperature of 650° C.; therefore, the efficiency figures for "Current Receivers" in Plot 5A and Plot 5B are based on extrapolation of curves presented by Burkholder and Kutchscher (2009) (whose results are collectively henceforward referred to as "NREL data"). The figures represent the approximate performance that a state-of-the-art conventional receiver would achieve if it were endowed with an absorber coating capable of operating at temperatures above approximately 500° C.

To predict performance of advanced cavity receiver designs, a computer model was constructed for both the conventional receiver design and a range of advanced cavity designs. Validation of the model, and additional results therefrom, will be further explained in later Figures.

The Zemax software tool was used to predict the optical efficiency of both the conventional and advanced cavity receiver. Zemax is available from Radiant Zemax, 22908 NE Alder Crest Drive, Suite 100, Redmond, Wash. 98053. The ANSYS Fluent software package was used to predict the thermal efficiency of both the conventional receiver and a range of advanced cavity receivers. ANSYS Fluent is available from ANSYS, Inc., 275 Technology Drive, Canonsburg, Pa. 15317.

As used herein, the "optical efficiency" of a receiver is defined as the fraction of the radiant energy incident on the collector that is collected as heat by the heat-transfer fluid within the receiver. Simulation of the conventional receiver was compared to NREL data to validate the model: conventional-receiver results matched both measured and extrapolated results within 1-3%, lending confidence to the advanced-cavity receiver results presented herein.

As used herein, the "total efficiency" of a receiver is the fraction of radiant energy focused upon the receiver that is delivered as heat energy by the heat-transfer fluid upon exit from the receiver, and is defined as the product of the receiver's optical efficiency and thermal efficiency.

As used herein, the "thermal efficiency" of the receiver is defined as one minus the heat loss from the receiver divided by the energy absorbed by the receiver. In computer simulations of receiver behavior described herein, to specify the thermal efficiency independently of the optical efficiency, the absorbed energy is kept constant at 4500 W/m. This value assumes an optical efficiency of 90% for an incident solar energy source of 1000 W/m$^2$ on a collector with a 5 m diameter. Heat-loss data for the state-of-the-art Schott PTR-70 receiver have been experimentally determined (the NREL data) or are extrapolated from such data, while heat loss for other receivers is calculated herein using computational fluid dynamics models. Table 1 shows that planar receivers (e.g., receiver 400 of FIG. 4) offer increased thermal efficiency performance relative to a state-of-the-art receiver. The numbers given in Table 1 are clarified below. As used herein planar is used to generally distinguish a structure of the present invention from a strictly circular structure and as such includes variations that include some degree of curvature. For example in some embodiments to facilitate the efficient transport of fluid the central fluid transport channel can include rounded corners and a generally bowed cross-sectional profile

TABLE 1

Thermal Efficiency of Schott PTR70 and Planar Receiver

| Operating Temperature | Schott-PTR70 Receiver Prior Art | Efficiency Estimate 1 | Efficiency Estimate 2 | Efficiency Estimate 3 | Modeled Planar Receiver Efficiency |
|---|---|---|---|---|---|
| 400 | 94.9% | 95.5% | 96% | 96.1% | 96.8% |
| 450 | 92.6% | 93.8% | 94% | 94.4% | 96.2% |
| 500 | 89.4% | 91.4% | 92% | 92.4% | 95.3% |
| 550 | 85.1% | 88.2% | 89% | 90.2% | 94.3% |
| 600 | 79.3% | 83.9% | 85% | 86.8% | 93.1% |
| 650 | 71.7% | 78.4% | 80% | 81.7% | 91.7% |

While efforts have been made to include relevant important physical factors in the CFD models, it is likely that various embodiments of the invention will have efficiencies less than those calculated by the ideal model value. The thermal efficiencies of these embodiments may fall between those of the modeled planar receiver and the measured PTR70 receiver due to additional heat loss mechanisms and unaccounted for physical factors. Three estimates for these efficiencies are the following:

The estimate 1 percentage is defined as:

$$\text{Estimate } 1\% = SOA \% + \frac{\text{Optimized Planar Receiver } \% - SOA \%}{3}$$

Estimate 2 is the average of estimate 1 and estimate 3, expressed as the nearest whole number.

The estimate 3 percentage is defined as:

$$\text{Estimate } 3\% = \frac{\text{Optimized Planar Receiver } \% + SOA \%}{2}$$

Plot 5A in FIG. 5A shows that in at least one embodiment, the vacuum-free advanced cavity receiver maintains >90% receiver thermal efficiency (plotted using black squares and solid lines) up to 650° C. operating temperature, substantially outperforming the current vacuum-based state-of-the-art receiver (plotted using black diamonds and dotted lines), whose thermal efficiency drops below 75% efficiency at 650° C.

Plot 5B in FIG. 5A combines the thermal-efficiency curves of Plot 5A with optical-efficiency curves (not shown) to derive total receiver efficiency curves for the same current vacuum-based receiver and advanced cavity receiver as in Plot 5A. Even with operation in air and the complete removal of receiver vacuum, performance of the advanced cavity receiver at current operating temperatures (~375° C.) is approximately equal to that of the current receiver; at higher temperatures (i.e., above approximately 475° C.), the total receiver of the efficiency of the advanced cavity receiver exceeds that of the current receiver.

Moreover, the estimated materials and manufacturing cost of the embodiment whose simulated performance is depicted in FIG. 5A are approximately 20% lower than those of the state-of-the-art receiver whose performance is depicted in FIG. 5A. Therefore, advantages to be realized by at least some embodiments of the invention include higher efficiency at high operating temperatures and lower capital cost per receiver. Lower rates of replacement for receivers in the field is another advantage likely to be realized by at least some embodiments of the invention, given the complete absence of vacuum degradation as a concern in the advanced cavity receiver.

Figure 5B:
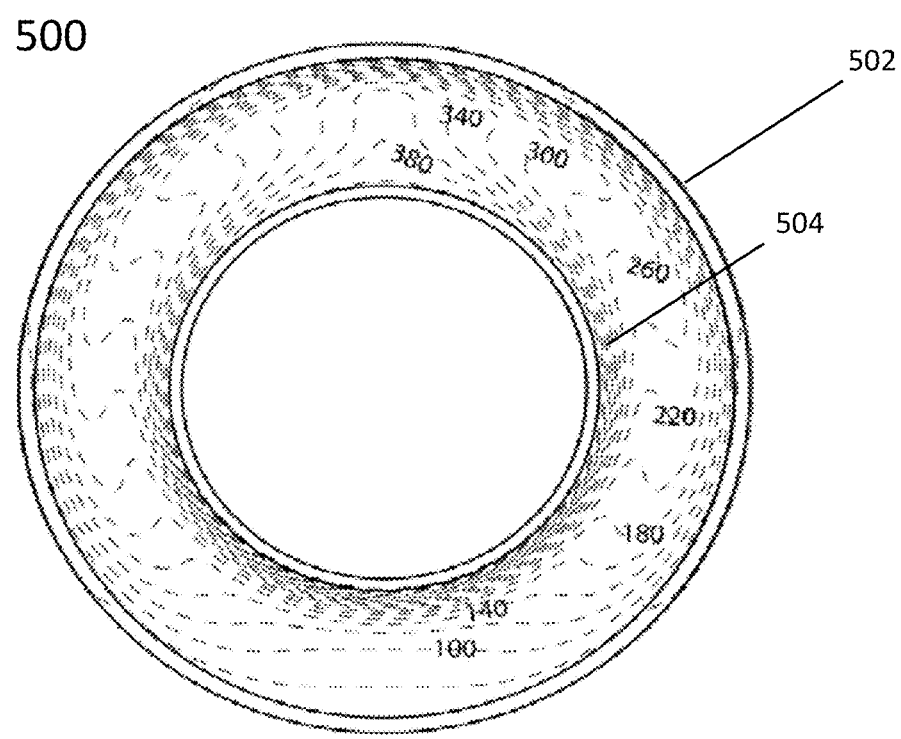
FIG. 5B is a cross-sectional plot of simulated contours of constant temperature (degrees Centigrade) in a state-of-the-art receiver constructed according to the prior art.

FIG. 5B is a cross-sectional plot of simulated contours of constant temperature (degrees Centigrade) in a state-of-the-art receiver 500 constructed according to the prior art and operating at a fixed temperature of the absorber coating of 400° C. Simulation was performed using the ANSYS Fluent software tool, which was also used to create all other plots of simulated contours of constant temperature and of velocity vectors in circulating gases in subsequent Figures. In this instance, the vacuum normally present in a state-of-the-art receiver 500 between its envelope 502 and heat-absorbing element 504 is presumed to have been lost, i.e., the space between the envelope 502 and heat-absorbing element 504 is filled with air. This simulation also assumes a heat-absorbing coating having an emissivity of approximately 0.1 that does not degrade when exposed to air i.e., does not increase in emissivity. As used herein, the emissivity of an object is the dimensionless ratio of the energy radiated by a the material to the energy radiated by an ideal black body at the same temperature. Assuming a nondegraded coating is a conservative assumption, because actual coatings according to the previous art do degrade when exposed to air and increase in emissivity. Increased emissivity entails increased energy loss through infrared radiation from the heat-absorbing surface.

Figure 5C:
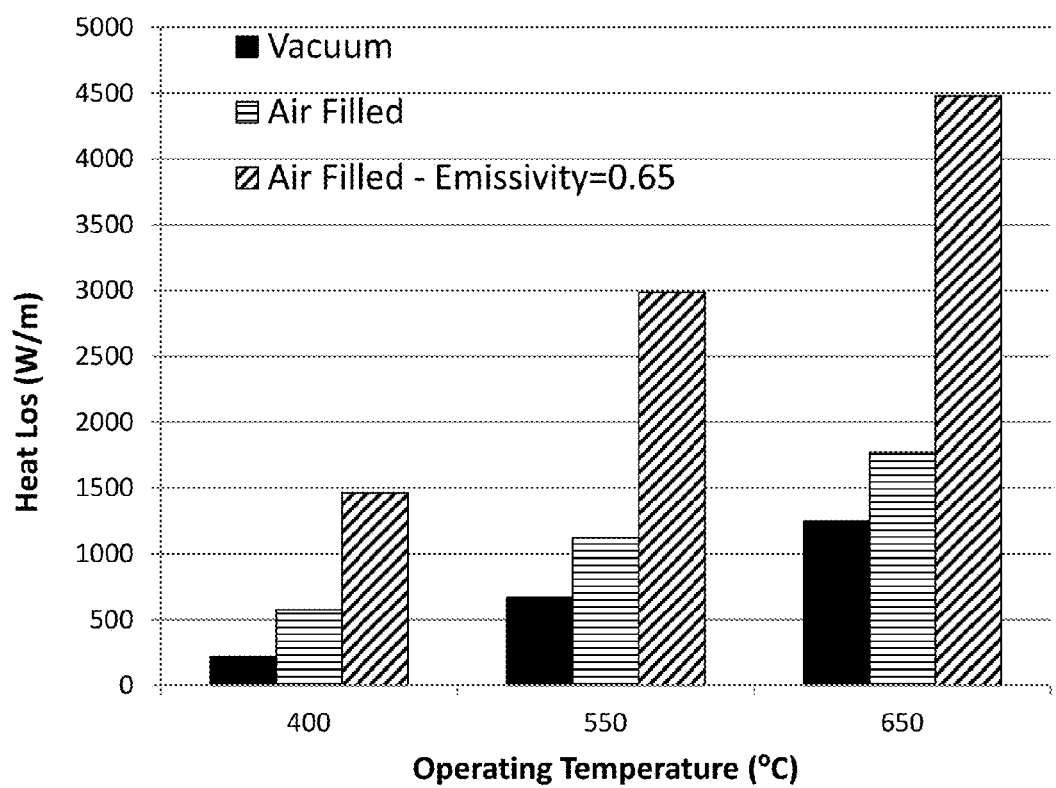
FIG. 5C is a graph of heat losses for a receiver built according to the prior art under three different conditions of operation.

FIG. 5C is a plot of simulated radiative heat loss in units of watts per meter for the same simulated state-of-the-art receiver 500 depicted in cross-section in FIG. 5B. Simulated heat loss for a range of assumed conditions and operating temperatures is plotted in FIG. 5C. For each of three operating temperatures (i.e., 400° C., 550° C., 650° C.), the three assumed operating conditions are as follows: (1) The black bars correspond to a receiver 500 with intact vacuum; (2) the horizontal-striped bars correspond to a receiver 500 with vacuum lost (as in FIG. 5B) but no degradation of absorber coating (i.e., no increase in emissivity above 0.1); and (3) the diagonal-striped bars correspond to a receiver 500 with vacuum lost (as in FIG. 5B) and with realistic degradation of absorber coating (i.e., emissivity increased to 0.65). The operating condition and temperature of the contour plot of FIG. 5B corresponds to the horizontal striped bar in FIG. 5C for an operating temperature of 400° C. FIG. 5C shows that radiative heat loss increases both with temperature increase and with loss of vacuum; this clarifies (a) the disadvantage conferred on the prior art by reliance on vacuum and (b) the even more drastic disadvantage conferred on the prior art by coatings that increase in emissivity when exposed to air and to higher temperatures (e.g., 550° C. and 600° C.).

Figure 6:
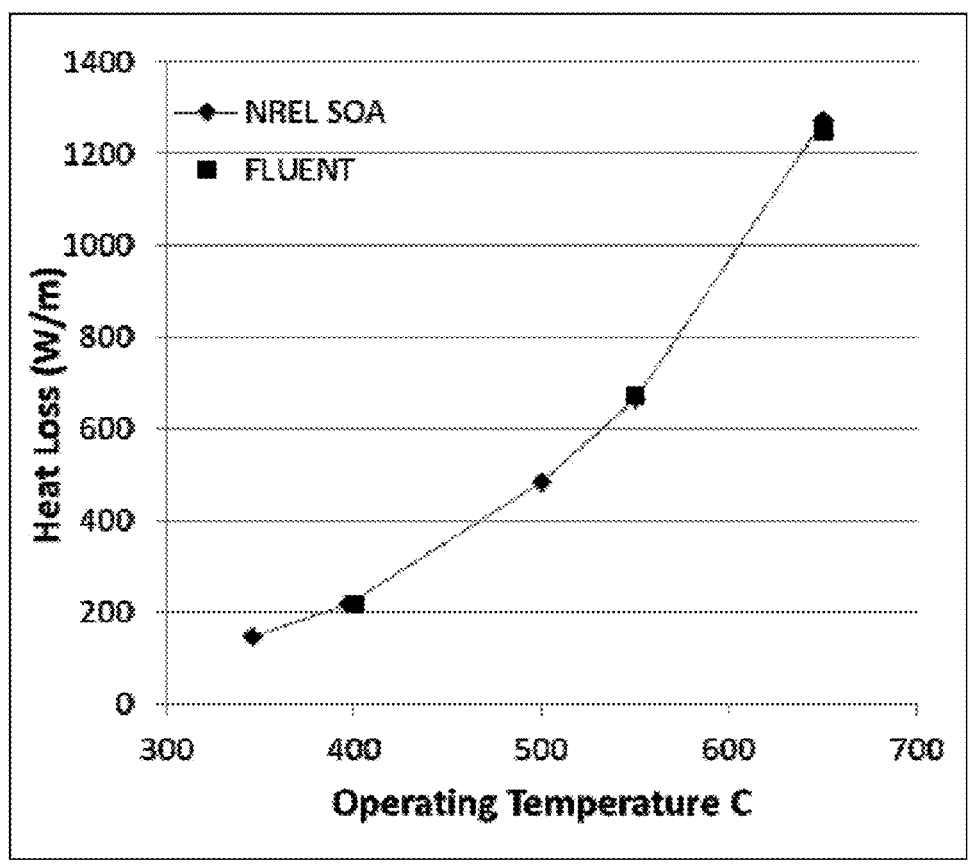
FIG. 6 is a graph comparing experimental and extrapolated data to simulated data, showing that the simulation produces realistic results.

FIG. 6 pertains to the validation of the ANSYS Fluent computational fluid dynamics numerical (computer) model used to predict the performance of a range of novel, advanced cavity receiver designs, including that whose performance is depicted in FIG. 5A and FIG. 5B. Thermal performance of receiver configurations was determined by analyzing the results of radiative-loss, convective-loss, and conductive-loss models in ANSYS Fluent, a comprehensive finite-volume computational fluid dynamics program. Radiative heat transfer losses were solved for using the discrete-ordinates radiation model, in which the spatial domain is discretized into a finite number of directions and the model solves the radiative transfer equation for each discretized direction. The radiation, conduction, and convective heat transfer models are coupled in the Fluent solver through the energy equation and the core Navier-Stokes equations. Fluent can capture the effects of material properties such as surface emissivity and temperature-dependent gas behavior.

Models to study natural convection effects within air-filled receiver designs were tested by comparing to NREL data. The receiver thermal models are based on a two-dimensional cross section of each receiver with a constant-temperature boundary condition at the external surface of the heat-absorbing element. This boundary condition setup reflects parabolic-trough plant operation for a target heat-transfer fluid loop outlet temperature.

The computational fluid dynamics model for the current state-of-the-art receiver is dominated by heat losses due to radiation from the outer surface of the heat-absorbing element; convective and conductive losses through the vacuum to the envelope (and thence to the environment) are negligible. To test the model's realism, the model was first used to predict the heat loss (characterized in watts per meter of receiver) of a conventional vacuum-based receiver (i.e., the Schott PTR70) independently of that receiver's performance as measured and extrapolated in the NREL data. Model values (plotted as black squares) in FIG. 6 match experimental and extrapolated NREL data (plotted as black diamonds in FIG. 6) within 1% for 400° C. and 550° C., and within 3% for 650° C. A convection-only model (omitting radiation) matched heat losses predicted from the Raithby and Holland annular flow heat-transfer correlation within 10% (see Raithby and Holland, "Natural Convection," Ch. 4, *Handbook of Heat Transfer*, Rohsenow W M, Hartnett J P, Cho Y I eds., McGraw-Hill, 1998), which is acceptable given the uncertainty in experimental correlations. As further assurance, our model of a conventional receiver with lost vacuum matched NREL data within 4%.

Figure 7:
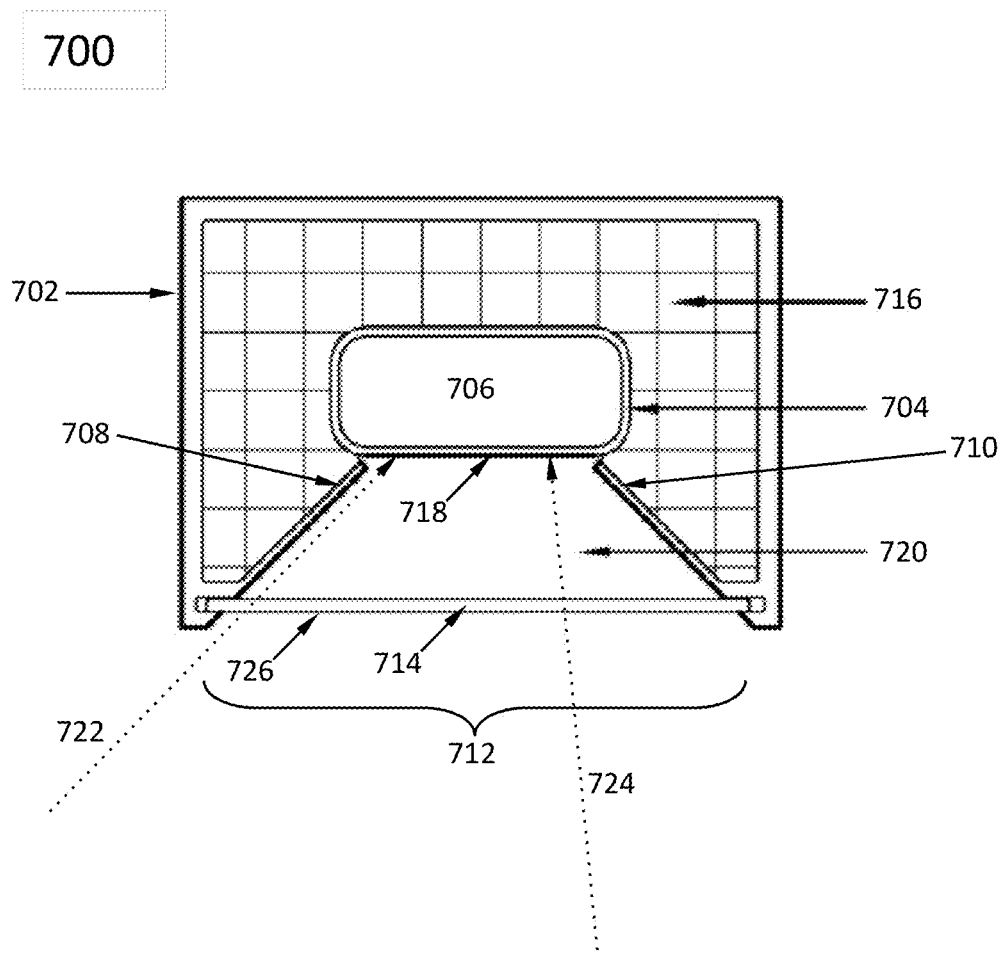
FIG. 7 is a schematic diagram of an illustrative embodiment of an advanced cavity receiver according to the invention.

FIG. 7 cross-sectionally depicts an illustrative receiver that incorporates features of the invention. The illustrative advanced cavity receiver 700 comprises a tubular shell 702, a heat-absorbing element 704 through which a heat-transfer fluid 706 can flow, planar sidewalls 708, 710, an aperture 712, a transparent aperture cover 714 made of glass or another transparent material and spanning the aperture 712, an insulating jacket 716 partially surrounding the heat-absorbing element 704, a substantially planar (flat) absorbing surface 718 coated with an radiation-absorbent coating and exposed to light that enters the aperture 712, and an optical cavity 720 bounded by the absorbing surface 718, sidewalls 708, 710, and aperture cover 714. In other embodiments, the aperture cover 714 could be a partial covering to reduce transmission losses (e.g., see FIG. 30), or could be absent. The receiver 700 is approximately uniform in cross-section along its entire length, apart from mounting and other hardware (not shown) at each end. The optical cavity 720 and other portions of the collector 700 are filled with a gas (e.g., air) at approximately ambient atmospheric pressure.

The receiver cavity sidewalls 708, 710 are sloped at an angle chosen to maximize admission of radiation from a reflective parabolic trough collector (not depicted). Light rays concentrated by the collector (e.g., rays 722, 724) enter the aperture 712 and impinge directly on absorbing surface 718. The insulation may be substantially opaque or be optically transmitting.

Thickness and properties of the insulation 716, along with the dimensions of the shell 702, are chosen as a compromise between minimizing thermal losses and minimizing shadowing of the collector by the receiver. The insulating material maintains low thermal conductivity at high temperatures (>600° C.). The radiation-absorbent coating on the heat-absorbing element 704 has high (e.g., >90%) absorptance and low (e.g., <15%) thermal emittance and is stable at receiver operating temperatures and under indefinite exposure to ambient conditions (air, humidity). The transparent aperture cover 714 may include a coating on its external surface 726 to mitigate reflection of light from the cover 714.

Figure 8:
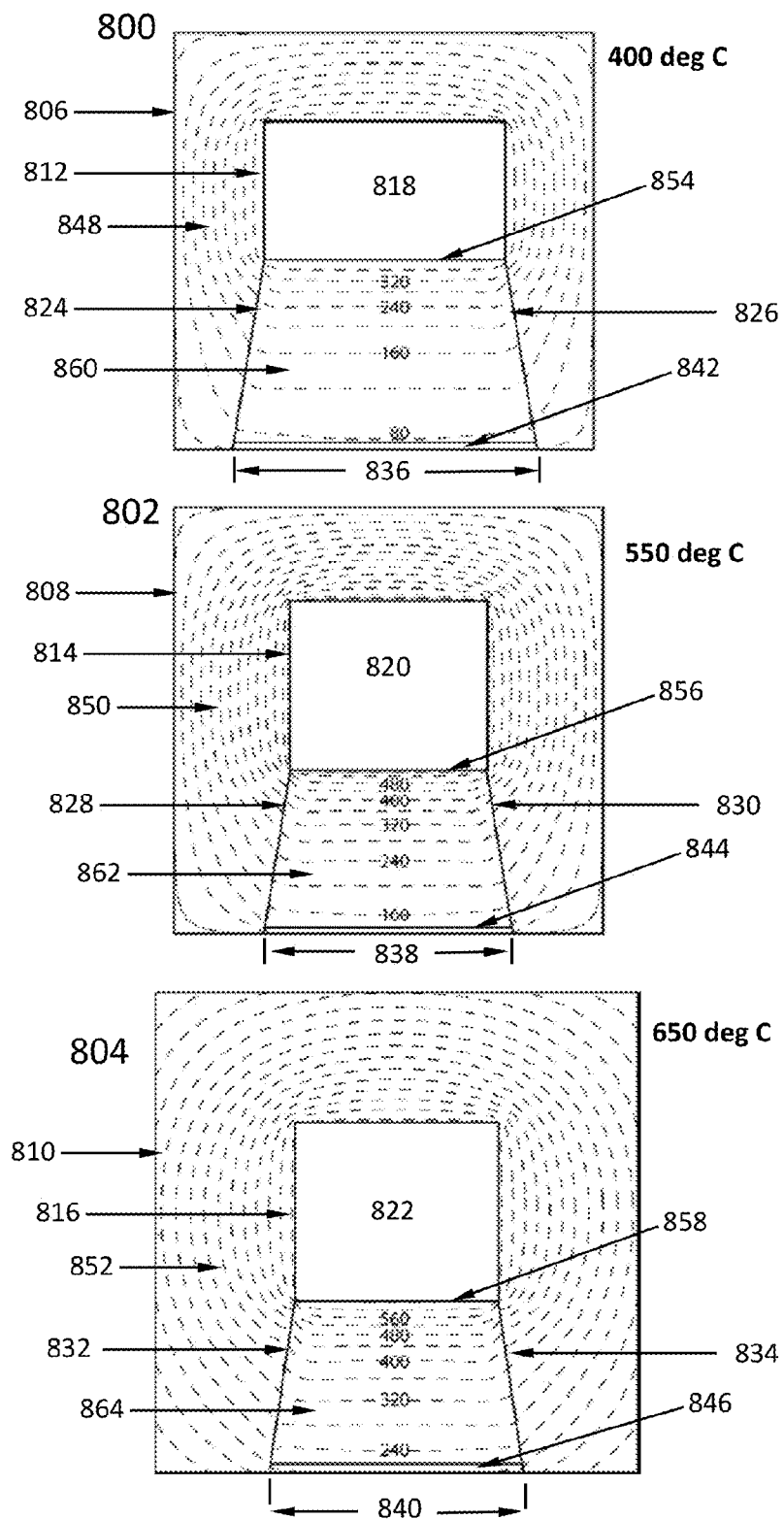
FIG. 8 is a graph of lines of constant temperature in a simulation of three illustrative embodiments of the invention.

FIG. 8 is a cross-sectional plot of simulated contours of constant temperature (degrees Centigrade) in three advanced cavity receivers 800, 802, 804 that embody aspects of the invention. Receivers 800, 802, and 804 all geometrically resemble the illustrative advanced cavity receiver depicted in FIG. 7: i.e., all three receivers 800, 802, 804 comprise a tubular shell 806, 808, 810, a heat-absorbing element 812, 814, 816 through which a heat-transfer fluid 816, 820, 822 can flow, substantially planar sidewalls 824, 826, 828, 830, 832, 834, an aperture 836, 838, 840, a transparent aperture cover 842, 844, 846 spanning the aperture 836, 838, 840, an insulating jacket 848, 850, 852 partially surrounding the heat-absorbing element 812, 814, 816, a substantially planar (flat) absorbing surface (absorber) 854, 856, 858 coated with an radiation-absorbent coating and exposed to light that enters the aperture 836, 838, 840, and an optical cavity 860, 862, 864 bounded by the absorbing surface 854, 856, 858, sidewalls 824, 826, 828, 830, 832, 834, and aperture cover 842, 844, 846 made of glass. Each receiver 800, 802, 804 is approximately uniform in cross-section along its entire length, apart from mounting and other hardware (not shown) at each end. The optical cavity 860, 862, 864 of each collector 800, 802, 804 is filled with air at atmospheric pressure.

The three receivers 800, 802, and 804 differ in the dimensions of certain components and are not necessarily drawn to a common scale in FIG. 8. In particular, receiver 800 has an absorber 854 that is 6 cm wide and an insulating jacket 848 that is 2.25 cm thick (measured at right angles from any point on the lateral or upper surfaces of the heat-absorbing element 818); receiver 802 has an absorber 856 that is 5 cm wide and an insulating jacket 850 that is 3.0 cm thick (measured as for receiver 800); and receiver 804 has an absorber 858 that is 5 cm wide and an insulating jacket 852 that is 3.5 cm thick (measured at right angles from any point on the lateral or upper surfaces of the heat-absorbing element 818).

Receiver 800 is simulated as operating at 400° C. (fixed temperature of the absorber coating), receiver 802 is simulated at operating at 550° C., and receiver 804 is simulated as operating at 650° C. FIG. 8 shows results from a ANSYS Fluent computational model of receiver thermal properties as described above in reference to FIG. 5A and FIG. 5B.

The constant-temperature contours in FIG. 8 show that, as would be expected from elementary physics, in all three receivers 800, 802, 804, the surface temperature of each receiver is lower over the surface of the insulating jacket 848, 850, 852 than at the aperture cover 842, 844, 846, the latter being separated from the heat-absorbing surface 854, 856, 858 only by air. Although the surface area of the non-aperture surface of each receiver 800, 802, 804 is greater than that of the aperture cover 842, 844, 846, the temperature at the aperture cover 842, 844, 846, is so much greater than that over the surface of the insulating jacket 848, 850, 852 that most loss occurs in all designs primarily through the aperture.

Figure 9:
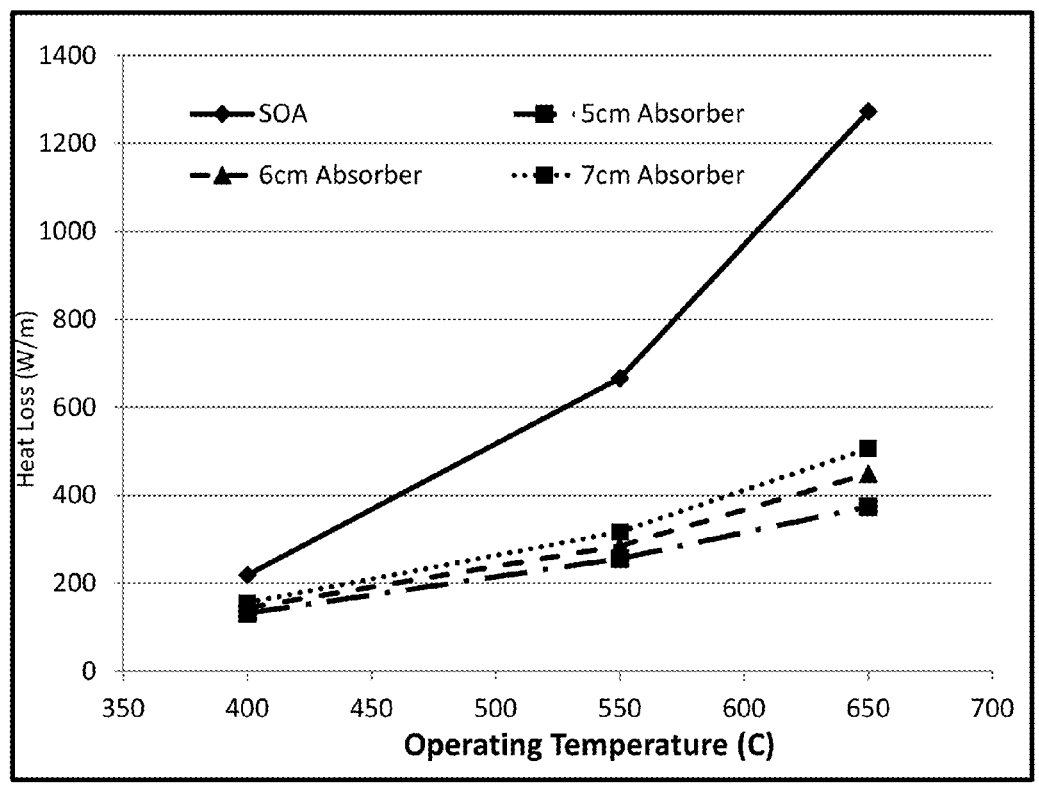
FIG. 9 is a graph of the heat loss per unit length of a receiver employing the prior art as compared to that of illustrative receivers embodying aspects of the invention.

FIG. 9 is a plot of measured and simulated heat loss (watts per meter) for 10 receiver designs, namely a state-of-the-art (SOA) receiver constructed according to the prior art (i.e., the Schott PTR70) and nine illustrative advanced cavity receivers resembling the receiver 700 depicted in FIG. 7 and the receivers 800, 802, and 804 in FIG. 8. The nine illustrative advanced cavity receivers differ in width of absorbing surface and thickness of insulating jacket, as follows:

Design 1 has absorber width 5 cm and insulating jacket thickness 2.25 cm.

Design 2 has absorber width 6 cm and insulating jacket thickness 2.25 cm.

Design 3 has absorber width 7 cm and insulating jacket thickness 2.25 cm.

Designs 1-3 are simulated at 400° C. for FIG. 9.

Design 4 has absorber width 5 cm and insulating jacket thickness 3.0 cm.

Design 5 has absorber width 6 cm and insulating jacket thickness 3.0 cm.

Design 6 has absorber width 7 cm and insulating jacket thickness 3.0 cm.

Designs 4-6 are simulated at 550° C. for FIG. 9.

Design 7 has absorber width 5 cm and insulating jacket thickness 3.5 cm.

Design 8 has absorber width 6 cm and insulating jacket thickness 3.5 cm.

Design 9 has absorber width 7 cm and insulating jacket thickness 3.5 cm.

Designs 7-9 are simulated at 650° C. for FIG. 9.

The simulation condition for receiver 800 in FIG. 8 corresponds to the simulation of Design 2 at 400° C. for FIG. 9; the simulation condition for receiver 802 in FIG. 8 corresponds to the simulation of Design 4 at 550° C. for FIG. 9; and the simulation condition for receiver 804 in FIG. 8 corresponds to the simulation of Design 7 at 650° C. for FIG. 9.

NREL data (i.e., Burkholder and Kutscher 2008, described above for FIG. 5A) for the Schott PTR70 did not exceed 500° C., and the cermet absorber coating of the Schott PTR70 cannot endure prolonged exposure to a temperature of 650° C.; therefore, the heat-loss figures for "SOA" receiver in FIG. 9 for temperatures above 500° C. are based on extrapolation of the NREL data, making the assumption that the cermet absorber coating of the SOA receiver remains stable at such high temperatures. In other words, actual SOA performance would be worse at 550° C. and 650° C. than is depicted in FIG. 9. Figures for the three advanced cavity receivers at all temperatures are based on the ANSYS Fluent simulation tool described above for FIG. 5A and FIG. 6.

FIG. 9 shows that the three illustrative advanced cavity receivers experience lower thermal losses than the SOA receiver at all operating temperatures examined, and that the cavity receiver losses increase much more slowly with temperature than those of the SOA receiver. Also, increasing the width of the heat-absorbing surface (absorber) increases thermal losses (albeit modestly) across the three advanced-cavity receiver designs (5 cm, 6 cm, 7 cm absorber width). This is as expected, since increased absorber area increases the area for energy loss through infrared radiation. FIG. 9 thus also illustrates the advantage, in general, of decreasing absorber area (e.g., through use of a planar rather than a curved heat-absorbing surface of given width).

Another design consideration relevant to the nine advanced cavity receiver designs simulated for FIG. 9 is that there is a tradeoff between increasing insulation thickness and decreasing overall efficiency. Increasing insulation thickness decreases thermal losses, but increases shadowing of the collector by the receiver: e.g., for a collector having a 5 m aperture, each addition cm of insulation thickness on each side of the heat-absorbing element will increase shadowing of the collector by approximately 0.2%, and so reduce system optical efficiency by approximately 0.2%. In general, the optimum insulation thickness will be that which maximizes overall energetic efficiency of the collection system.

FIG. 10 illustrates terms used herein as they pertain to a receiver 1000 mounted above a trough mirror 1002 having a uniform, parabolic cross-section and parallel to the receiver 1000. The collector "aperture length" is the length of a line segment perpendicular to the collector 1000 and connecting the rims of the mirror 1002. The collector "focal length" is the length of a line segment 1006 connecting the vertex 1008 of the parabola to the focus 1010 of the parabola. The receiver 1000 is located at or near the focus 1010. The "rim angle" 1012 of the collector is the angle between line segment 1006 and a second line segment 1014 perpendicular to the axis of the receiver 1000 and connecting the focus 1010 to a point 1016 on the rim of the collector 1002. The rim angle extent is the same on either side of bisecting line 1006.

Gossamer's extremely low angular error derives from the novel space-frame technology that the company has perfected. Per NREL/Sandia testing, Gossamer's standard 7.3-m trough, which is commercially ready, offers up to 99.3% intercept factor on a PTR70 (70 mm receiver tube), where standard designs are usually <96%), and an unprecedented 104× concentration factor.

In addition to the support offered by angular accuracy to a smaller cavity opening, a flatter reflector profile may enable designs that are more rigid and less susceptible to torsional errors and wind disturbances. Some studies suggest that wind-induced imperfections are a significant factor, and that a more planar structure may be of benefit.17 In general, the design of our cavity opening will exploit recent impressive advances in collector optical error (i.e., Gossamer at <2 mrad).

Figure 11:
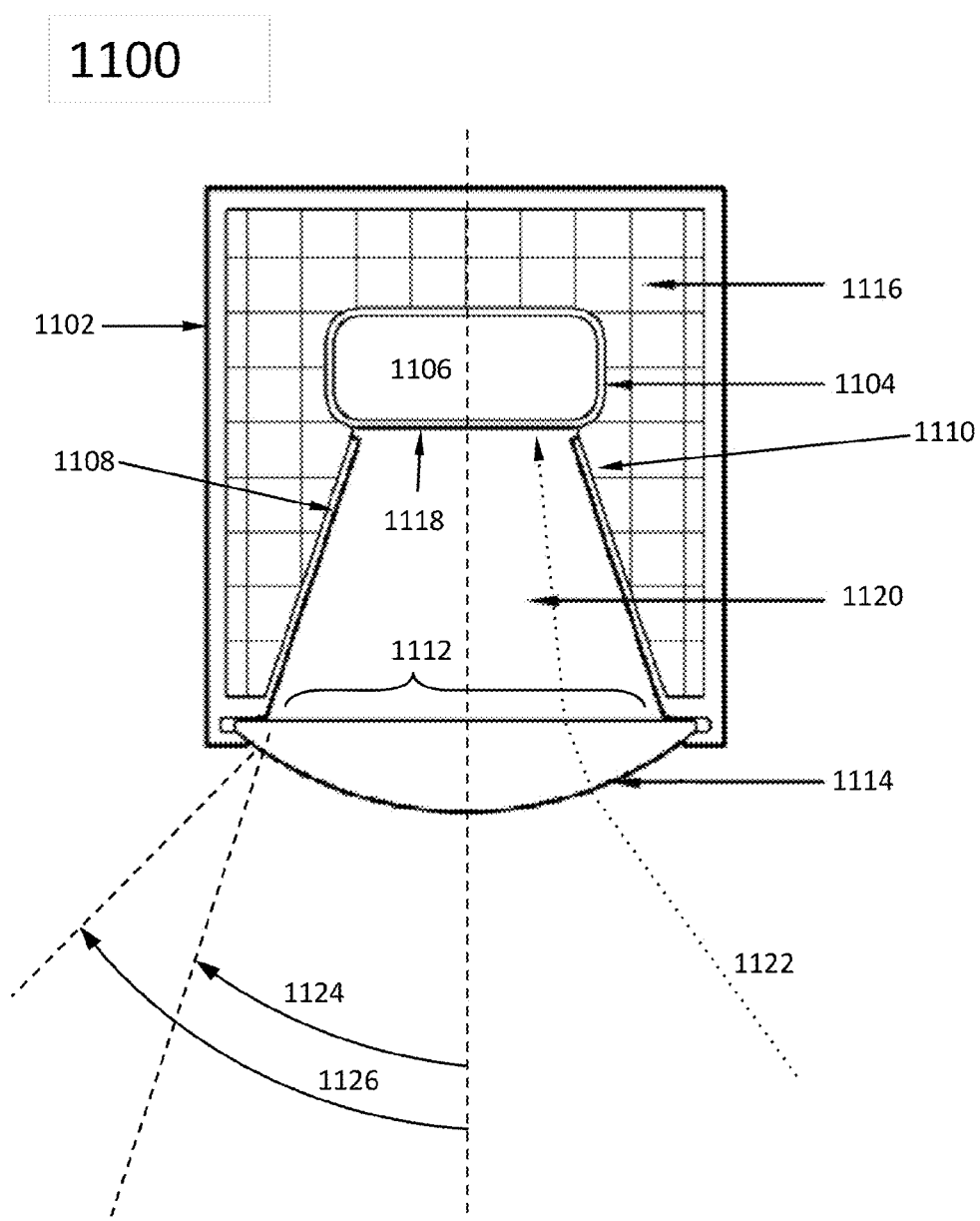
FIG. 11 is a schematic diagram of an illustrative embodiment of an advanced cavity receiver according to the invention, including a lenticular aperture cover.

FIG. 11 cross-sectionally illustrates an illustrative advanced cavity receiver 1100 embodying aspects of the invention. The illustrative advanced cavity receiver 1100 comprises a tubular shell 1102, a heat-absorbing element 1104 through which a heat-transfer fluid 1106 can flow, planar sidewalls 1108, 1110, an aperture 1112, a transparent aperture cover 1114 spanning the aperture 1112, an insulating jacket 1116 partially surrounding the heat-absorbing element 1104, a substantially planar (flat) absorbing surface 1118 coated with an radiation-absorbent coating and exposed to light that enters the aperture 1112, and an optical cavity 1120 bounded by the absorbing surface 1118, sidewalls 1108, 1110, and aperture cover 1114. The receiver 1100 is approximately uniform in cross-section along its entire length, apart from mounting and other hardware (not shown) at each end. The optical cavity 1120 and other portions of the collector 1100 are filled with a gas (e.g., air) at approximately ambient atmospheric pressure.

With a planar aperture cover (e.g., cover 714 in FIG. 7) having no tendency to refract incident light, the receiver 1100 would be compatible with a first rim angle 1124: that is, light rays incident at a rim angle greater than that defined by the sidewalls 1108, 1110 would not travel directly to the absorbing surface 1118 (although they might, in various embodiments, be absorbed and re-radiated by a sidewall 1108, 1110 or be reflected therefrom to the absorbing surface 1118). The aperture cover 1114 is lenticular in cross-section, having a planar upper surface and a convex lower surface. Light directed upon on the aperture cover 1114 by a parabolic collector (not shown) is refracted by the aperture cover 1114 toward the absorbing surface 1118. An exemplary light ray 1122 shows how the lenticular aperture 1114 directs light toward the absorbing surface 1118. With a lenticular aperture cover 1114, the receiver 1100 is compatible with a second rim angle 1126 that is larger than the rim angle 1124 that would be compatible with a similar receiver equipped, instead, with a planar aperture cover. That is, light rays incident at a rim angle 1126 greater than that defined by the sidewalls 1108, 1110 are collected by the lenticular aperture cover 1114 and directed to the absorbing surface 1118. One advantage conferred by the inclusion of a lenticular aperture cover 1114 is that for a given rim angle (i.e., collector geometry), a collector 1100 having a narrower, deeper optical cavity 1120 and thus, in general, lower thermal losses will be feasible. In various embodiments, to reduce thermal losses it is in general advantageous to minimize absorber width and optical cavity width.

FIG. 12 cross-sectionally illustrates an illustrative advanced cavity receiver 1200 embodying features of the invention. Receiver 1200 resembles receiver 1100 in FIG. 11, but includes a lenticular aperture cover 1202 having a different cross-sectional shape. The lenticular aperture cover 1202 has a concave upper surface and a convex lower surface. If equipped with a planar aperture cover, receiver 1200 would accept light from a maximum rim angle 1204; if equipped with a lenticular aperture cover resembling that in FIG. 11, receiver 1200 would accept light from a greater maximum rim angle 1206; with the lenticular aperture cover shape depicted in FIG. 12, receiver 1200 would accept light from a yet greater maximum rim angle 1208. FIG. 11 and FIG. 12 illustrate how lenticular aperture-cover geometry can influence overall collector geometry and thus collector efficiency.

FIG. 13 depicts Zemax simulations of a receiver/collector geometry typical of a state-of-the-art receiver (e.g., the Schott PTR70). For the reader's convenience, the upper portion of FIG. 13 (FIG. 13A, FIG. 13B and FIG. 13C) shows the geometry without numerical labels. The lower portion of FIG. 13 (FIG. 13D, FIG. 13E and FIG. 13F) shows the geometry with numerical labels. Reference is now made to the lower portion of FIG. 13.

The left-hand panel (FIG. 13D) shows how parallel light rays 1302 from a solar source are focused by a parabolic collector 1304 onto a receiver tube 1306. In this figure, the source is modeled as having a spatially homogeneous distribution and a uniform angular distribution within a 4.7-mrad-radius disk, corresponding to the angular extent of the Sun. In a magnified view of the receiver (FIG. 13E), reflected rays from the collector 1304 are shown to strike the receiver envelope directly 1308, be refracted by the envelope glass 1310 and strike the absorbing tube of the receiver 1312. One notable ray 1314 strikes the receiver envelope directly from the solar source, is refracted by the envelope glass and escapes the receiver. The furthest right panel (FIG. 13F) depicts the complex interaction between a single light ray and the receiver materials. Here, a single ray 1316 incident from the collector results in many subsequent rays due to surface interactions due to refraction, partial reflection 1320 and scattering 1322 (e.g., by the absorbing surface 1318. In this model, each glass receiver surface 1324, 1326 is coated with an idealized material that transmits approximately 98% of the incident light (independent of incidence angle) and specularly reflects the remaining 2%. The transmittance of the glass envelope tube is approximately 96% and is consistent with figures from literature for the state-of-the-art receiver. The absorber tube surface 1318 is modeled such that 95% of incident light is absorbed and the remaining 5% is scattered according to a Lambertian model. Because we are currently focused on receiver optical performance numbers, the collector is modeled as being 100% reflective and free of dirt.

The Zemax software tool rigorously accounts for energy in the simulated system and as a result, can be used to evaluate critical parameters such as the optical efficiency. For example, a power of 1 W was assigned to the solar source used in the simulated system shown in FIG. 13. To measure the collected light, a series of cylindrical detectors were used to determine the fraction of incident light that ultimately reached the central absorber surface. A first detector placed across the entire width of the collector aperture (1304) determined the total amount of radiation incident on the collector. This detector measured 0.926 W (for a 100,000 ray Monte Carlo simulation)—this value is consistent with the source size, which was selected to extend somewhat beyond the collector. A second cylindrical detector was positioned just outside the receiver glass envelope (1310)—this source also measured 0.926 W, indicating that in the simulation the all light from the parabolic collector strikes the receiver, despite the angular extent of the sun. A third cylindrical detector, positioned immediately inside the glass envelope, determined the amount of radiation lost due to reflection at the glass interfaces. This detector measured 0.888 W. This 4% loss relative to the previous detector is consistent with stated values in the literature. The final detector recorded the amount of radiation that was absorbed by the central tube. This detector measured 0.844 W, corresponding to a 95% which is consistent with the value of the tubes' absorptivity. The overall efficiency of the receiver is 0.844 W/0.926 W=91%. With the inclusion of 2% for shading and optical errors, this value closely matches that stated in the literature.

Figures 14A, 14B, 14C:
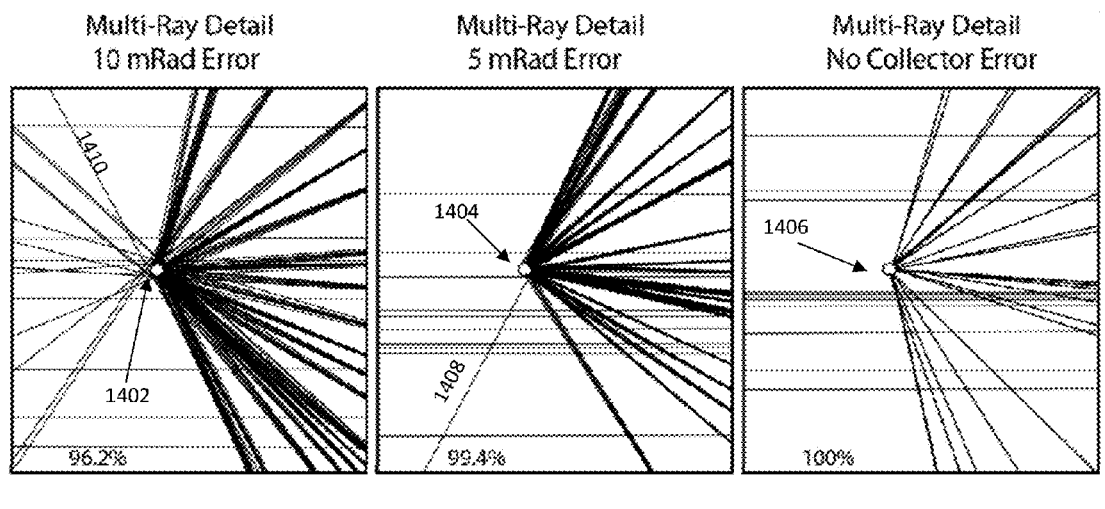
FIG. 14A through FIG. 14C show ray tracings for light focused upon a concentric-tube receiver geometry, incorporating collector focusing errors.

FIG. 14 demonstrates the ability of Zemax to incorporate collector errors into the model. In this method a prescribed amount of scattering is implemented at the collector surface allowing for uncertainty in the ray paths to be introduced in a controllable manner. This Gaussian error distribution combines with the angular extent of the sun to determine the focal volume. Another method of introducing collector error would be to model specific mirror deformations and calculate the resulting focus degradations directly. FIG. 14 shows the percentage of radiation from the collector that strikes a 7-cm-diameter receiving tube (1402, 1404, 1406) for a 10 mrad (FIG. 14A), 5 mrad (FIG. 14B) and 0 mrad (FIG. 14C) collector errors. In FIG. 14C the rays exhibits a finite focal volume (i.e., the rays do not intersect at a single point but in a volume sized such that all rays strike the receiver) due to the sun only. When the collector error is increased to 5 mrad (FIG. 14B), 0.6% of the light rays (e.g., light ray 1408) now miss the circular tube, while for a collector error of 10 mrad (FIG. 14A), the mirror errors have expanded the focal volume such that a significant fraction of energy (3.8%) misses a 7-cm-diameter receiver tube (e.g., light ray 1110).

Current collector designs have a typical error of 5.4 mrad resulting in a simulated collector optical efficiency of approximately 99% for a typical state-of-the-art vacuum tube system. When combined with the 91% simulated receiver efficiency for a perfect mirror, the total optical efficiency of the simulated collector/receiver system is 90% excluding shading of the collector by to the metal bellows. With inclusion of bellows shading, the result is comparable to the 89% efficiency of the SOA system found in the literature. The very close correspondence of these numbers serves to validate our optical modeling of the radiation concentration, transmittance, and absorption processes of a SOA collection-receiver system.

Investigations into reducing collector optical errors set a total system error target of 2.5 mrad. These reductions are regarded as being attainable given the ~1.5 mrad errors achieved by dish-Stirling prototypes. Typical system errors are currently 5.4 mrad. The target value was based on reducing, the slope, alignment, tracking and wind loading errors to 1, 0.5, 1, and 2 respectively, giving an overall system error of 2.5 mrad. Industry has made progress towards these goals with Gossamer Space Frames recently reporting that their slope error is close to 1.1 mrad. In our analysis of an optimized system for the planar receiver a more conservative target of 3 mrad is used.

For a collector error of 5.4 mrad, 99% of incident light hits a 7 cm diameter absorber tube. Therefore, the majority of optical losses in the state-of-the-art design do not occur from rays missing the absorber. In the model, optical losses are primarily due to the fact that the transmittance of the glass envelope and absorptivity of the absorbing surface are not 100%. In addition, optical performance will be reduced by bellows shading (~1-2%), and from non-ideal mirror reflectivity and cleanliness. These losses will occur in all systems that involve a mirror, glass tube and absorber tube. Various embodiments of this invention may have an optical advantage relative to the state-of-the-art design through the elimination of a glass cover and by eliminating bellows shading.

Figure 15A:
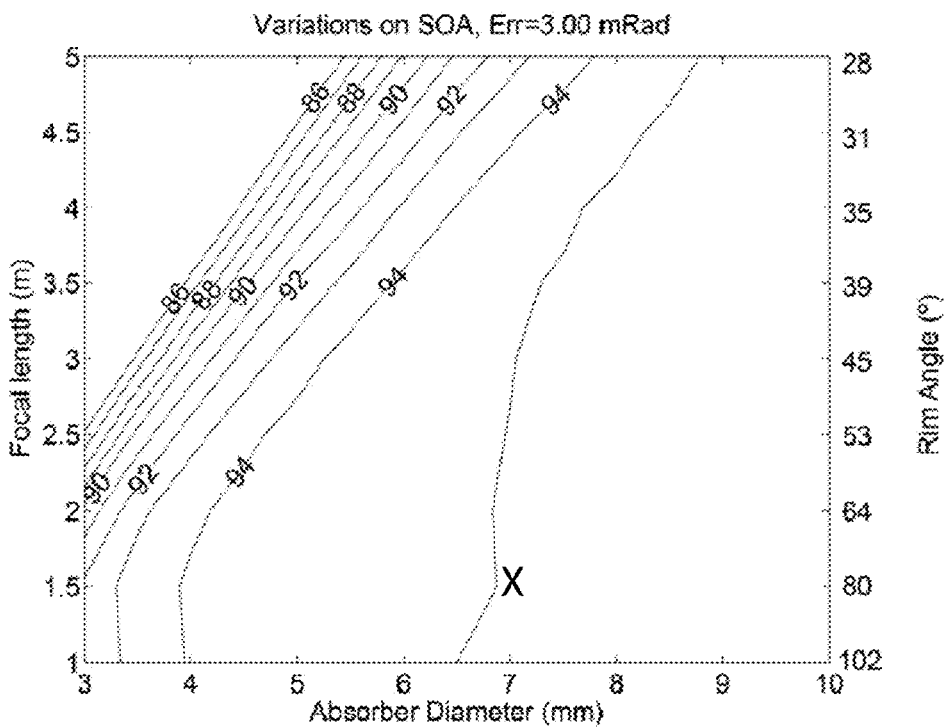
FIG. 15A and FIG. 15B are graphs of the optical efficiency of a system as a function of collector focal length and the diameter of the receiver's absorber absorber for specified collector errors.
Figure 15B:
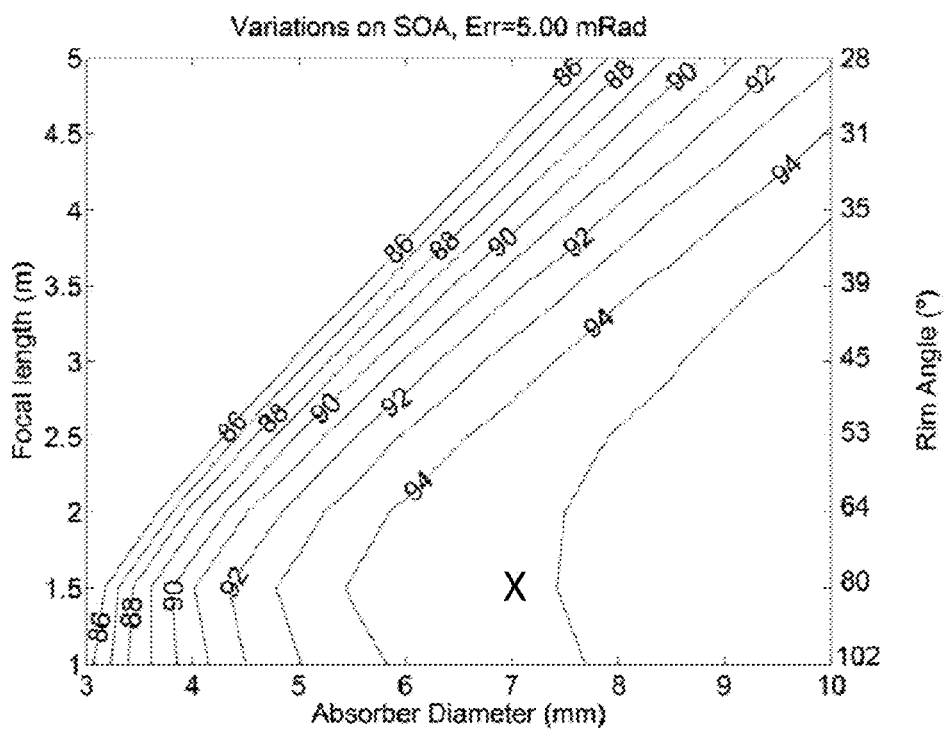

FIG. 15 depicts the optical efficiency of embodiments of the invention that varies the focal length and size of receiver tube as means of reducing thermal losses without a loss in optical efficiency. In this figure, the optical efficiency assumes that the absorbing tube has 100% absorptivity as opposed to 95% (as in FIG. 13), to focus on the geometric factors that affect optical efficiency. In these simulations, the geometry of the receiver envelope is kept constant and consistent with the Schott PTR70 receiver. The inner and outer glass surfaces have a transmittance of 98% and the collector aperture is fixed at 5 m. FIG. 15 shows the effects of modifying the absorber diameter and focal length on the optical efficiency of the system for collector errors of 3.0 mrad (FIG. 15A) and 5.4 mrad (FIG. 15B). FIG. 15 demonstrates that the Schott PTR70 is already well-optimized for optical efficiency. Further increases to the absorber diameter do not significantly increase the optical efficiency but will act to reduce thermal efficiency. Likewise, for a collector error of 5.4 mrad, the optimal performance deteriorates rapidly as the absorber diameter decreases from 6 cm to 3 cm. The analysis demonstrates that a focal length of 1.5 m (rim angle of 80°) as used in the Schott PTR70 is optimal for a cylindrical receiver. At larger focal lengths, more of the incident light misses the receiver to due to the increased spreading of the light as a result of collector errors and the angular distribution of the sun.

Figure 16:
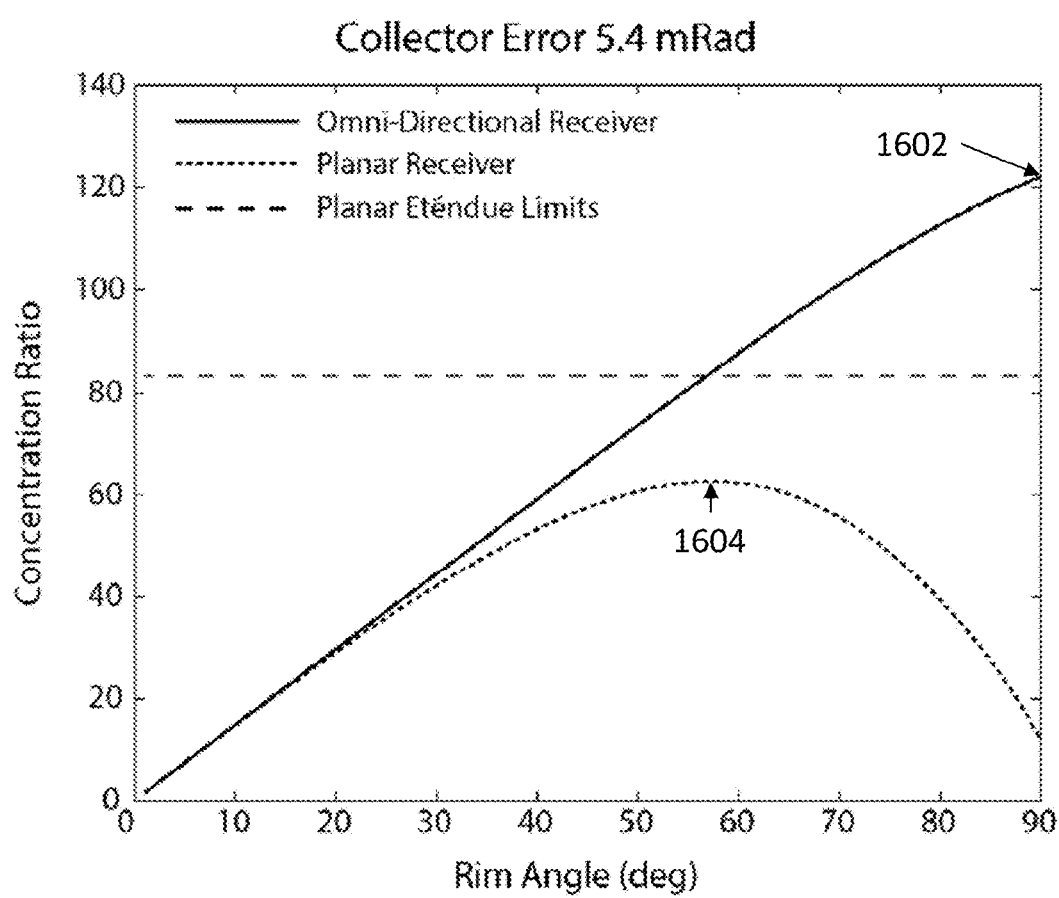
FIG. 16 is a graph of the relationship between system concentration ratio (focal spot size) and collector rim angle for a receiver.

FIG. 16 depicts a theoretical geometric analysis of the focal-spot size of a planar receiver and a cylindrical receiver for a linear trough. The acceptance angle (typically the sum in quadrature of the solar angular extent and the collector errors) is projected from the collector to the receiver in order to determine a focus extent. In this analysis, the calculated focal size is chosen so that approximately 95% of the reflected light from the collector strikes the receiver. The focal size is affected by the collector error and the angular distribution of the sun. In this calculation the collector error is 5.4 mrad and the angular distribution of the sun is 4.7 mrad. The concentration ratio is defined as the collector aperture diameter divided by the absorber width for a planar receiver and collector aperture diameter divided by absorber diameter for a cylindrical receiver.

For a given collector error, the theoretical planar receiver has a lower maximum concentration ratio than a cylindrical receiver. The higher concentration ratio of the cylindrical receiver does not necessarily correspond to an improved thermal performance since the exposed area of the cylindrical absorber is the circumference and not the diameter. The rim angle that produces the maximum concentration ratio is smaller for the planar receiver than the cylindrical receiver. For a planar receiver the optimum rim angle is 55-65° (1602), as compared to 90° (1604) for the cylindrical receiver. This analysis does not include the effects of shadowing of collector by the planar receiver or the reduction in optical efficiency from a glass envelope or covering. The maximum concentration ratio of the planar receiver can be improved through the use of secondary non-imaging optics such as a compound parabolic concentrator, a lens or other non-imaging optical devices.

Figure 17A:
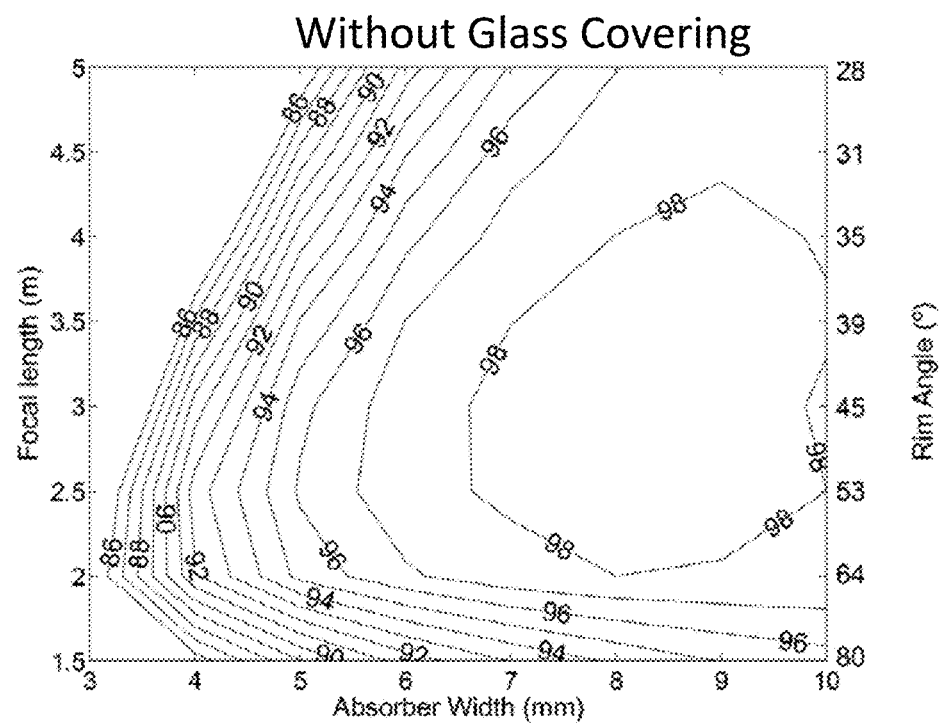
FIG. 17A and FIG. 17B graph the optical official of a receiver having a planar absorbing surface for a range of absorbing-surface widths, collector focal lengths and glass-covered or uncovered apertures.
Figure 17B:
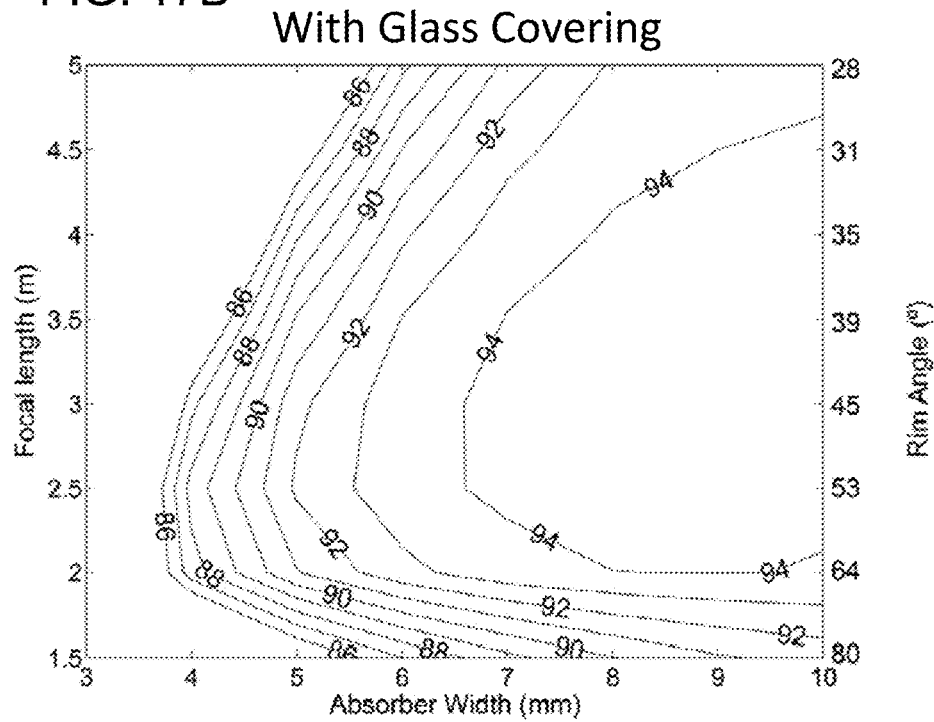

FIG. 17 shows the optical efficiency of a planar receiver calculated using Zemax for a range of focal lengths and absorber widths. In this analysis the collector diameter was fixed at 5 m and the collector error set to be 3 mrad. The optical efficiencies of a receiver without a glass cover included at the base of the cavity are shown in FIG. 17A and the optical efficiencies of a receiver with a glass cover are shown in FIG. 17B. When glass is used in the receiver design the maximum optical efficiency is approximately 1% lower than the state-of-the-art design. The improvement in optical efficiency is approximately 3-4% in the embodiment where a glass covering is not included which is consistent with the transmittance percentage of the glass. The optimal focal length (rim angle) for a planar design is longer (smaller) than for the state-of-the-art which is consistent with theoretical analyses shown in FIG. 16.

Figure 18:
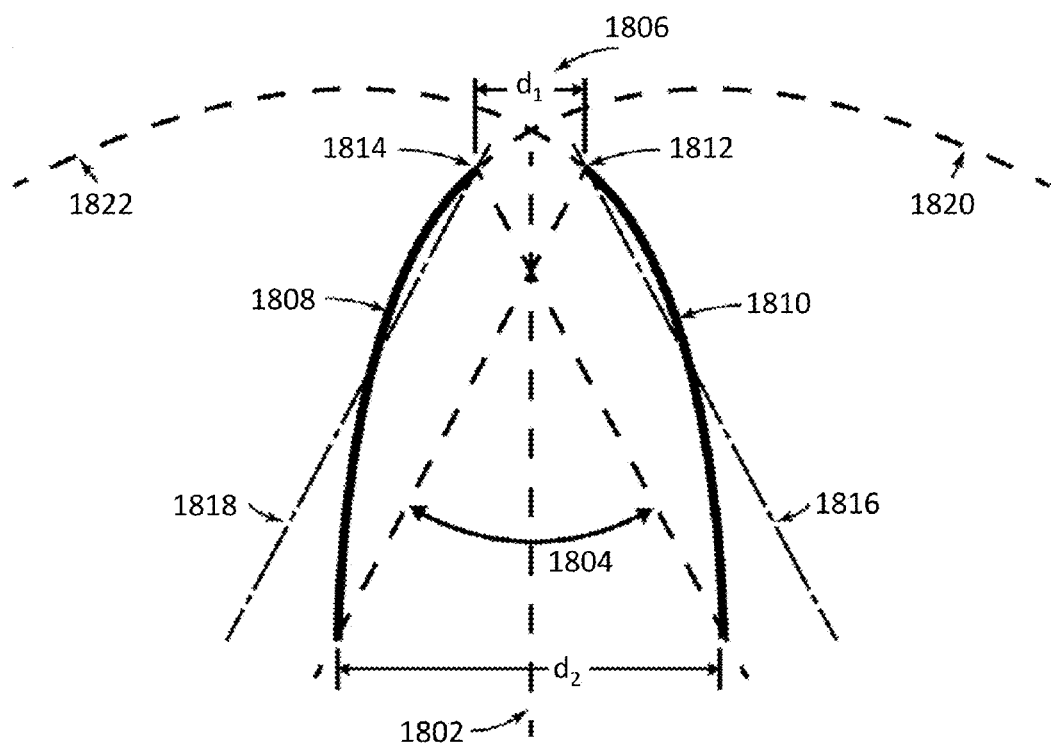
FIG. 18 illustrates the geometry of a compound parabolic concentrator.

FIG. 18 shows the geometry for the compound parabolic concentrator (CPC), which is a non-imaging optical device used to concentrate light incident on a planar entrance aperture. A CPC is used to concentrate light incident on a planar entrance aperture of length $d_2$ (1802), within an acceptance angle 1804, to a smaller exit aperture of length $d_1$ (1806). The exit aperture 1806 may be occluded by, e.g., the absorbing surface of a heat-absorbing element. The light at the exit aperture will necessarily occupy a larger propagation angle, as dictated by étendue considerations. The CPC consists of two parabolic mirrors (1808, 1810), which form the entrance aperture (1802) and receiver opening (1806). The truncated portions of parabolic mirrors 1808 and 1810 are shown by sections 1820 and 1582 respectively. Provided that light enters the CPC within the acceptance angle (1804), it will exit the receiver opening either directly or after one reflection from the CPC walls. The focal point of parabola 1808 is on parabola 1810 and is located at 1812. The focal point of parabola 1810 is on parabola 1808 and is located at 1814. If the incoming light is parallel to the parabola axis (i.e., first axis 1816 for parabola 1808, second axis 1818 for parabola 1810), then the light will be focused on the relevant focal point. If the light enters at an angle of less than half of the acceptance angle the light will be focused onto the receiver opening (1806). If the light enters an angle greater than half of the acceptance angle then the light may be reflected back out of the aperture opening.

Assuming the exit aperture (dictated by the desired receiver size) and the acceptance angle ($\theta$), which will depend on the collector rim angle, are defined, the entrance aperture is given by $$d_2 = \frac{d_1}{\sin(\theta/2)}$$

and the CPC length (L) is given by $$L = \frac{d_1[1 + \sin(\theta/2)]}{2\tan(\theta/2)\sin(\theta/2)}.$$

These equations are sufficient to fully specify the CPC. The concentrating power of the CPC increases as the acceptance angle (and rim angle decreases). However as the rim angle decreases the length of the CPC increases. In addition, the increased width of the CPC at lower rim angles increases shadowing of the collector by the receiver reducing optical efficiency. The length and width of the CPC becomes prohibitive to the use of lower rim angles (longer focal lengths).

FIG. 19A and FIG. 19B compare the optical efficiencies of a planar receiver with a 100% reflective CPC (FIG. 19A1, FIG. 19B1) and 95% reflective CPC (FIG. 19A2, FIG. 19B2) for a range of absorber sizes and focal lengths.

Reference is now made to FIG. 19A, which pertains to a receiver without a glass aperture cover. When the CPC is 100% reflective (FIG. 19A1) the optical efficiency is improved for smaller absorber widths compared to the embodiment without a CPC (FIG. 18). This improvement corresponds to an increase in the concentration ratio for a given optical efficiency. However, the CPC increases the shadowing of the collector as evidenced by the decrease in optical efficiency for larger absorber size. Since the concentration ratio (and therefore width) of the CPC increases at larger focal lengths (smaller rim angles), this effect is more apparent when the focal length is longer.

When the reflectivity of the CPC is reduced to 95%, the optical efficiency and concentration ratios are reduced. At a focal length of 2.5 m and an absorber width of 7 cm the optical efficiency is decreased approximately 2-3% compared to the 100% reflective CPC. The optimum focal length for a given absorber size is decreased when the CPC reflectivity is reduced from 100% to 95%. The optical efficiency of the planar receiver with 95% reflective CPC is lower than the planar receiver without a CPC over much of the range of absorber widths and focal lengths. However, the optical advantage of the CPC is still apparent at lower absorber widths and longer focal lengths.

Reference is now made to FIG. 19B, which pertains to a receiver with a glass aperture cover. The addition of glass to the bottom of the receiver decreases the optical performance universally by approximately 4%. A glass covering may be included to reduce thermal losses at the base of the receiver due to forced convection from the wind. When glass is included, the peak optical efficiency of the receiver with a 95% reflective CPC (FIG. 19B2) is 3% lower than the Schott PTR70. Without glass, the optical performance of this receiver exceeds that of the Schott PTR70 by 1%.

Figure 20A:
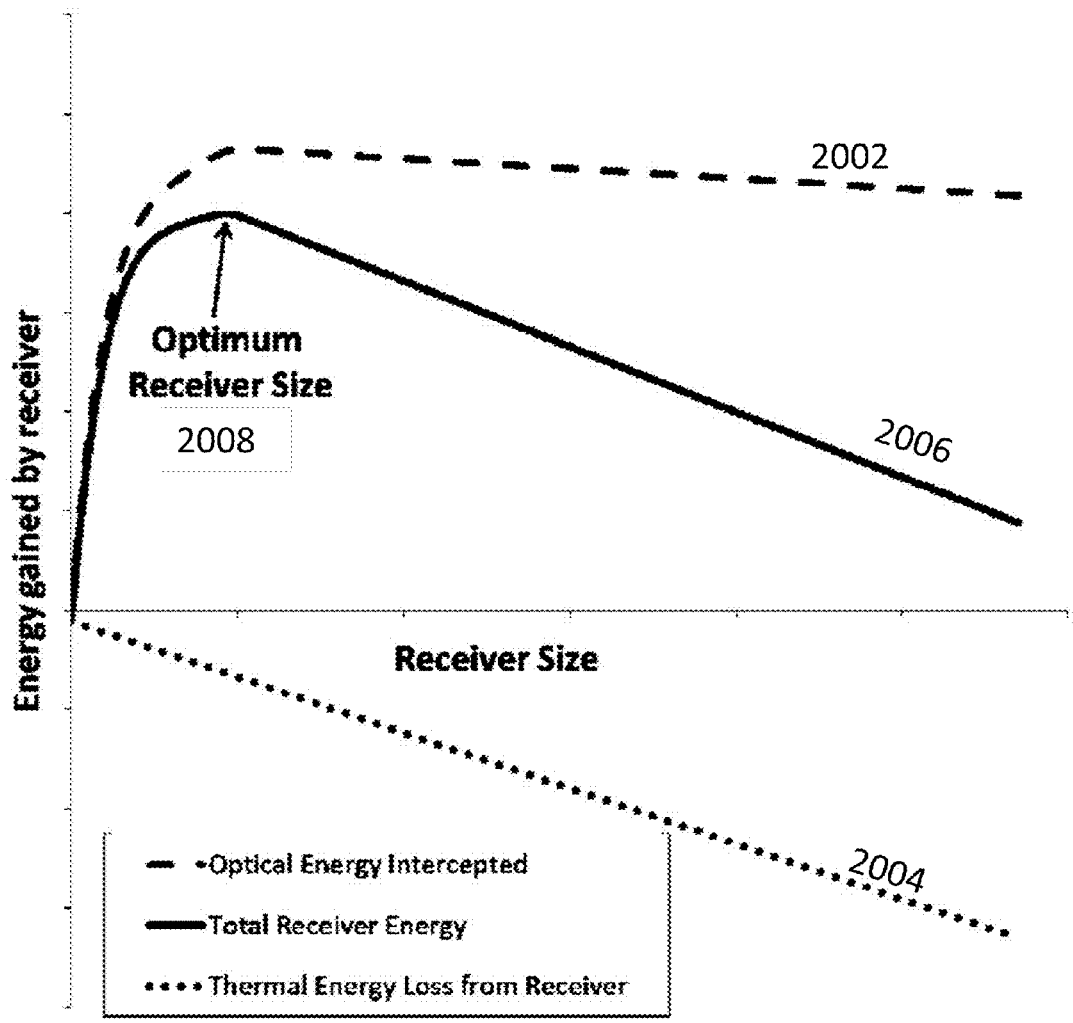
FIG. 20A and FIG. 20B display illustrative graphs of energy gained and lost by a receiver as a function of absorbing-surface width.
Figure 20B:
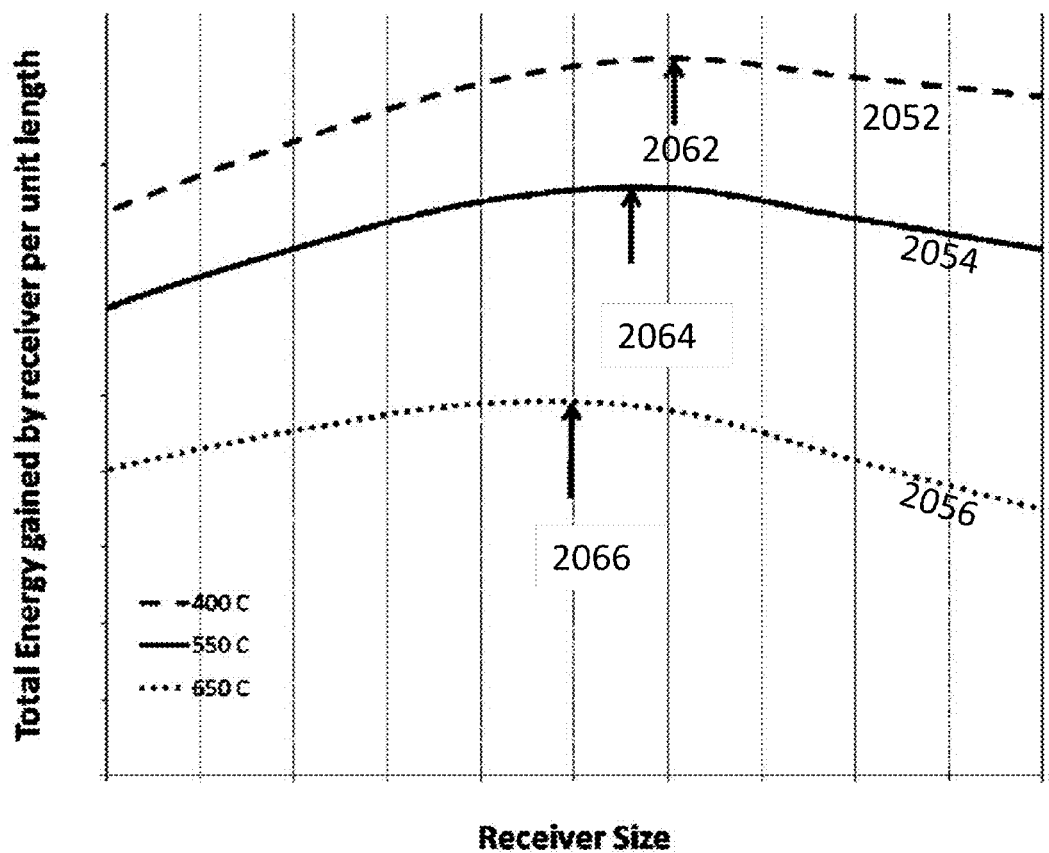

FIG. 20A and FIG. 20B display illustrative plots relevant to the invention. Specifically, the illustrative plots may be employed in a method whereby the optimum receiver size (e.g., width of the heat-absorbing surface 418 in FIG. 4) is determined for a given temperature of operation of the heat-transfer-fluid (e.g., fluid 406 in FIG. 4) by maximizing the performance of the receiver at that operating temperature.

FIG. 20A displays a plot of energy gained by the receiver versus receiver size. The energy gained by the receiver is plotted on the y-axis and is based on optical and thermal analyses. The x- and y-axes are not given numeric values, as the general shape of the three curves are universal and demonstrate the procedure for determining the optimal point.

The optical energy intercepted 2002 is calculated from ray-tracing software (Zemax) and based on parameters such as optical error, receiver size, mirror size, and mirror shape. The energy gained is calculated from the power per unit length (e.g., Watts/meter) intercepted by the receiver in the ray-tracing software. The characteristic shape of the optical energy intercepted by the receiver as a function of receiver size is displayed in FIG. 20A. where optical energy intercepted increases rapidly with receiver size until all the light is intercepted (just about the point 1708, i.e., optimum receiver size). For a given size mirror (e.g., 5 meters), optical error (e.g., 5 mrad), nearly all (e.g., over 99%) of the optical radiation is intercepted for a planar a given receiver size (e.g., 10 cm). After that, the optical energy intercepted stays almost constant, as indicated by the long nearly flat part of the curve, with a slight decrease due to shading caused by the larger receiver size.

The thermal energy lost from the receiver 2004 is calculated from CFD software (ANSYS Fluent) and based on parameters such as receiver size, heat transfer fluid temperature, absorber emissivity, and heat transfer properties. The energy lost is calculated from the power (heat) per unit length (e.g., Watts/meter) transferred to the environment in the CFD software. The characteristic shape of the thermal energy loss by the receiver as a function of receiver size is displayed in FIG. 20A, where thermal energy loss increases nearly linearly with receiver size (exposed absorber size).

The total energy gained by the receiver 2006 is calculated as the sum of the optical energy gained 2002 and thermal energy lost 2004. To maximize the total energy gained by receiver, the receiver size would be chosen as the peak 2008 of the curve 2006. This optimum receiver size 1708 is dependent on operating parameters such as operating heat transfer fluid temperature, absorber emissivity, receiver heat transfer properties, optical error, mirror size, and mirror shape. In this manner, optimum receiver size can be determined, improving overall performance of a solar trough-based concentrating solar plant.

FIG. 20B displays three plots of energy gained by the receiver versus receiver size for different heat transfer fluid temperatures. The energy gained by the receiver is plotted on the y-axis and is based on the same optical and thermal analyses described in FIG. 20A. The x and y axes are not given numeric values, as the general shape of the three curves are universal and demonstrate the procedure for determining the optimal point.

The y axis displays the total energy gained by the receiver and, as in FIG. 20A, is calculated as the sum of the optical energy gained and thermal energy lost. Three curves are shown for different heat transfer fluid temperatures within the receiver: curve 2052 displays the total energy gained by the receiver for a heat transfer fluid temperature of 400° C., curve 2054 displays the total energy gained by the receiver for a heat transfer fluid temperature of 550° C., and curve 2056 displays the total energy gained by the receiver for a heat transfer fluid temperature of 650° C. Other operating parameters such as absorber coating, receiver heat transfer properties, optical error, mirror size, and mirror shape are kept the same for the three analyses. The optimum receiver size can be determined for each operating temperature: point 2062 represents the optimum receiver size for 400° C., point 2064 represents the optimum receiver size for 550° C., and point 2066 represents the optimum receiver size for 650° C. Receiver size can be varied within a solar trough-based concentrating solar plant based on temperature to improve overall plant performance. Likewise, if for manufacturability, cost, or other reasons, a single receiver size is preferred for a solar trough-based concentrating solar plan, a single optimum receiver size can be determined averaging over temperatures and parameters, improving overall performance of a solar trough-based concentrating solar plant.

Figure 21A:
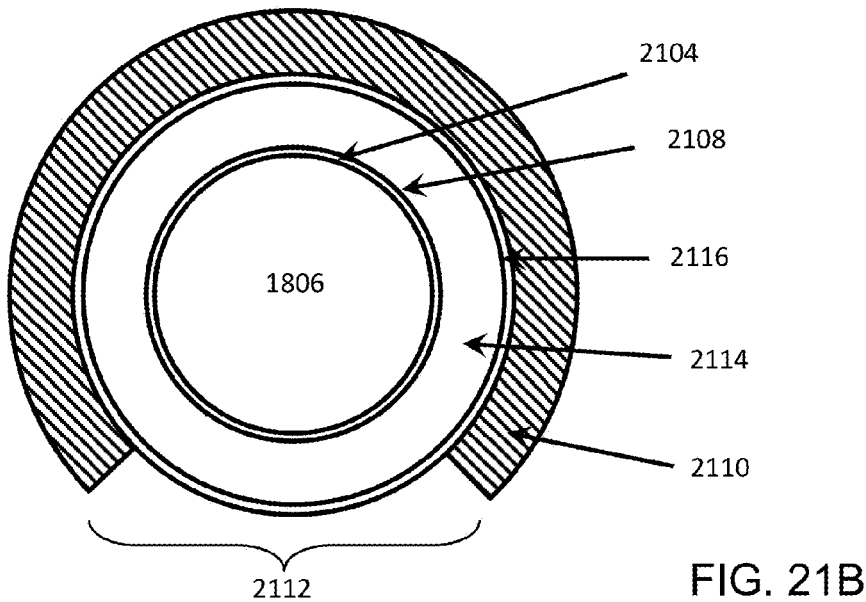
FIG. 21A is a schematic diagram of an illustrative receiver.
Figure 21B:
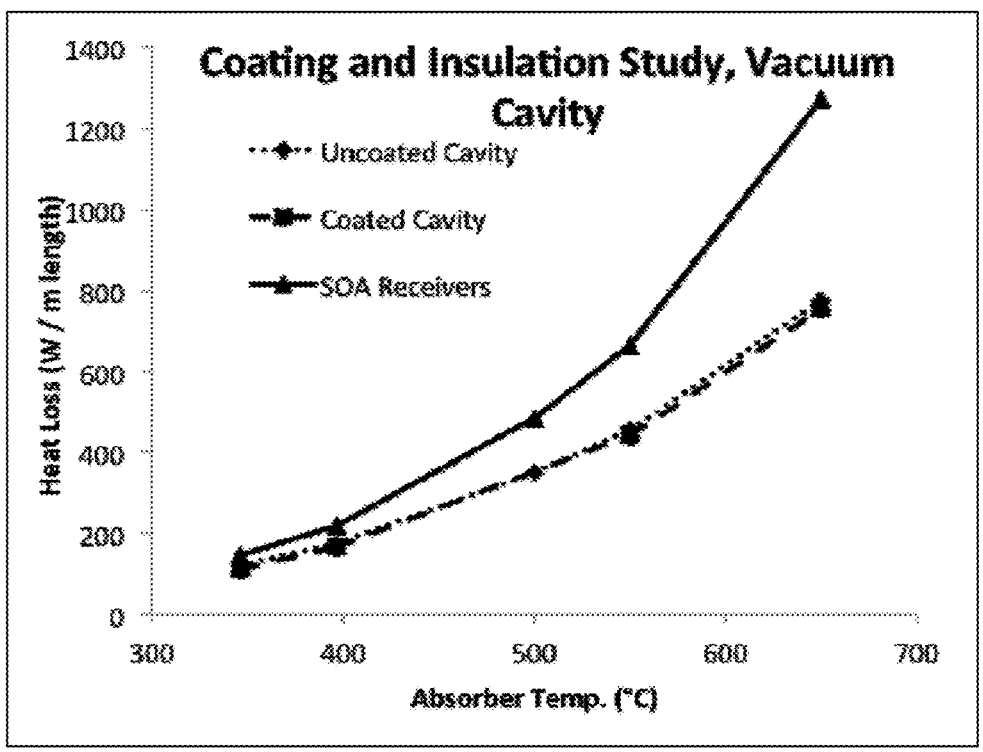
FIG. 21B is a graph of heat loss as a function of temperature for this receiver and others.

FIG. 21 cross-sectionally illustrates an illustrative embodiment (FIG. 21A) of aspects of the invention and a comparison (FIG. 21B) of the simulated heat loss of the embodiment 2100 with the measured and extrapolated heat loss of a state-of-the-art (SOA) receiver constructed according to the prior art (i.e., the Schott PTR70). The receiver 2100 comprises a tubular envelope 2102, a tubular heat-absorbing element 2104 through which a heat-transfer fluid 2106 can flow, a heat-absorbing coating 2108 upon the outer surface of the heat-absorbing element 2104, an outer insulating jacket 2110 that covers a part of the outer surface of the envelope 2102, and an aperture 2112, not covered by insulation 2110, through which light can pass through the envelope 2102. The annulus or space 2114 between the heat-absorbing element 2104 and the envelope 2102 is vacuum-filled. The receiver 2100 may or may not include a reflective coating 2116 on the inner surface of the envelope 2102 except over the aperture 2112.

FIG. 21B compares measured and extrapolated heat-loss performance of the SOA receiver to the simulated performance of the receiver 2100, where the latter is simulated both with and without a reflective coating 2116. As the plot makes clear, the receiver 2100 has lower heat loss at all temperatures than the SOA receiver, with relatively greater improvement at higher temperatures. The plot also shows that the presence or absence of a reflective coating 2116 on the inner surface of the envelope 2102 ("Coated Cavity" points vs. "Uncoated Cavity" points) makes relatively little difference to heat loss. Compared to the structurally similar non-cavity SOA receiver, the addition of insulation to the cavity receiver 2100 makes most of the difference.

NREL data (i.e., Burkholder and Kutscher 2008, described above for FIG. 5A) for the Schott PTR70 did not exceed 500° C., and the cermet absorber coating of the Schott PTR70 cannot endure prolonged exposure to temperatures significantly above 500° C.; therefore, the heat-loss figures for "SOA" receiver in FIG. 21 for temperatures above 500° C. are based on extrapolation of the NREL data, making the assumption that the cermet absorber coating of the SOA receiver remains stable at such high temperatures. In other words, actual SOA performance would be worse at 550° C. and 650° C. than is depicted in FIG. 21B. Figures for the receiver 2100 at all temperatures are based on the ANSYS Fluent simulation tool described above for FIG. 5A and FIG. 6. This simulation assumes in the receiver 2100 an absorbent coating with the same temperature-emissivity curve as the coating in the Schott PTR70 receiver—as opposed to a more advanced coating—but with the additional property of being stable up to at least 650° C. The external insulation 2110 was modeled based on the properties of Microtherm Super G type insulation, which has a thermal conductivity of 0.02 W/m*K at 300° C. For Microtherm Super G insulation, 2 cm of insulation has a thermal resistance of 1 K*m$^2$/W.

FIG. 22A1 and FIG. 22A2 are cross-sectional plots of simulated contours of constant temperature within (a) (FIG. 22A1) an illustrative state-of-the-art receiver 2200 similar to the Schott PTR70 receiver and constructed according to the prior art, but with air rather than vacuum in the annulus 2202, and also within (b) (FIG. 22A2) an illustrative receiver 2204 similar to receiver 2100 in FIG. 21 and also containing air in the annulus. Receiver 2204 incorporates aspects of the invention. Both receivers 2200, 2204 include a transparent tubular envelope 2208, 2210 and a tubular heat-absorbing element 2212, 2214. The heat-absorbing elements 2212, 2214 contain a heat-transfer fluid 2216, 2218. The insulated receiver 2204 includes an insulating jacket 2220 partly covering the outer surface of the envelope 2210; the envelope 2210 includes a reflective coating 2222 on its inner surface. Both receivers 2200, 2204 are simulated at an operating at temperature of 400° C. (fixed temperature of the absorber coating). An absorber coating composition for receivers 2200, 2204 and an insulation composition for the cavity receiver 2204 are both assumed, for this analysis, as for the analysis providing the results plotted in the lower portion of FIG. 21.

FIG. 22A3 and FIG. 22A4 are plots of velocity vectors for convecting air for the receivers 2200, 2204, again at an operating temperature of 400° C.

FIG. 22A shows that conviction is more vigorous in an air-filled, non-insulated receiver 2200 than in an air-filled, insulated receiver 2204.

FIG. 22B1 is a cross-sectional illustration defining energy loss fluxes for the air-filled, insulated receiver 2204 from FIG. 22A4. "Q_insulation" (arrow 2224) is the heat flux through the insulation-covered portion of the envelope 2210. "Q_Radiation" (arrow 2226) is the radiation flux through the non-insulation-covered portion of the envelope 2210. "Q_Cond_Conv" (arrow 2228) is the heat flux via conduction through the non-insulation-covered portion of the envelope 2210. A Q-Radiation flux and Q_Cond_Conv flux may be similarly defined for the uninsulated receiver 2200 in FIG. 22A1, also termed herein the "bare receiver"; there is no Q_insulation flux for the bare receiver 2200.

FIG. 22B2 is a chart of the three fluxes for both the bare receiver and the insulated receiver for operating temperatures of 400° C., 550° C. and 650° C. The chart shows clearly that the Q-Radiation flux and Q_Cond_Conv fluxes are significantly smaller for the insulated receiver 2204 than for the bare receiver 2200. The strong loss reductions seen with adding insulation to the receiver exterior suggest that gas-filled receivers are feasible in terms of efficiency when combined with an insulated covering.

FIG. 23A is a cross-sectional plot of simulated contours of constant temperature in an illustrative receiver 2300 incorporating aspects of the invention. Receiver 2300 resembles the bare receiver 2200 in FIG. 22A1, but with the addition of six barriers (e.g., barrier 2302) connecting the envelope 2304 to the heat-absorbing element 2306 in a gas-proof manner and so dividing the air-filled annulus (space between the envelope 2304 and heat-absorbing element 2306) into six cells (e.g., cell 2308) running the length of the receiver 2300. Addition of dividers to segment the annulus into cells to reduce convection might be attempted as an alternative or supplement to the addition of an insulating jacket over a bare receiver, with the goal of reducing heat losses from the receiver; however, as FIG. 23B shows, in simulations, that the addition of two or six dividers to an otherwise identical bare receiver actual increases convection heat loss from the receiver. It appears the divider strategy fails because it does not alter surface temperatures or cylinder diameters, which are the driving parameters of annular-flow heat transfer. However, the plot of lines of constant temperature in the upper portion of FIG. 23A does reveal one benefit of dividers: isolating a section of air below the hot absorber creates a stratified (horizontally layered) zone with minimal convection currents. Stratification tends to retain heat energy hear the heat-absorbing element (top of the cavity) rather than transporting it to the envelope (bottom of the cavity), and thus is advantageous in reducing thermal losses from the receiver.

FIG. 24A1 cross-sectionally illustrates an illustrative receiver 2400 incorporating aspects of the invention. Receiver 2400 resembles the bare receiver 2200 in FIG. 22A1, but with the addition of an insulating jacket 2402 partly filling the annulus between the heat-absorbing element 2404 and the transparent tubular envelope 2406. The portion of the annulus not filled by the insulating jacket 2402 constitutes an air-filled optical cavity 2408 that light may enter by passing through a portion 2410 of the envelope 2106; this portion 2010 of the envelope constitutes an optical aperture.

FIG. 24A2 is a cross-sectional plot of simulated contours of constant temperature within the insulating jacket 2402 and air-filled optical cavity 2408 of receiver 2400 at an operating temperature of 400° C. An absorber coating composition for receivers the heat-absorbing element 2104 and an insulation composition for the insulating jacket 2402 are both assumed, for this analysis, as for the analysis providing the results plotted in FIG. 24A2.

In FIG. 24A2, the lines of constant temperature in the optical cavity 2408 reveal a stratified (horizontally layered) zone with minimal convection currents. As noted above in the description of FIG. 23A, stratification tends to advantageously reduce thermal losses.

FIG. 24B1 is a cross-sectional illustration defining energy loss fluxes for the receiver 2400 from FIG. 24A1, also herein termed the "wedge" receiver. "Q_insulation" (arrow 2410) is the heat flux through the portion of the envelope 2406 overlying the insulating jacket 2402. "Q_Radiation" (arrow 2412) is the radiation flux through the portion of the envelope 2406 covering the cavity 2408. "Q_Cond_Conv" (arrow 2414) is the heat flux via conduction through the portion of the envelope 2106 covering the cavity 2408.

FIG. 24B2 is a chart of the three fluxes for both the bare receiver 2200 of FIG. 22A1, the externally insulated receiver 2204 of FIG. 22A2, and the internally insulated receiver 2400 of FIG. 24A1, for operating temperatures of 400° C., 550° C. and 650° C. The chart shows clearly that the Q-Radiation flux and Q_Cond_Conv fluxes are significantly smaller for the internally insulated receiver 2400 than for either the bare receiver 2200 or the externally insulated receiver 2204. By directly covering the majority of the surface of the heat-absorbing element 2404, reducing the size of the air pocket, and inducing stratification, the wedge receiver 2400 substantially reduces both radiative and convective losses.

Figure 25A:
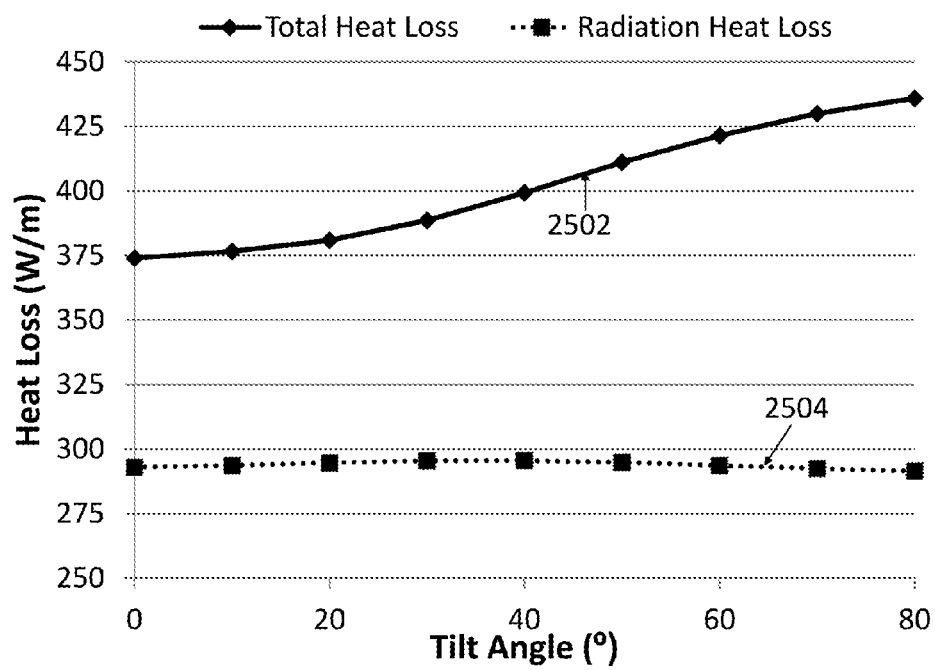

FIG. 25A demonstrates the effect of receiver tilt angle on the thermal performance of the receiver. As the position of the sun moves throughout the day, the receiver/collector system must tilt in order to maximize the incident solar radiation. If the sun is directly overhead then the tilt angle is defined as being 0° and the receiver cavity points vertically down. If the sun is at the horizon then the tilt angle is 90°.

FIG. 25A shows the effect of the receiver tilt on heat loss for the current receiver design at an operating temperature of 650° C. This embodiment consists of an absorber with a width of 5 cm, a compound parabolic concentrator, a focal length of 2.5 m, 3.5 cm of Microtherm insulation, and a glass cover. The heat loss at a tilt angle of 80° is approximately 17% higher than at 0° (2502). The increase in heat loss as the receiver tilts from 0° to 80° results in a decrease of total receiver efficiency from 78.5% to 77.3%. At a tilt angle of 40° the heat loss increases by 7% and the total receiver efficiency is decreased to 78.0%. The radiation heat loss remains relatively constant as the tilt angle changes (2404). This initial analysis demonstrates that the enhanced heat loss at larger receiver tilt angles is not prohibitive to the high total efficiency of the receiver. Upcoming analysis will predict an average efficiency based on the angular position of the collector over the course of a day.

Figure 25B:
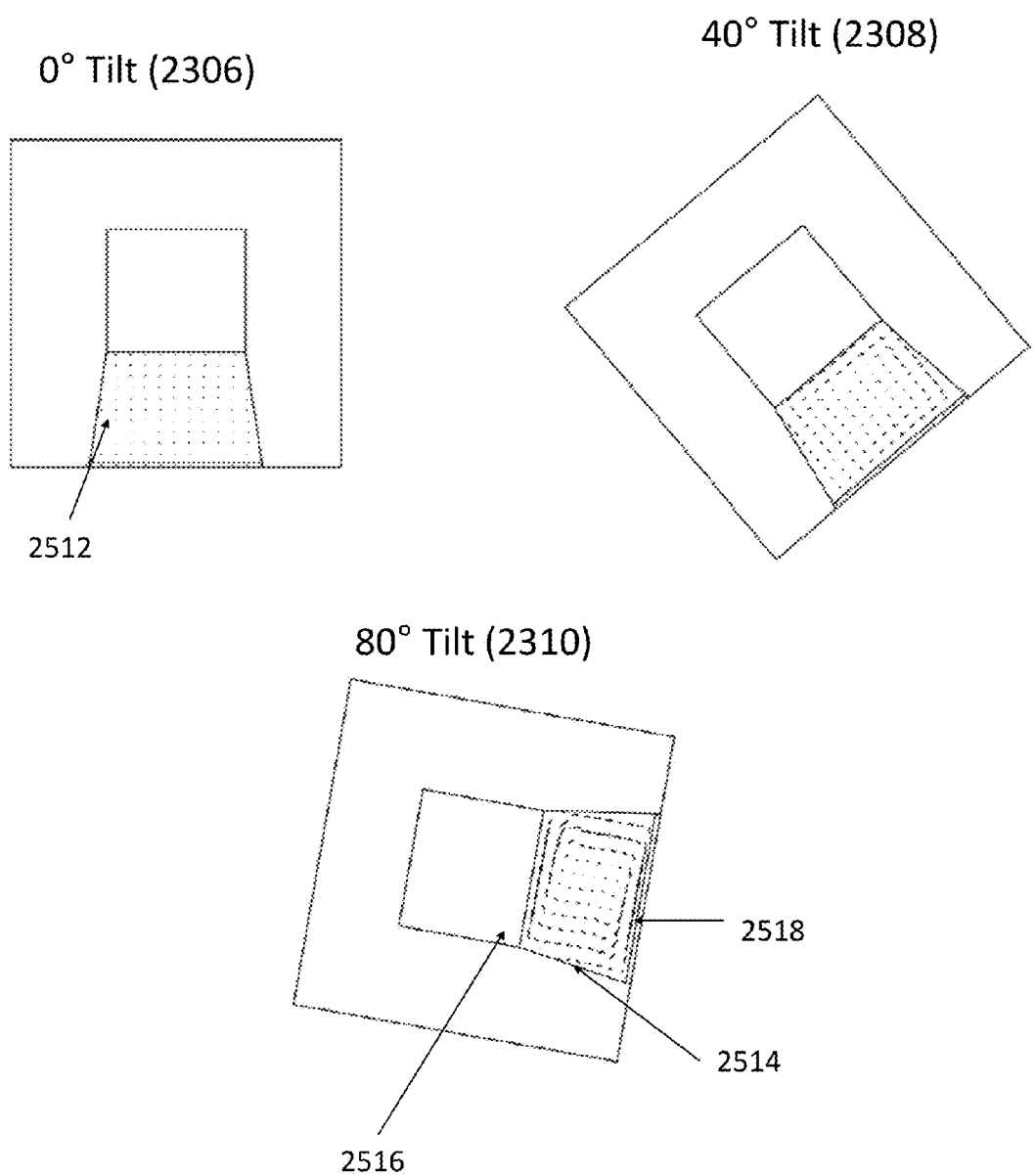
Figure 28A:
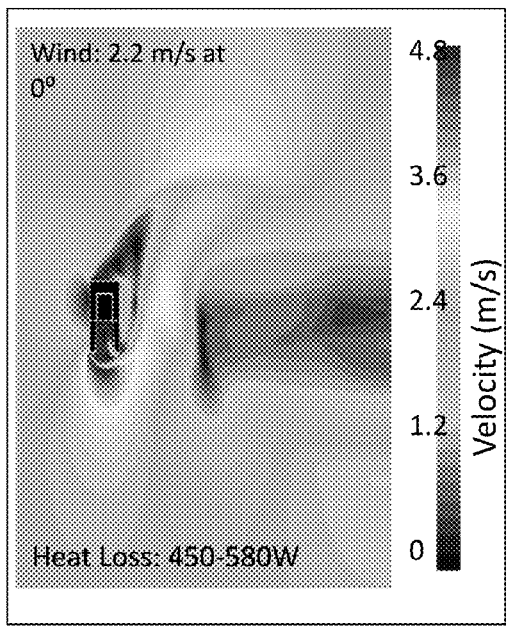
FIG. 28A, FIG. 28B, FIG. 28C and FIG. 28D are graphs of contours of constant velocities from an illustrative receiver when blown upon by wind at various angles.
Figure 28B:
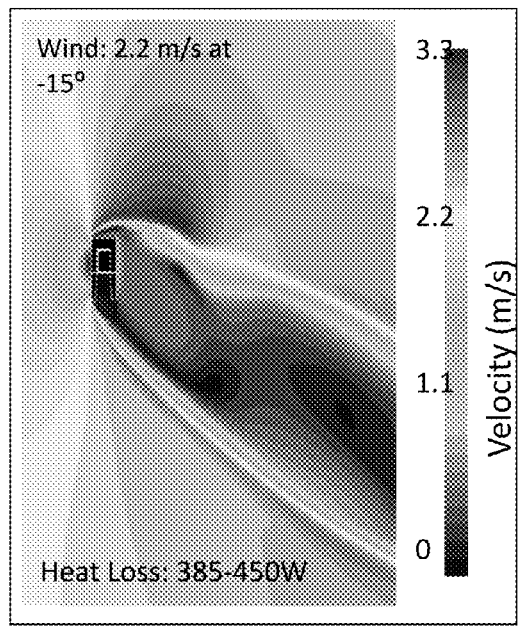
Figure 28C:
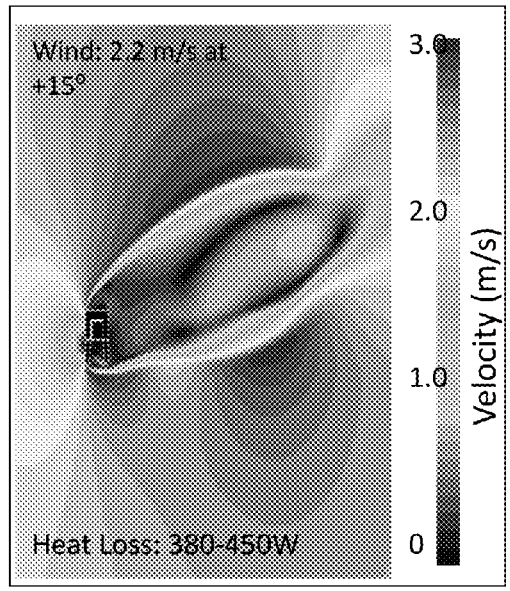
Figure 28D:
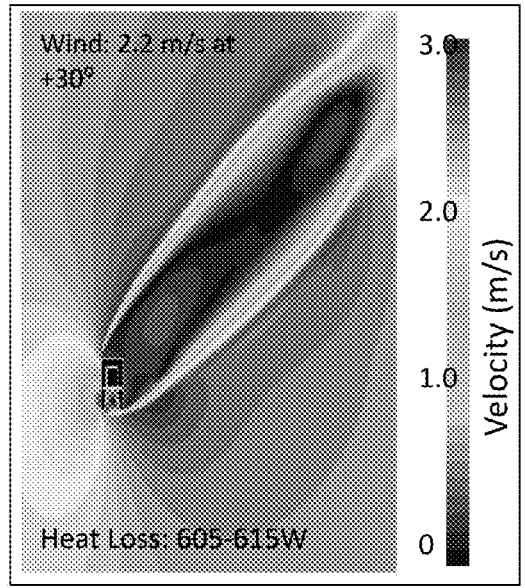

FIG. 25B shows velocity vectors for three tilt angles: 0° (2306), 40° (2308) and 80° (2510) for the current leading receiver design at 650° C. FIG. 25B demonstrates that as the tilt angle increases from 0° to 80°, the stratified layer of air in the receiver (2512) breaks down and a one-cell convection pattern forms (2514). The magnitude of the convective velocity increases as the receiver is tilted from 0° to 80°. The enhanced convection facilitates the transfer of energy from the absorber (2516) to the glass covering (2518) where it may be lost through the glass by conduction.

FIG. 25C shows contours of constant temperature for three tilt angles: 0° (2520), 40° (2522), and 80° (2524) for the current leading receiver design at 650° C. As the tilt angle increases the temperature of the air in the vicinity of the glass aperture is increased due to the enhanced convective transfer of energy from the absorber to the glass covering. The increased temperature of the fluid at the glass covering will result in larger heat transfer across the glass window due to conduction. In other embodiments of the invention, the material used for the cover is changed in order to reduce thermal losses while maintaining a high optical efficiency. Optimization of the position of the covering and length of the receiver legs is possible to reduce heat loss due to a tilted receiver.

FIG. 26A and FIG. 26B display plots of constant temperature contours for two illustrative embodiments of the invention. Specifically, FIG. 26B cross-sectionally depicts results of a CFD analysis of an illustrative novel receiver that incorporates aspects of the invention, including a selective aperture cover as described in FIG. 27.

The CFD analysis displayed is for an illustrative advanced cavity receiver in two states, i.e., (1) without a selective insulating aperture cover (receiver 2602) and (2) with a selective insulating aperture cover 2604 (receiver 2604). Receivers 2602, 2604 comprise an insulating jacket 2606 partially surrounding a heat-absorbing element 2408 above a gas-filled (e.g., atmospheric air) cavity, and an aperture 2612 with a transparent aperture cover 2612 through which light is concentrated by mirror collector (not shown) onto heat-absorbing element 2608. Receivers 2602, 2604 are approximately uniform in cross-section along its entire length, apart from mounting and other hardware (not shown) at each end. Receivers 2602 and 2604 are identical except that receiver 2604 has been closed by a selective insulating aperture cover 2614.

Displayed in FIG. 26 are dashed lines of constant temperature based on a CFD analysis where the heat-absorbing element 2608 is fixed at operating temperature 650° C. Contour lines are not shown in the selective insulating cover 2614. Heat loss by the receiver 2604 is reduced by the addition of the cover as compared with heat loss by receiver 2602. For the case shown, with operating temperature of 650° C., the heat loss decreases from 374 W/m in the receiver 2602 without the selective insulating cover, to 159 W/m for the receiver 2604 with the selective insulating cover 2614. This reduction by over half in heat loss by addition of selective insulating cover 2614, indicates that performance of a trough-based concentrating solar plant may be substantially improved by reducing thermal losses during idle times. CFD analyses for other operating temperatures were completed (not shown), showing that when operating at 550° C., the heat loss decreases from 256 W/m in the receiver 2602 without the selective insulating cover, to 147 W/m for the receiver 2604 with the selective insulating cover 2614. Additionally, when operating at 400° C., the heat loss decreases from 144 W/m in the receiver 2402 without the selective insulating cover, to 112 W/m for the receiver 2604 with the selective insulating cover 2614.

FIG. 27 displays another illustrative embodiment of the invention. Specifically, FIG. 27 cross-sectionally depicts features of an illustrative novel receiver that incorporates aspects of the invention.

The illustrative advanced cavity receiver with selective aperture cover 2700 comprises a tubular shell 2702, a heat-absorbing element 2704 through which a heat-transfer fluid 2706 can flow, an aperture 2712, (with optional transparent aperture cover (not shown)), an insulating jacket 2716 partially surrounding the heat-absorbing element 2704, a planar (flat) absorbing surface 2718 coated with an absorbent coating and exposed to light entering the aperture 412. The receiver 400 is approximately uniform in cross-section along its entire length, apart from mounting and other hardware (not shown) at each end.

Additionally, the receiver may include a moveable aperture cover 2720. The cover 2720 may, for example, be a transparent material such as glass, a structural material such as plastic or metal, or an insulating material such as opaque insulation. The cover 2720 may be rotated or other moved to cover the receiver aperture opening 2712. In this illustrative example, the cover 2720 may be mounted to a circular track 2730 at both the lengthwise (coming out of the page) front and back end of the receiver. A motor (not shown) or other rotary device (e.g., manual crank) may be used to rotate the aperture cover 2720 from a full open position as shown in 2700 to a full closed position as shown in 2770. A mechanical stop (e.g., a fixed piece of metal at the lengthwise front and back end of the receiver) 2734 may be used to assure proper seating and location of the aperture cover when rotated full open 2700 or full closed 2770. Arrow 2732 indicates the direction of rotation to close the aperture cover 2720.

Performance (e.g., overall efficiency) may be improved during different operating conditions by the selective covering of the aperture opening 2712 with the cover 2720. For example, during windy conditions, a glass aperture cover may be rotated into place to reduce convective thermal losses. The glass will result in reduced optical efficiency, but in conditions of high wind, this loss may be more than compensated by gains in thermal efficiency. In another embodiment, additional insulation 2722 may be added to the cover 2720. This insulating covering 2720 2722 may be rotated into place to further reduce thermal losses during night time and other times of little or no sunlight to reduce thermal losses.

This illustrative cavity receiver 2700 can be the same as shown in FIG. 7 with the addition of the selective insulated aperture cover. In other embodiments, other receiver geometries (e.g., that of receiver 400 in FIG. 4) may include the selective insulated aperture cover.

2750 shows the same illustrative cavity receiver 2700, but with the aperture cover 2720 and insulating covering 2722 rotated halfway towards closing against stop 2734 on track 2730. Arrow 2752 indicates the direction of rotation to close the aperture cover 2720.

2770 shows the same illustrative cavity receiver 2700, but with the aperture cover 2720 and insulating covering 2722 rotated completely towards closing against stop 2734 on track 2730.

In other embodiments, not shown, the selective aperture cover 2720, 2722 could be internal to the stationary insulation 2716.

FIG. 28 and FIG. 29 show the effect of forced convection (wind) on the thermal performance of an embodiment of the receiver with no glass cover at the cavity aperture. In this embodiment, the cavity and absorbing surface are open to the environment. FIG. 28A, FIG. 28B, FIG. 28C and FIG. 28D show the convective velocity in and around the open receiver for a wind speed of 2.2 m/s incoming at a direction of 0°, 15° downwards, 15° upwards and 30° upwards respectively. The simulations were performed for an illustrative receiver with a compound parabolic concentrator, a 2.5 m focal length, 2 cm external Microtherm insulation, 7 cm absorber width and an operating temperature of 550° C. For the receiver which has a glass cover and a sealed air-filled cavity at atmospheric pressure, the heat loss is 342 W/m. In an embodiment of the invention, the evacuation of the cavity results in a reduction of the heat loss to 293 W/m. Embodiments of the invention where a portion of the cavity is at vacuum will result in improvements to the thermal efficiency and may improve absorber coating stability. When the glass cover is removed and an external wind speed applied at 2.2 m/s the heat loss is increased between 11% and 80% depending upon the direction of the incoming wind.

The removal of the glass covering increases the optical performance by approximately 4% (the transmittance percentage of the glass). In order to achieve gains in total efficiency when the glass cover is removed in this example the increase in heat loss must be less than 58% (absolute heat loss less than ~530 W/m). Hence, these initial results suggest that the removal of the glass cover may improve the total efficiency of the receiver over a range of wind velocities.

These initial simulations were performed for a receiver tilt angle of 0°. For an embodiment of the receiver with no glass covering the tilt angle will further affect the heat loss of the receiver due to natural and forced convection. Embodiments of the invention include a receiver with no glass cover that is optimized to reduce heat loss for a variety of tilt angles.

Figure 30A:
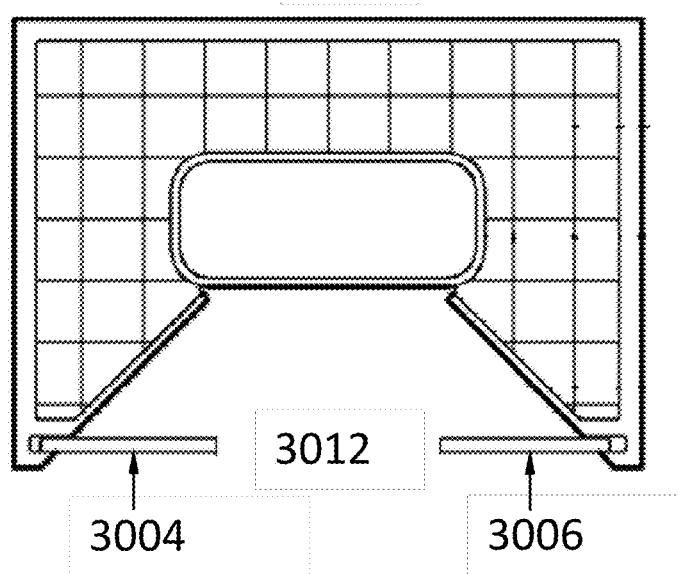
FIG. 30A and FIG. 30B are schematic diagrams of illustrative cavity receivers having partially covered cavities.
Figure 30B:
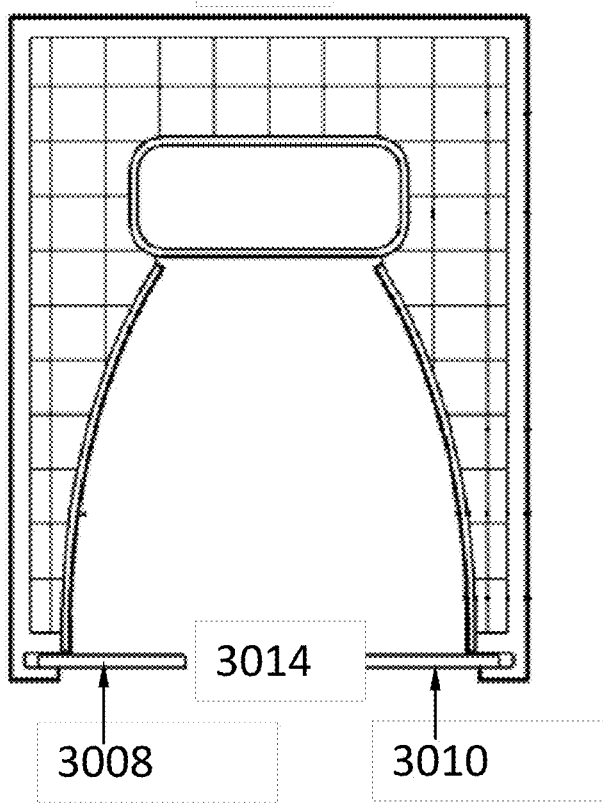

FIG. 30 cross-sectionally illustrates two illustrative advanced cavity receivers, 3000 and 3002, embodying aspects of the invention. Receiver 3000 (FIG. 30A) resembles receiver 400 in FIG. 4, but includes glass sections (3004 and 3006) at the cavity entrance that form a partial glass cover rather than a full glass cover. Receiver 3002 (FIG. 30B) resembles receiver 700 in FIG. 7 but includes glass sections (3008 and 3010) at the cavity entrance that form a partial glass cover rather than a full glass cover. The middle section (3012 in receiver 3000 and 3014 in receiver 3002) of the cavity aperture is left open.

The percentage of the cavity opening that is covered by glass is chosen to maximize the total receiver efficiency. Increasing the percentage of the cavity opening that is covered by glass will increase the thermal performance at a cost to the optical performance. The optimum percentage will depend upon the profile of the irradiant flux on the cavity opening and the extent to which the width of the partial glass cover affects the thermal performance.

In one embodiment of the invention, the percentage of glass covering the cavity opening may be variable and can be altered depending upon the current weather conditions.

Figure 31:
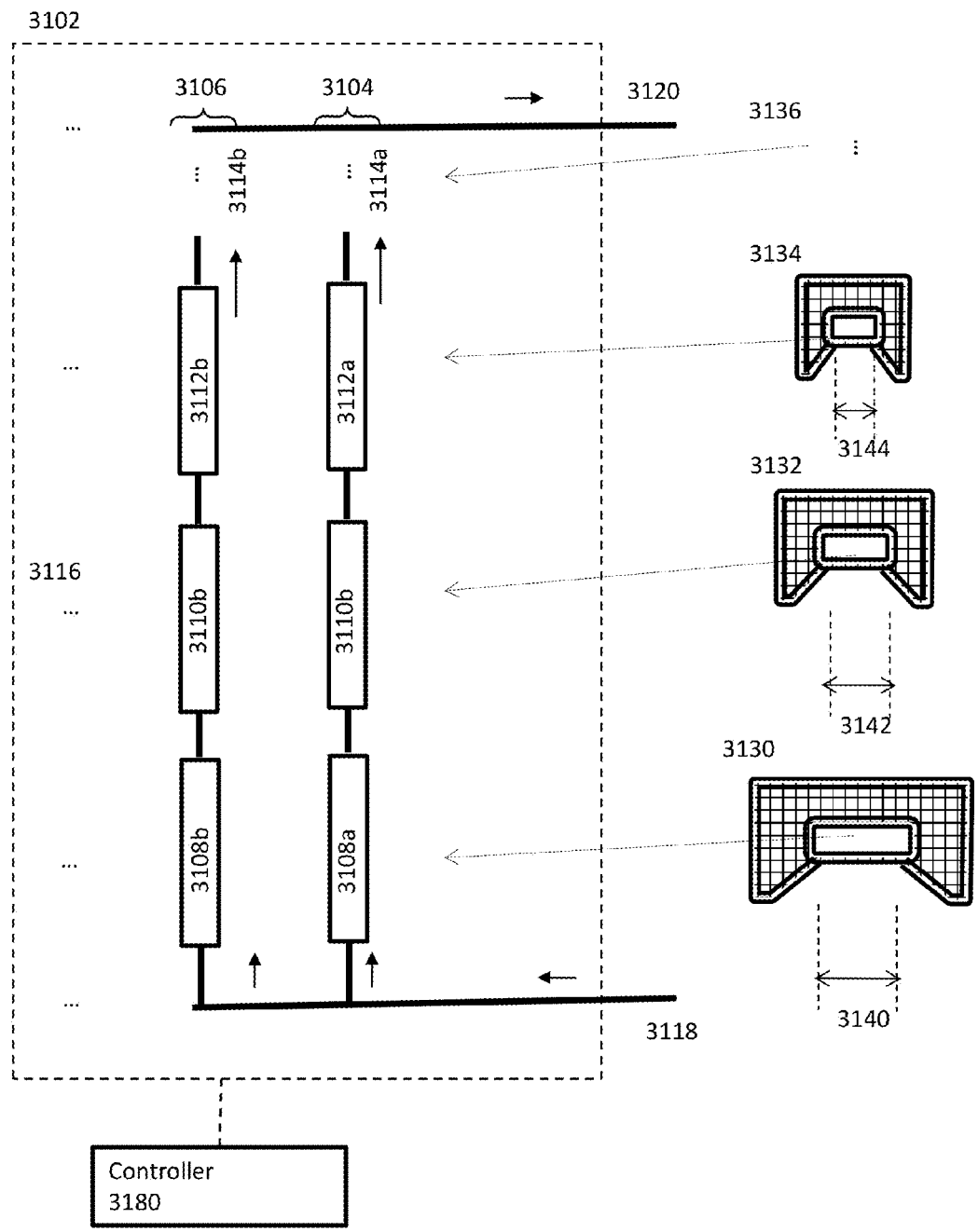
FIG. 31 is a schematic diagram of a solar field in which a graded series of cavity receivers is included in each row of the field.

FIG. 31 displays another illustrative embodiment of the invention. Specifically, FIG. 31 shows solar power system 3100 which includes an alternative embodiment of a solar field 3102 to replace or supplement solar field 102 in FIG. 1 for a trough-based concentrating solar power system (100 in FIG. 1). The solar field is controlled to track the sun via controller 3180.

The solar field 3102 comprises N rows (e.g., row 3104, row 3106), depicted in FIG. 31 as viewed from above, where each row comprises M receivers (e.g., receivers 3108a, 3108b; receivers 3110a, 3110b, receivers 3112a, 3112b; etc.) upon which solar radiation is focused by parabolic collectors (not depicted). The plurality of the N rows is indicated in FIG. 1 by horizontal ellipses (e.g., ellipsis 3116); the plurality of M receivers in each of the N rows is indicated in FIG. 1 by vertical ellipses (e.g., ellipses 3114a, 3114b). The number of receivers K in the solar field of the illustrative system 100 is therefore K=NM. In other embodiments, the number of receivers may vary from row to row.

In one state of operation, a heat-transfer fluid (e.g., molten salt, refractory oil, gas, pressurized water or steam) is admitted to an entry manifold 3118 at a first temperature, $T_1$ (e.g., 200° C.). (In FIG. 31, any piping through which the heat-transfer fluid may flow in some state of operation of the system 3100 is denoted by a thick dark line.) The heat-transfer fluid is distributed by the entry manifold to the N rows and, in each row, passes sequentially through the M receivers comprised by that row. In general, an approximately equal amount of solar radiation $Q_c$ is gathered by the collector associated with each receiver, and absorbed by the fluid in each receiver with an efficiency $\eta_r$. Thus, an approximately equal quantity of solar energy $Q_r = Q_c \times \eta_r$ is added to the heat-transfer fluid during its passage through each receiver. Each incremental set of the M receivers will thus raise the thermal energy and thus, for non-phase change heat transfer fluids, raise the temperature of the heat-transfer fluid. The first set of receivers (3108a and 3108b), which consists of a given length of receivers (e.g., 40 meters), will raise the heat transfer fluid from $T_1$ to a second elevated temperature $T_2$ (e.g., 250° C.) higher than the $T_1$. For simplicity, the average temperature $T_{12}$, (e.g., 225° C.) of the first set of receivers 3108 may be considered the average of $T_1$ and $T_2$ ($T_{12} = (T_1 + T_2)/2$). The second set of receivers (3110a and 3110b), which consists of a second given length of receivers (e.g., another 40 meters or some other length not necessarily equal to the first length), will raise the heat transfer fluid from $T_2$ to a third elevated temperature $T_3$ (e.g., 300° C.). The second set of receivers 3110 operates at average temperature $T_{23}$ (e.g., 275° C.) higher than the average operating temperature, $T_{12}$, of the first set of receivers 3108. In the same manner, the third set of receivers 3112 has a given length, inlet temperature $T_3$, elevated outlet temperature $T_4$ (e.g., 350° C.), and average operating temperature $T_{34}$ (e.g., 325° C.). Additional sets of receivers 3114 may raise the temperature further to the outlet operating temperature where it is admitted to an output manifold 3120 at a final temperature, $T_f$ (e.g., 550° C.).

Detail 3130 shows an exemplary cross-section of the receiver in the first receiver sections 3108a and 3108b which typically operates at elevated operating temperature $T_{12}$. The receiver is similar to the receiver 700 in FIG. 7. The receiver 3130 has an exposed opening of width 3140. In various other embodiments, receivers may be used that comprise planar transparent aperture covers, lenticular aperture covers, partial aperture covers, selective insulated aperture covers, compound parabolic concentration, and other aspects of the invention.

Detail 3132 shows an exemplary cross-section of the receiver in the second receiver sections 3110a and 3110b which typically operates at elevated operating temperature $T_{23}$ which is higher than $T_{12}$. The receiver is similar to the receiver 700 in FIG. 7. The receiver 3132 has an exposed opening of width 3142. The width 3142 is less than the width of 3140 in order to improve overall efficiency of the receiver. The first 3108 and second 3110 receiver sections are connected via a coupler (not shown) that connects the two receiver absorber tubes together. The receiver absorber tubes may be the same dimensions with different exposed areas (e.g., different extent of insulation) or different dimensions (e.g., smaller tube for 3110 as compared with 3108).

As shown in FIG. 20B, for a given mirror size and geometry, optimal receiver performance at a given operating temperature occurs for different receiver geometries. Receiver efficiency is a multiplication of optical and thermal efficiency. Smaller exposed absorber surface area tends to result in higher thermal efficiency (lower thermal losses due to smaller exposed area) but lower optical efficiency (high optical losses due to smaller exposed area).

Additional receivers 3134, 3136 corresponding to additional sections 3114, 3116 will typically operate at further elevated operating temperatures, each successively higher. The exposed width of each successive receiver 3134, 3136 may be less than the previous receivers (3132, 3134) in order to improve overall efficiency of the receiver. Each section may be connected via a coupler (not shown) that connects the two receiver absorber tubes together. The receiver absorber tubes may be the same dimensions with different exposed areas (e.g., different extent of insulation) or different dimensions (e.g., smaller tube). Overall solar field efficiency can be increased through this method.

Figure 32:
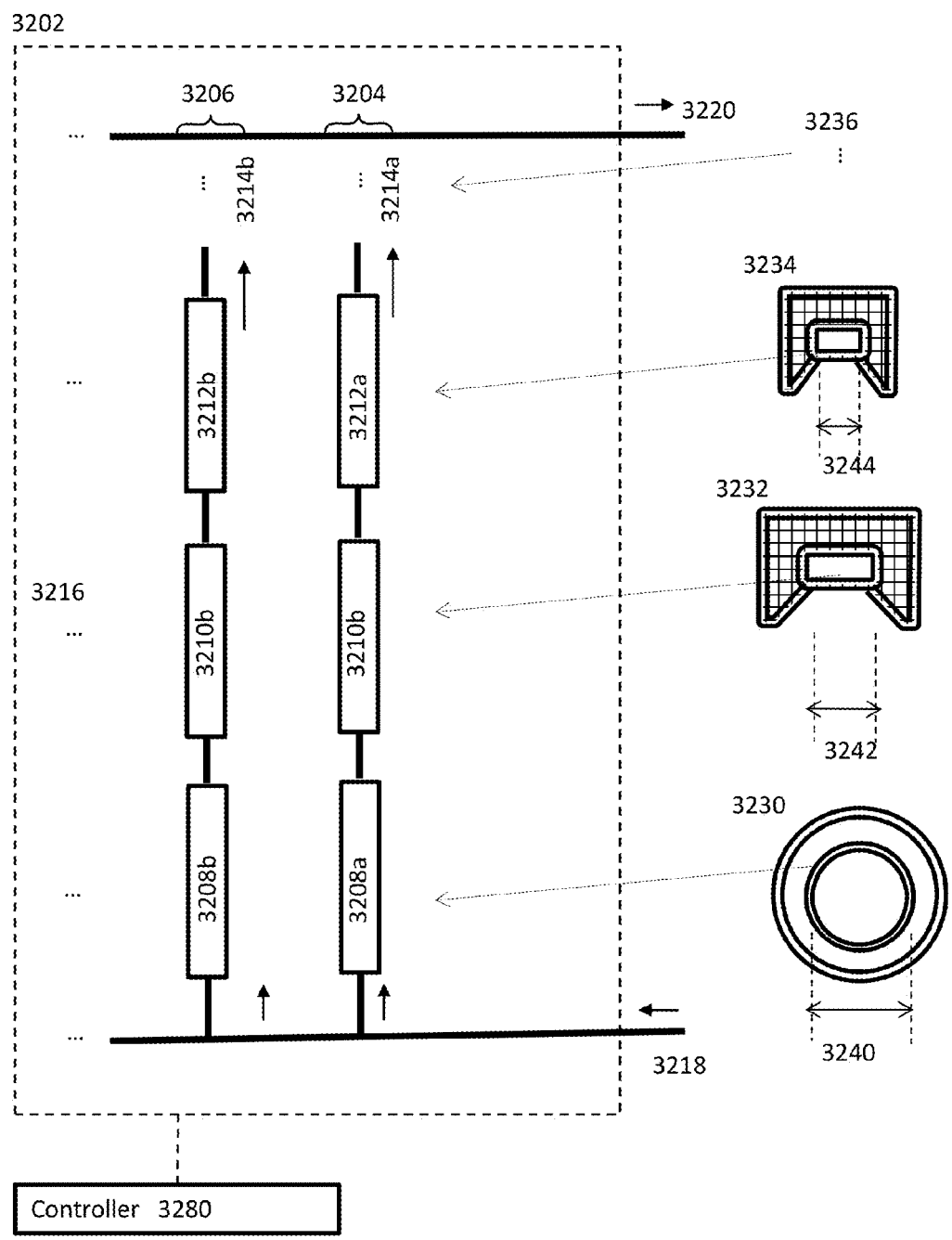
FIG. 32 is a schematic diagram of a solar field in which a graded series of cavity receivers is included in each row of the field, in addition to receivers employing prior art.

Additionally, as shown in FIG. 32, receivers employing different shapes and technologies can be used in different receiver sections.

FIG. 32 displays another illustrative embodiment of the invention. Specifically, FIG. 32 shows solar power system 3200 which includes an alternative embodiment of a solar field 3202 to replace or supplement solar field 102 in FIG. 1 for a trough-based concentrating solar power system (100 in FIG. 1). The solar field is controlled to track the sun via controller 3280.

The solar field 3202 comprises N rows (e.g., row 3204, row 3206), depicted in FIG. 32 as viewed from above, where each row comprises M receivers (e.g., receivers 3208a, 3208b; receivers 3210a, 3210b, receivers 3212a, 3212b; etc.) upon which solar radiation is focused by parabolic collectors (not depicted). The plurality of the N rows is indicated in FIG. 1 by horizontal ellipses (e.g., ellipsis 3216); the plurality of M receivers in each of the N rows is indicated in FIG. 1 by vertical ellipses (e.g., ellipses 3214a, 3214b). The number of receivers K in the solar field of the illustrative system 100 is therefore K=NM. In other embodiments, the number of receivers may vary from row to row.

In one state of operation, a heat-transfer fluid (e.g., molten salt, refractory oil, gas, pressurized water or steam) is admitted to an entry manifold 3218 at a first temperature, $T_1$ (e.g., 200° C.). (In FIG. 32, any piping through which the heat-transfer fluid may flow in some state of operation of the system 3200 is denoted by a thick dark line.) The heat-transfer fluid is distributed by the entry manifold to the N rows and, in each row, passes sequentially through the M receivers comprised by that row. In general, an approximately equal amount of solar radiation $Q_c$ is gathered by the collector associated with each receiver, and absorbed by the fluid in each receiver with an efficiency $\eta_r$. Thus, an approximately equal quantity of solar energy $Q_r = Q_c \times \eta_r$ is added to the heat-transfer fluid during its passage through each receiver. Each incremental set of the M receivers will thus raise the thermal energy and thus, for non-phase change heat transfer fluids, raise the temperature of the heat-transfer fluid. The first set of receivers (3208a and 3208b), which consists of a given length of receivers (e.g., 40 meters), will raise the heat transfer fluid from $T_1$ to a second elevated temperature $T_2$ (e.g., 250° C.) higher than the $T_1$. For simplicity, the average temperature $T_{12}$, (e.g., 225° C.) of the first set of receivers 3208 may be considered the average of $T_1$ and $T_2$ ($T_{12}=(T_1+T_2)/2$). The second set of receivers (3210a and 3210b), which consists of a second given length of receivers (e.g., another 40 meters or some other length not necessarily equal to the first length), will raise the heat transfer fluid from $T_2$ to a third elevated temperature $T_3$ (e.g., 300° C.). The second set of receivers 3210 operates at average temperature $T_{23}$ (e.g., 275° C.) higher than the average operating temperature, $T_{12}$, of the first set of receivers 3208. In the same manner, the third set of receivers 3212 has a given length, inlet temperature $T_3$, elevated outlet temperature $T_4$ (e.g., 350° C.), and average operating temperature $T_{34}$ (e.g., 325° C.). Additional sets of receivers 3214 may raise the temperature further to the outlet operating temperature where it is admitted to an output manifold 3220 at a final temperature, $T_f$ (e.g., 550° C.).

Detail 3230 shows an exemplary cross-section of the receiver in the first receiver sections 3208a and 3208b which typically operates at elevated operating temperature $T_{12}$. The receiver may be similar to the commercially available vacuum tube receiver shown in FIG. 3. The receiver 3230 has a diameter of 3240 and an exposed circumference of pi times the diameter 3240.

Detail 3232 shows an exemplary cross-section of the receiver in the second receiver sections 3210a and 3210b which typically operates at elevated operating temperature $T_{23}$ which is higher than $T_{12}$. The receiver may be a vacuum tube type receiver (not shown) as in 3230, but of different diameter, or may be, as shown, similar to the receiver 700 in FIG. 7. The receiver 3232 has an exposed opening of width 3242. The exposed width 3242 is less than the exposed circumference (pi times 3240) in order to improve overall efficiency of the receiver. The first 3208 and second 3210 receiver sections are connected via a coupler (not shown) that connects the two receiver absorber tubes together. The receiver absorber tubes may be the same dimensions with different exposed areas (e.g., different extent of insulation) or different dimensions (e.g., smaller tube for 3210 as compared with 3208). In various other embodiments, receivers may be used that comprise planar transparent aperture covers, lenticular aperture covers, partial aperture covers, selective insulated aperture covers, compound parabolic concentration, and other aspects of the invention.

Additional receivers 3234, 3236 corresponding to additional sections 3214, 3216 will typically operate at further elevated operating temperatures, each successively higher. The exposed width of each successive receiver 3234, 3236 may be less than the previous receivers (3232, 3234) in order to improve overall efficiency of the receiver. Each section may be connected via a coupler (not shown) that connects the two receiver absorber tubes together. The receiver absorber tubes may be the same dimensions with different exposed areas (e.g., different extent of insulation) or different dimensions (e.g., smaller tube). Overall solar field efficiency can be increased through this method.

Figure 33:
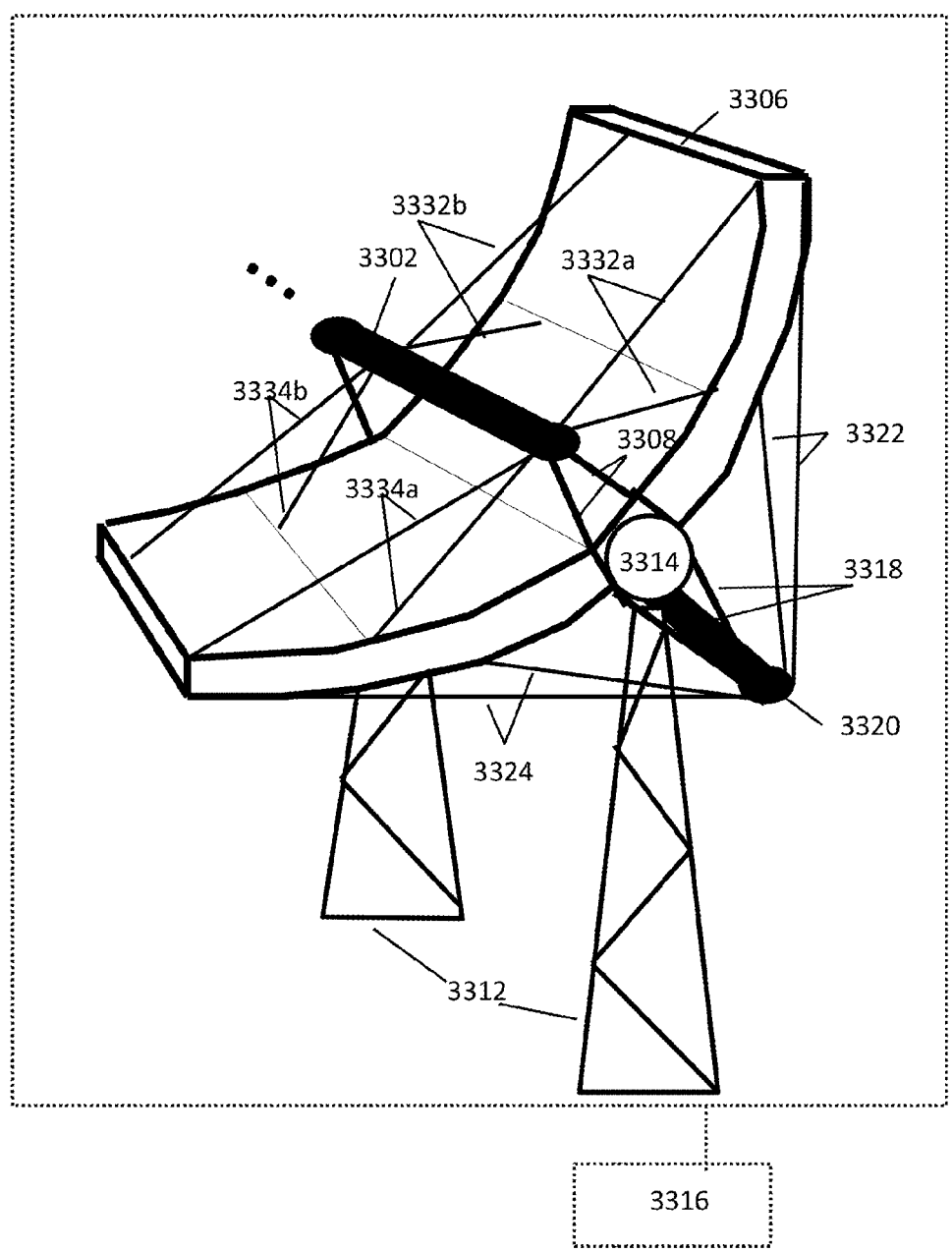
FIG. 33 is a schematic diagram of a method for supporting a receiver above a collector.

FIG. 33 depicts an illustrative alternative assembly 3300 for the collection of solar energy in the form of heat that may be part of a larger system for the conversion of solar energy to thermal and/or electrical energy. Assembly 3300 may use less materials and be lower cost and/or higher performance than the standard assembly 200 displayed in FIG. 2. Assembly 3300 may be used in the solar field 102 of a power-generating system similar to that illustrated in FIG. 1 and may use receiver and mirror assemblies as described in FIGS. 4, 7, 11, 12, and other embodiments shown herein.

Illustrative assembly 3300 comprises a receiver tube 3302. Solar radiation (not shown, but similar to solar radiation depicted in FIG. 2) is reflected from a trough-shape collector 3306 having a parabolic cross-section and impinges on the receiver 3302. The receiver 3302 is held in place at the focus of the parabolic trough 3306 by struts 3308. A supporting rod 3330 is also extended and supported by struts 3318 on the reverse side of the mirror. The assembly comprising receiver 3302, rod 3330, struts 3308 3318, and trough 3306 is connected to a central rod and joint mechanism 3314, which in turn is mounted upon supports 3312, and can be rotated on a joint or bearing mechanism 3314 so that the trough 3306 faces the sun (i.e., is tilted at an angle equal to the elevation of the sun above the horizon at a given moment). Movement of the assembly 3300 for sun-track, or operation of other controllable features of the assembly 3300, may be controlled by a controller (e.g., computer) 3316.

Mirror 3306 is mounted on a thin structure which is not structurally stable without a truss-type support (210 as shown in FIG. 2) or other stabilizing method. As illustrated in FIG. 33, a suspension cable (solid lines 3322, 3324, 3332, 3334)

stabilizing structure can be used to stabilize and keep the mirror 3306 in its proper shape under the forces of gravity, wind, and other forces. A lower suspension structure may consist of cables connected to the underside of the mirror 3306 and thin structure at multiple points, including as illustrated cables 3322 connected between the underside of the mirror structure to rod 3320, cables 3324 connected between the underside of the mirror structure to rod 3320. This lower suspension arrangement including struts 3318 maintains the shape of the mirror from flexing primarily in the upward direction as illustrated. Additional such cables (not shown) may extend down the length of the mirror. A second upper suspension structure may comprise cables connected to the topside of mirror 3306 and thin structure at multiple points, including as illustrated cables 3332a connected between the underside of the mirror structure to receiver 3302, cables 3334a connected between the underside of the mirror structure to receiver 3302. This upper suspension arrangement including struts 3308 maintains the shape of the mirror from flexing primarily in the downward direction as illustrated. Additional such cables, including 3334b and 3334b, may extend down the length of the mirror.

The cavity receivers described in FIG. 4, FIG. 7, and other Figures herein are ideal for connection to a suspension type structure, since they have a rigid non-glass top surface. For other receivers that do not have a rigid or otherwise strong enough structure to support a suspension type cable connection, an additional rod (not shown) may be installed above or below the receiver.

Suspension-type support and stabilizing mechanisms are well known in bridge construction to use less material than truss-type support and stabilizing mechanisms in many applications. For mirror structures for solar power towers, suspension-type support mechanisms developed by Solaflect (e.g., European Patent Application "Solar collector stabilized by cables and a compression element," EP 2215712 A1) show potential for reducing materials and cost, while maintaining or improving performance.

Various embodiments of the invention including a glass cover can employ borosilicate crown glass, which typically has low dispersion, low coefficient of thermal expansion (CTE), and low refractive indices. Pyrex glass is such a material, with a specific example being Pyrex 7740, manufactured by Corning Inc., having an optical transmittance of 90-94% in the visible spectrum and a refractive index of 1.473 at 589 nm (peak solar). As is known in the art, the glass can be coated with anti-reflective (AR) coatings, such as silica coatings, which increases the optical transmission of its glass, for example from ~92% to 96%. Such coatings are described in more detail the reference N. Benz, Next Generation Receivers, NREL Trough Work Shop, March 7-8, Golden Colo., 2007, hereby incorporated by reference in its entirety.

The central absorber tube for various embodiments can be manufactured from a variety of high temperature metals or ceramics with an illustrative example being stabilized austenitic steel, which has good high temperature performance and is able to withstand repeated thermal cycling.

In various embodiments that eliminate vacuum, high temperature thermal insulation is a required component. Various candidate materials exist with considerations including cost and low thermal conductivity, k, at both intermediate and high temperatures. Some materials are silica-based, including Microtherm MPS by Microtherm Group, a pyrogenic silica, and Pyrogel XT by Aspen Aerogel, a silica aerogel. These insulators have conductivity values on the order of 0.034 W/m·K at 800° C. and 0.089 W/m·K at 600° C. and are stable up to 1000° C. and 650° C., respectively. As well, less expensive insulation (e.g., fiberglass, polyurethane) may be added outside the high temperature insulation or in other embodiments of the invention. Additional options for low and high temperature insulations and their approximate performance characteristics are noted in Table 2.

TABLE 2

Examples of Thermal Insulation Options for Various Embodiments
Thermal Insulation

| Description | Form Factor | Thermal Conductivity, k | | | Density $kg/m^3$ | Maximum Stable Temperature ° C. | Price/ $m^3$ | Figure of Merit, 400° C. 1000/(k * price/$m^3$) |
| | | at 400° C. W/mK | at 550° C. W/mK | at 650° C. W/mK | | | | |
| --- | --- | --- | --- | --- | --- | --- | --- | --- |
| Alumina silica ceramic fiber | flexible or solid | 0.09 | | | 128 | >850 | $680 | 16.3 |
| Calcium silicate | solid | 0.095 | 0.123 | | 232 | 850 | $2110 | 5.0 |
| Mineral Wool | flexible | 0.12 | 0.175 | 0.22 | 128 | 550 | $250 | 25.7 |
| Millboard rock wool + clay | solid | 0.11 | | | 945 | >550 | $8120 | 1.1 |
| Fiberglass | flexible or solid | 0.074 | N/A | N/A | 48 | up to 500 | $850 | 20.5 |
| Cellular Glass | solid | 0.13 | N/A | N/A | 120 | 450 | $4650 | 1.7 |
| Perlite | particulate | 0.12 | 0.15 | | | | | |
| Microtherm 3.5" OD MPS | solid | 0.02 | 0.025 | 0.03 | 320 | 1000 | $6770 | 7.4 |
| Pyrogel XT | flexible | 0.046 | 0.070 | 0.1 | | 850 | | |
| Pyrogel 6650 | flexible | 0.03 | | | | 850 | | |

Various embodiments may require reflective materials such as the compound parabolic collector design described above. Specular surfaces may be advantageous for such embodiments where as other embodiments may benefit from diffuse reflection. A selection of example candidate materials for reflectance applications are summarized in Table 3. Such and other coatings and materials may also be added in various embodiments to prevent radiation losses and reduce emissivity to near zero.

For various embodiments, the absorber tube is covered with a solar-selective coating. The coatings can require high solar (for some embodiments the wavelengths are approximately $\lambda \leq 3$ mm) absorptivity, $\alpha$, and low thermal (for some embodiments the wavelengths are approximately $\lambda \geq 3$ mm) emissivity, $\epsilon$. In some embodiments of the invention employing a vacuum, coatings otherwise susceptible to oxidation may be used. Stability at high temperature is a consideration for absorber coatings. Furthermore, the coefficient of thermal expansion of the coating and substrate must be considered with respect to thermal cycles.

Table 4 lists current and candidate absorber coatings and their properties. The ratio of solar absorptivity to thermal emissivity at various temperatures, when available, gives a common figure of merit to compare solar-selective coatings. Accurate spectral and temperature-dependent physical properties for solar-selective coatings are difficult to obtain partly due to limitations of instruments capable of measurement at high temperatures.

Figure 34A:
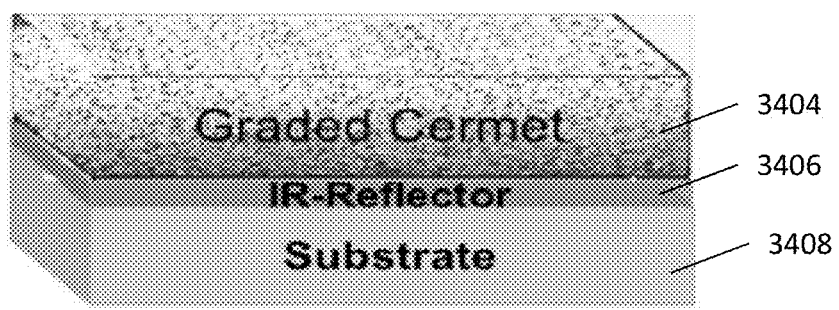
FIG. 34A is a schematic diagram of an optical absorbing layer applied to a substrate.
Figure 34B:
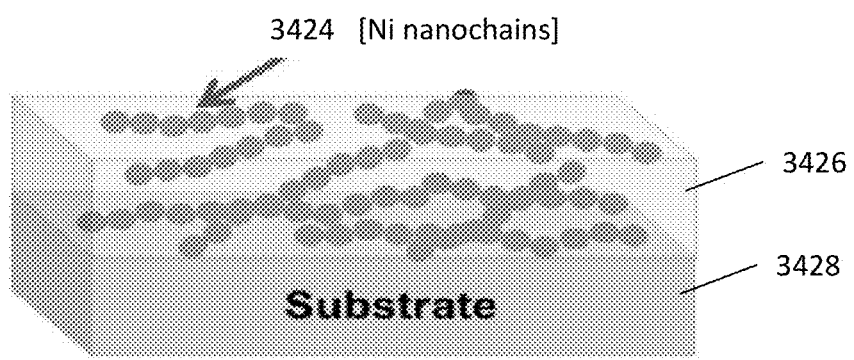
FIG. 34B is a schematic diagram of an optical absorbing layer applied to a substrate.

FIG. 34A and FIG. 34B display two illustrations of selective solar absorbers.

FIG. 34A displays an illustration 3402 of a conventional cermet selective solar absorbers, consisting of metal nanoparticles dispersed in a ceramic matrix, which have been developed for CSP. It is well known in the art that metals have a high absorption coefficient in the solar spectrum, yet due to refractive-index mismatch with air a continuous layer of metal reflects most incident light instead of absorbing it.

TABLE 3

Examples of Reflective Material Options for Various Embodiments
Reflective Materials

| Material | Reflectance Solar Weighted Hemispherical % | Reflectance Specular % | Thermal Emissivity $\epsilon$ | at Temp. °C. | Coefficient of Thermal Expansion $10^{-6}$/°C. | Maximum Stable Temperature °C. | Typical Thickness mils | Price/ ft$^2$ |
|---|---|---|---|---|---|---|---|---|
| Silver coating | | | | | | | | |
| polished | 93 | 90 | 0.01 | 40 | | 720 | 0.004 | |
| | | | 0.03 | 540 | | | | |
| Silver metallized polymer | | | | | | | | |
| 3M Solar Mirror Film 1100 | 94 | 95 | | | 70 | 65 | 4.6 | $3 |
| ReflecTech Mirror Film | 93 | 94 | | | 55 | 60 | 4 | $3 |
| Aluminum | | | | | | | | |
| highly polished plate | 88 | 85 | 0.038 | 200 | 22.2 | 600 | 32 | $15 |
| | | | 0.06 | 600 | | | | |
| bright foil | 85 | | 0.04 | 20 | | | 6 to 62 | |
| | | | 0.05 | 40 | | | | |
| polished plate | 80 | | 0.095 | 100 | | | | |
| Stainless Steel | | | | | | | | |
| bright foil | 63 | | 0.05 | 30 | 17 | 870 | 25 | $72 |
| Chrome electro-plating | | | | | | | | |
| polished | 60 | | 0.08 | 40 | 6.2 | 427 | 0.5 | $430 |
| | | | 0.4 | 1100 | | | | |

However, even from single values for $\epsilon$ (commonly available up to 100° C.), we can extrapolate emissivity at higher Tabs to a first approximation for the next round of optical and thermal modeling. Costs are estimated in Table 3 relative to the baseline PTR70 coating, ranging from (–) slightly less expensive, to (++) substantially more expensive. Additional materials can be found in the reference by E. Kennedy and H. Price entitled "Progress in Development of High-Temperature Solar-Selective Coating," found in Solar Energy, vol. 2005, pp. 749-755, 2005 and hereby incorporated by reference in its entirety.

Traditional cermet structures address this issue by incorporating graded volume fractions of metal nanoparticles (~5-10 nm diameter) into ceramic layers in order to tune the refractive-index profile of the coating for matching of optical impedance in the solar spectrum. A graded-index cermet 3404 (also termed a graded cermet 3404) comprises multiple ceramic layers, with increasing volume fractions of small metal nanoparticles from top to bottom. This graded cermet 3404 is deposited upon a substrate 3408 and an infrared reflector 3406 ("IR Reflector"). Design

TABLE 4

Materials table for Absorber Coatings
Absorber Coatings

| Description | Solar Absorptivity $\alpha$ | Thermal Emissivity $\epsilon$ | at Temp. °C. | Figure of Merit $\alpha/\epsilon$ | Deposition | Relative Cost |
|---|---|---|---|---|---|---|
| SOA materials | | | | | | |
| Luz Black Chrome | 0.94 | 0.11 | 100 | 8.55 | electro-deposition | – |
| | | 0.27 | 400 | 3.48 | | |
| Luz Cermet | 0.92 | 0.08 | 100 | 11.50 | sputtering | |
| | | 0.15 | 400 | 6.13 | | |
| Solel UVAC Cermet | 0.955 | 0.076 | 100 | 12.57 | | |
| Sub-mm metallic dendrons in transparent matrix | | 0.14 | 400 | 6.82 | | |
| Siemens UVAC 2010 | 0.96 | 0.09 | 400 | 10.67 | | |

TABLE 4-continued

Materials table for Absorber Coatings
Absorber Coatings

| Description | Solar Absorptivity α | Thermal Emissivity ε | at Temp. ° C. | Figure of Merit α/ε | Deposition | Relative Cost |
|---|---|---|---|---|---|---|
| Siemens Al2O3 based cermet | 0.96 | 0.1 | 400 | 9.60 | | + |
| Siemens Mo—Al2O3 or W—Al2O3 | 0.96 | 0.16 | 350 | 6.00 | planar magnetron | + |
| ENEA-Italy HEMS08 coatings for molten-salt HTF | | | | | | |
| Mo/Mo—SiO2(HMVF)/Mo—SiO2(LMVF)/SiO2 | 0.94 | 0.13 | 580 | 7.23 | sputtering | + |
| graded W/W—Al2O3/Al2O3 | 0.93 | 0.1 | 400 | 9.30 | sputtering | + |
| | | 0.14 | 580 | 6.64 | | |
| SCHOTT PTR70 absorber coating | 0.95 | 0.1 | 400 | 9.50 | unknown | = |
| SCHOTT multilayer selective 7-layer coating | 0.955 | 0.1 | 100 | 9.55 | 2-source PVD | |
| Candidate materials | | | | | | |
| black chrome | 0.916 | 0.109 | 100 | 8.40 | | − |
| | | 0.22 | 400 | 4.16 | | |
| | | 0.239 | 450 | 3.83 | | |
| | | 0.257 | 500 | 3.56 | | |
| semiconductor-pigmented paint | | | | | | |
| Ge in silicone binder, on stainless steel substrate | 0.91 | 0.7 | 100 | 1.30 | painted | − |
| AMA multilayer coating, Al2O3—Mo—Al2O3 | 0.85 | 0.11 | 500 | 7.73 | vacuum evaporation | − |
| Titanium Nitride TiNOx on Cu substrate | 0.92 | 0.06 | 100 | 15.33 | evaporation (ARE) | |
| Double Mo—Al2O3 Cermet layer on Cu substrate | 0.96 | 0.08 | 350 | 12.00 | vacuum co-evaporation | + |
| Mo—SiO2 double layer cermet | 0.94 | 0.13 | 580 | 7.23 | sputtering | + |
| graded Pt—Al2O3 cermet on Pt coated fused quartz substrate | 0.94 | 0.08 | 150 | 11.75 | vacuum co-evaporation | ++ |
| graded Pt—Al2O3 cermet on quartz + SiOx AR top layer | 0.98 | 0.2 | 150 | 4.90 | vacuum co-evaporation | ++ |
| ZrOxNy single layer/tandem thin film absorber | 0.9 | 0.08 | 327 | 11.25 | sputtering | |
| Ti-based tandem absorber, TiAlN/TiAlON/Si3N4 | 0.93 | 0.15 | 82 | 6.20 | | |
| Nanoparticles embedded in dielectric matrix | 0.94 | 0.07 | 750 | 13.43 | | = |
| Sol-gel nano-structured absorber coating | | | | | | |
| Low-e surface coated with a high solar-absorptance, nano-pinnacle structured selective layer, Ni2Sn3 alloy | 0.96 | 0.15 | 100 | 6.40 | sol-gel | ++ |
| Nickel nanochains in Al2O3 cermet | 0.93 | 0.09 | 100 | 10.33 | solution-chemical-coating | − | optimization entails engineering the effective refractive index and film thickness of each layer. In these structures, film thicknesses are critical for optical performance, leading to stringent requirements on thickness control. Therefore, existing cermet fabrication techniques, such as sputtering, evaporation, and chemical vapor deposition, typically rely on vacuum. The relatively high cost and low throughput of these techniques limits cost reduction of CSP systems. Additionally, mid- to high-temperature selective solar absorbers that are stable in air remain a significant challenge because metal nanoparticles are typically easily oxidized in air. Currently, most CSP systems utilize vacuum tubes to avoid high-temperature oxidation; vacuum failure is a bottleneck for the lifetime of CSP systems.

FIG. 34B displays an illustration of a coating using a plasmonic nanochain cermet structure which can, in various embodiments, achieve high solar absorptance and low thermal emittance at low fabrication cost. The plasmonic nanochain cermet structure 3422 can be fabricated by cost-effective solution chemical methods. As an example, a new Ni nanochain-Al$_2$O$_3$ cermet is schematically shown in FIG. 34B. The Ni nanochains 3424 consist of Ni nanoparticles ~100 nm in diameter, an order of magnitude larger than nanoparticles in traditional cermets. The Ni nanochains 3424 are dispersed in a ceramic matrix 3426 such as SiO$_x$ upon a substrate 3428. This nanoparticle size is chosen such that absorption and scattering in the solar spectrum can be significantly enhanced by optical excitation of surface plasma polaritons in metal nanostructures. Experimentally this radius can be well controlled by the molar ratio of Ni$^{2+}$ to N$_2$H$_4$. Strong surface plasma polariton scattering from Au nanoparticles (50~100 nm in diameter) towards Si has been utilized to increase the photocurrent in Si photodiodes and improve the energy conversion efficiency in thin-film photovoltaic devices. A challenge for solar absorber applications, however, is that the plasmonic resonances in noble metals (like Au, Ag) are too narrow to cover the entire solar spectrum. For broadband plasmonic absorbers, Ag crossed gratings have been designed and fabricated by e-beam lithography. In contrast to noble metals, ferromagnetic metals such as Ni and Fe have a higher damping coefficient so that the surface plasma polariton resonance appears broader in spectrum. This feature is advantageous for solar thermal absorbers.

Figure 35:
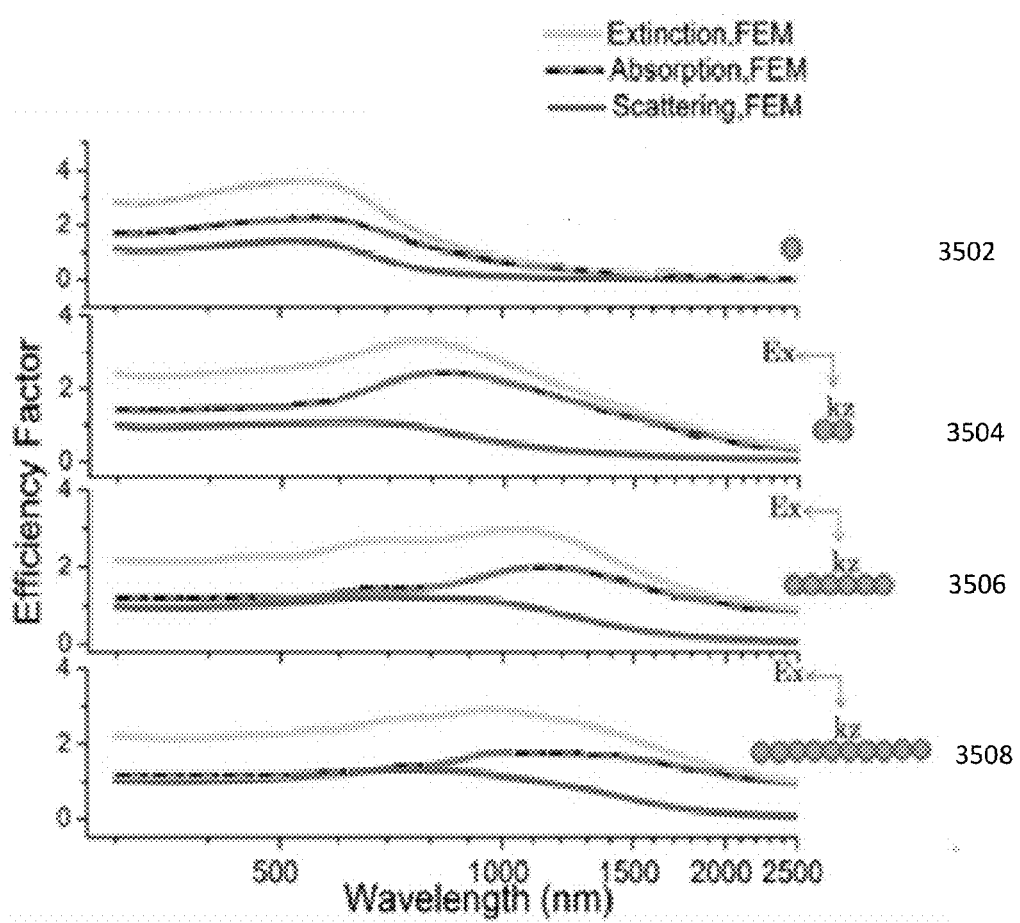
FIG. 35 is a graph of extinction, absorption, and scattering for optical absorbing layers that include nickel nanochains of various lengths.

FIG. 35 displays an illustrative plot for extinction, absorption, and scattering for various length nanochains using a plasmonic nanochain cermet structure which can, in various embodiments, achieve high solar absorptance and low thermal emittance at low fabrication cost. As illustrated in FIG. 35, the optical response (wavelength dependent extinction, absorption, and scattering) can be optimized by tailoring the length of Ni nanochains. A plot of efficiency factor versus optical wavelength is displayed for a single nanosphere 3502, a 2-nanosphere chain 3504, a 6-nanosphere chain 35, and a 10-nanosphere chain 3508. Nanosphere diameter is 80 nm. Efficiency factors presented here are absorption/scattering/extinction cross-sections normalized by geometric area of the nanostructures. Incident light is polarized along nanochain. For incident light polarized along the nanochain (x-polarization), the optical response spectrum can be extended from λ~1000 nm to λ~2500 nm by varying the length of the nanochain, covering >99% of optical energy in the solar spectrum. The optical field is found to be strongly enhanced at the narrow gaps between nanospheres due to near-field plasmonic effect, an advantage over nanorod structures in terms of surface plasma polariton enhancement. A 6-nanosphere chain 3506 shows a stronger field enhancement than the 2-nanosphere one 3504 at λ=2500 nm, confirming that the increase in absorption at longer wavelengths (λ>2000 nm) is indeed related to the surface plasma polariton effect. On the other hand, the ~100 nm diameter Ni nanoparticles are small enough that long-wavelength MIR photons from thermal radiation cannot resolve them. Consequently, these MIR photons see the Ni nanochain network as a continuous metal sheet and are reflected back to the CSP system, minimizing thermal emittance losses. Optical performance is inherently determined by the structure of plasmonic Ni nanochains instead of layer thicknesses, greatly facilitating low-cost, solution-chemical processing.

Antioxidation behavior may be achieved at >500° C. by the use of a Si-rich ceramic matrix such as $SiO_x$ (x=1.5-1.9) for two reasons: (1) it is possible to form metal-silicon bonds similar to those in silicide materials that shows much better thermal stability than metals. (2) the $SiO_x$ matrix provides a high refractive index contrast to the Ni nanoparticles, which enhances the plasmonic scattering effect for better optical performance. Antioxidation behavior at 500 C has been demonstrated in air.

Figure 36:
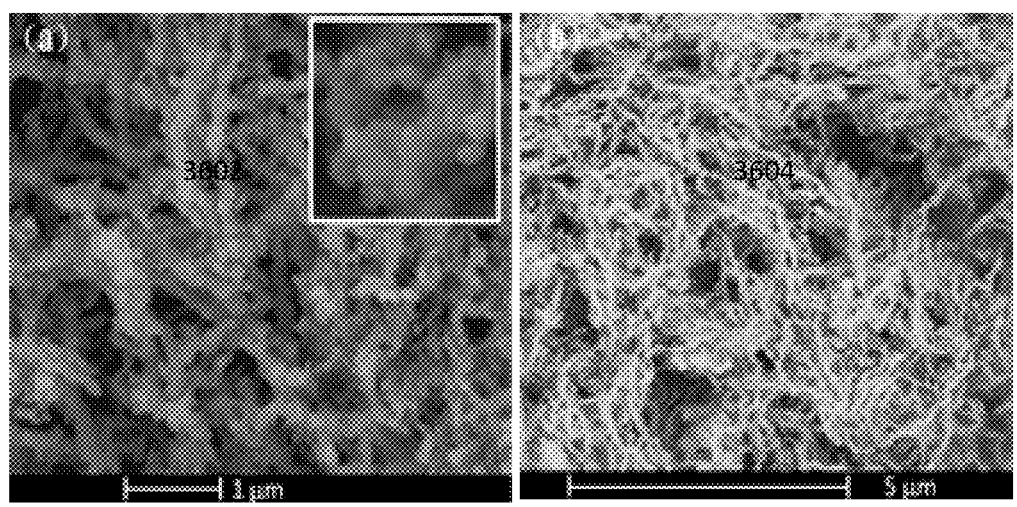
FIG. 36 is a pair of photomicrographs showing exemplary nickel nanochain compounds.

FIG. 36 shows scanning electron microscopy images of example Ni nanochains as synthesized 3602 and in a coating JJ04. The Ni nanochains are coated and annealed as a Ni—$Al_2O_3$ composite at an annealing temperature of 400° C. in $N_2$. In their preliminary studies, the Jifeng Liu Group at $_D$artmouth has demonstrated spectrally selective plasmonic Ni nanochain cermet structures created using solution-chemical fabrication. The Ni nanochains form a 3D network as shown in FIG. 36, which offers stronger overall solar absorption due to multiple scatterings. Since the nanochains are randomly oriented, the spectral response becomes polarization independent.

Figure 37:
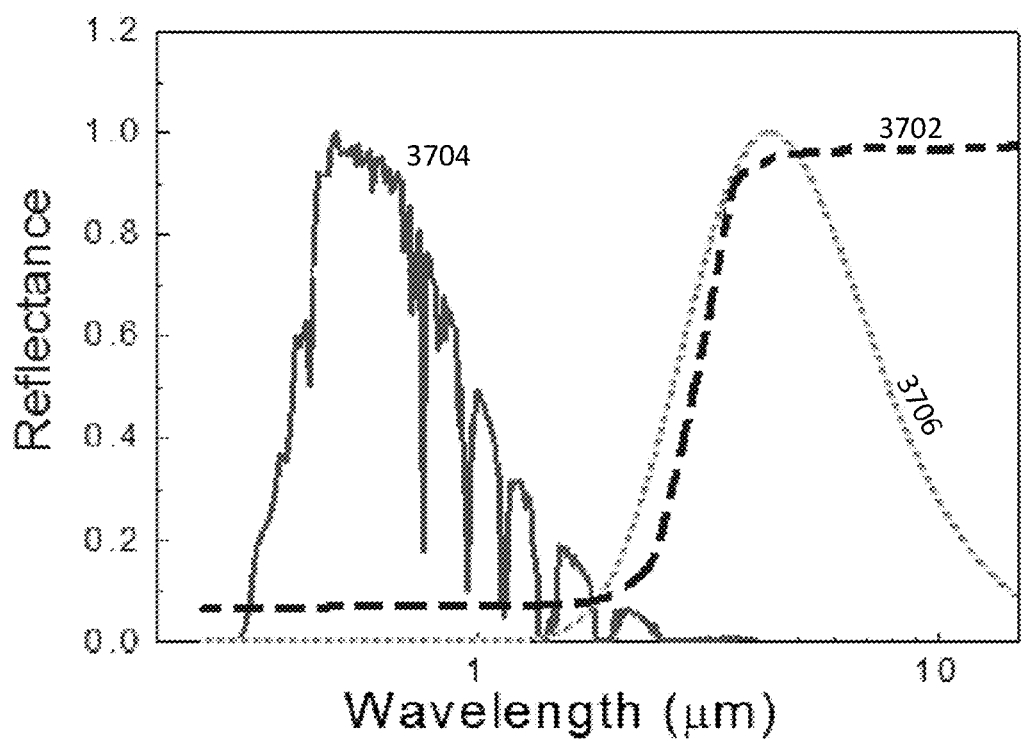
FIG. 37 is a graph of the reflectance of a plasmonic nanochain cermet structure.

FIG. 37 displays a$_n$ $_l$llustrative plot for reflectance for a plasmonic nano$_c$hain cermet structure which can, in various embodiments, achieve high solar absorptance and low thermal emittance at low fabrication cost. FIG. 37 shows the reflectance as a function of wav$^{el}$ength for a plasmonic nanochain cermet structure 3702. Also plotted are the normalized AM 1.5 solar spectrum 3704 and normalized 400 C blackbody radiation spectrum. Based on the reflectance spectrum 3702, the Ni nanochain-$Al_2O_3$ cermet structure spin-coated on stainless steel substrate demonstrates a high overall solar absorptance of 93% and an overall thermal emittance of 9%. This optical performance is comparable to vacuum deposited multilayer cermets while the fabrication process is much less expensive. The performance can be further optimized by fine tuning the nanoparticle sizes to better match the solar spectrum and/or using lower refractive index material such as $SiO_2$ instead of $Al_2O_3$.

Figure 38A:
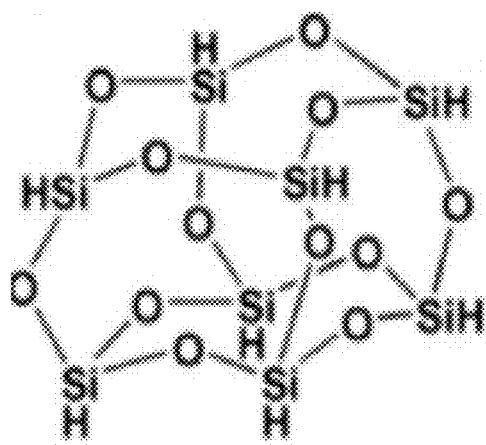
FIG. 38A and FIG. 38B are, respectively, a schematic drawing of the molecular structure of hydrogen silsesquioxane and a graph of X-ray diffraction intensity of hydrogen silsesquioxane as a function of time.
Figure 38B:
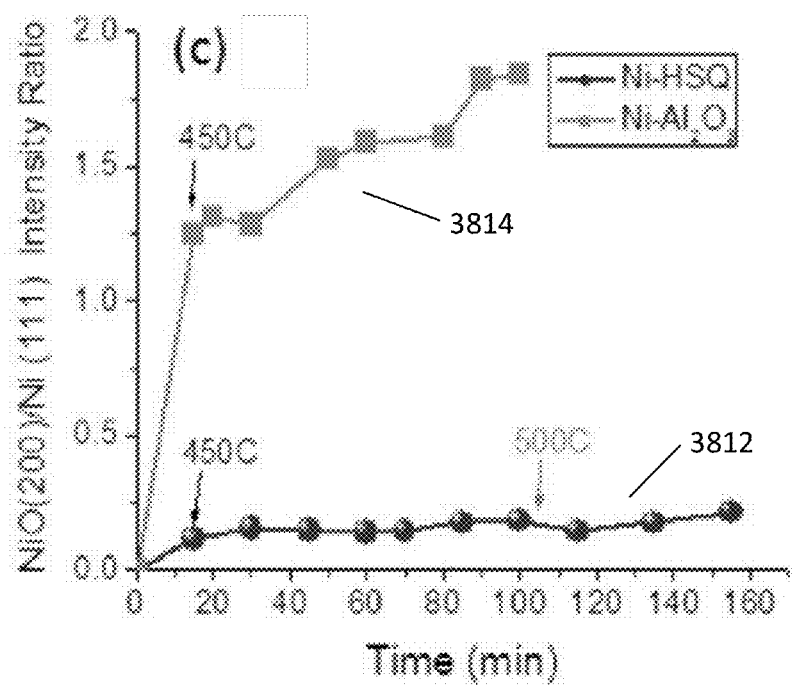

FIG. 38A shows the molecular structure of hydrogen silsesquioxane; FIG. 38B shows a plot showing x-ray diffraction peak intensity ratio data. The Liu Group has also studied the passivation of metal nanochains using new ceramic matrix materials to prevent oxidation of these nanostructures at high temperatures (>500° C.) in air. Preliminary studies tested hydrogen silsesquioxane (HSQ). The molecular structure 3802 of HSQ is shown FIG. 38A. HSQ has also been applied as a molecular precursor to form Si—$SiO_2$ nanocomposite at an annealing temperature of >1000° C. to achieve interesting light-emission properties. A Si-rich matrix could lead to the formation of metal-silicon bonds similar to those in silicide materials that shows much better thermal stability than metals. The Ni nanochains were ultrasonically dispersed in to HSQ solutions, spin-coated on stainless steel substrates, and annealed at 700° C. in $N_2$ to form the cermet coating. In sharp contrast to Ni nanochain in $Al_2O_3$ matrix, which significantly oxidizes after annealing at 450° C. for 15 min in air, X-ray diffraction analysis show that the Ni nanochains in HSQ matrix had little oxidation even after annealing at 450° C. for 2 h in air. As shown in FIG. 38B, the ratio of NiO(200) to Ni(111) peak intensity in X-ray diffraction analysis is an order of magnitude lower in HSQ (curve 3812, circular markers) compared to $Al_2O_3$ matrix (curve 3814, square markers). The Ni nanochain-HSQ cermet coating was further annealed at 500° C. for an additional hour, and this ratio remained the same, indicating no further oxidation even at 500° C. This is a significant improvement compared to Ni nanochains embedded in $Al_2O_3$ matrix, and offers the promise that oxidation resistance at >550° C. can be achieved with process optimization. In an embodiment of the invention, oxidation resistance may be further improved through the insertion (or flow) of an inert gas through the aperture into the cavity to improve environmental conditions (i.e. displace water).

Embodiments of the invention that use such a solar selective coating that does not degrade or oxidize during high temperature operation within allows substantial improvements in performance and cost of trough-based concentrating solar plants.

It is expected that Norwich Technologies Inc. receiver will be not only more reliable and higher performing than existing receivers, but also less expensive. The objective of lower cost is realized by the Norwich Technologies designs shown herein (e.g., FIG. 4, FIG. 7, FIG. 11) as they eliminates the vacuum requirement, removes the thick outer glass shell, and employs simpler coatings. The elimination of the vacuum reduces not only manufacturing costs (e.g., vacuum, bellows, and getters) but also maintenance and operation costs (e.g., identifying and replacing vacuum failures, avoiding most cases of glass breakage, and routine getter maintenance).

Figure 39:
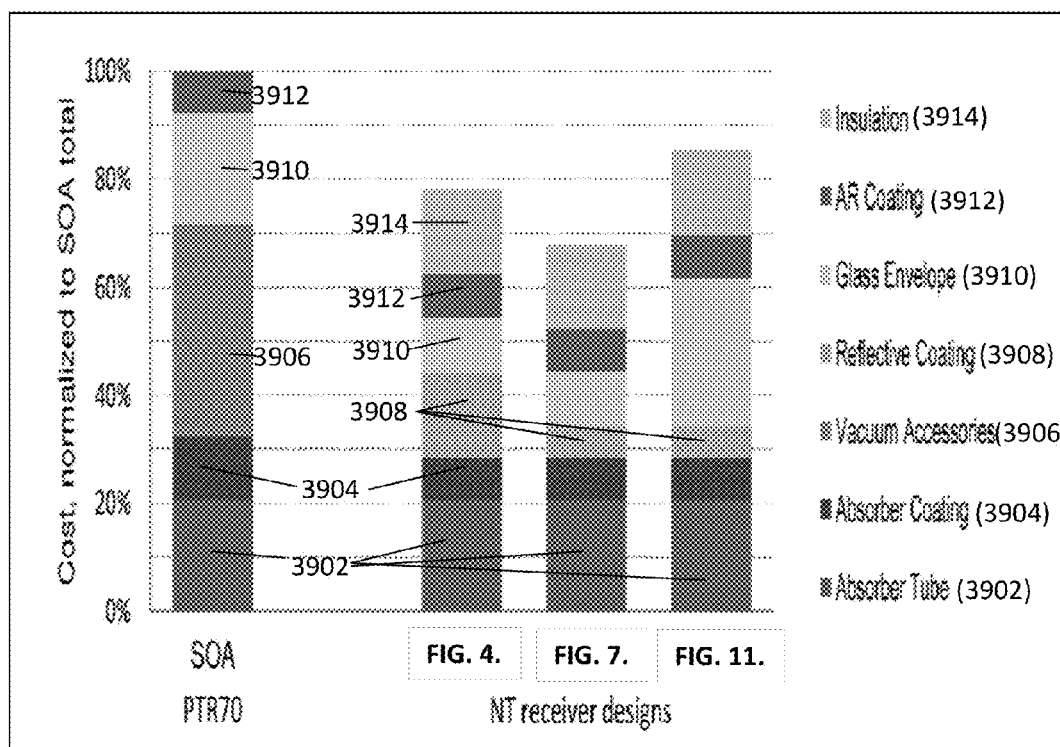
FIG. 39 is a graph of estimated component costs of some embodiments of the invention compared to costs for the state of the art.

FIG. 39 illustrates in graphical form the results of an analysis relative to the SOA. The estimated cost breakdowns are broken into categories and prices normalized to the total cost of the SOA Schott PTR70 receiver. Cost breakdown categories include absorber tube 3902, absorber coating 3904, vacuum accessories 3906, reflective coating 3908, glass envelope 3910, anti-reflective coating 3912, and insulation 3914. NT designs are shown based on designs shown in early figures including FIG. numbers (FIG. 4, FIG. 7, FIG. 11).

Definitions

As used herein, the term "light" includes but is not restricted to the visible portion of the electromagnetic spectrum.

As used herein, the terms "pipe," "piping" and the like refer to one or more conduits that are rated to carry gas or liquid between two points. Thus, the singular term should be taken to include a plurality of parallel conduits where appropriate.

Recording the results from an operation or data acquisition, such as for example, recording results at a particular frequency or wavelength, is understood to mean and is defined herein as writing output data in a non-transitory manner to a storage element, to a machine-readable storage medium, or to a storage device. Non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. Unless otherwise explicitly recited, any reference herein to "record" or "recording" is understood to refer to a non-transitory record or a non-transitory recording.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use, so that the result can be displayed, recorded to a non-volatile memory, or used in further data processing or analysis.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A linear solar receiver for use in a concentrating solar power system, said receiver comprising:

a solar radiation absorbing element having an outer surface configured to circumscribe an interior volume, said interior volume designed to contain a heat transfer medium, said solar radiation absorbing element designed to absorb an incident flux of solar radiation and transfer an absorbed flux of energy to said heat transfer medium, said heat transfer medium designed to receive and transport at least a portion of said absorbed flux of energy, said heat transfer medium when transporting at least a portion of said absorbed flux of energy being primarily in a fluid phase;

a solar selective absorber located on a first portion of said outer surface of said solar radiation absorbing element, said solar selective absorber having a thermal emittance value and an optical absorptance value, said optical absorptance value being different from said thermal emittance value, said solar selective absorber being exposed to ambient atmospheric pressure;

a substantially opaque thermally insulating jacket, said substantially opaque thermally insulating jacket in contact with a second portion of said outer surface of said solar radiation absorbing element; and a solar radiation admitting region having an interior surface, at least a portion of said solar radiation admitting region being surrounded by at least a portion of said substantially opaque thermally insulating jacket, said solar radiation admitting region designed to allow transmission of at least a portion of said incident flux of solar radiation to be incident on said solar selective absorber, wherein said receiver is designed to be located symmetrically between outer edges of a solar mirror collector system such that at least a portion of said receiver shades at least a portion of said solar mirror collector from incident solar radiation;

said linear solar receiver having a thermal efficiency and an optical efficiency such that increasing said thermal efficiency by increasing a thickness of said substantially opaque thermally insulating jacket decreases said optical efficiency due to increased shading of said collector by said receiver.

2. The linear solar receiver according to claim 1, wherein solar radiation absorbing element, substantially opaque thermally insulating jacket, and said solar radiation admitting region are symmetric with respect to a bisecting plane that is parallel to an axis of the linear solar receiver.

3. The linear solar receiver of claim 1, wherein said first portion of said outer surface of said solar radiation absorbing element is substantially planar.

4. The linear solar receiver of claim 1, wherein said first portion of said outer surface of said solar radiation absorbing element comprises a fraction in the range of 0.50 to 0.20 of an area of said outer surface of said solar radiation absorbing element determined on a per unit length basis.

5. The linear solar receiver of claim 1 further comprising a glass cover enclosing the solar radiation admitting region.

6. The linear solar receiver of claim 5 wherein an inert gas is introduced into the radiation admitting region.

7. The linear solar receiver of claim 1, wherein said interior surface of said solar radiation admitting region forms a compound parabolic collector.

8. The linear solar receiver of claim 1, wherein said interior surface of said solar radiation admitting region is a reflective surface.

9. The linear solar receiver of claim 1, wherein said heat transfer medium is selected from the group consisting of a molten solar salt, a molecular silicone based fluid, and steam.

10. The linear solar receiver of claim 1, wherein said linear receiver has a thermal efficiency, said thermal efficiency selected from the group consisting of 94 percent at 450 degrees Celsius, 92 percent at 500 degrees Celsius, 89 percent at 550 degrees Celsius, 85 percent at 600 degrees Celsius, and 80 percent at 650 degrees Celsius.

11. The linear solar receiver of claim 1, in combination with an energy collection system configured to operate a Carnot cycle energy recovery machine.

12. The linear solar receiver of claim 1, in combination with a plurality of linear solar receivers, said linear solar receivers each including at least solar radiation absorbing elements, adjacent solar radiation absorbing elements forming a nearly continuous absorbing surface.

13. The linear solar receiver of claim 1 in combination with a plurality of linear solar receivers, a first one of said plurality of receivers operating at a first temperature and a second one of said plurality of receivers operating at a second temperature, said first receiver and said second of said plurality of receivers having different designs, said first and said second temperatures being different.

14. The linear solar receiver of claim 1, further comprising a symmetric parabolic trough collector mirror structure having a rim angle of less than 75 degrees, said symmetric parabolic trough collector mirror structure focusing said incident flux of solar radiation on said solar radiation absorbing element, said linear solar receiver disposed between said symmetric parabolic trough collector mirror structure and the sun.

15. The linear solar receiver of claim 1, further comprising a symmetric parabolic trough collector mirror structure, said symmetric parabolic trough collector mirror structure being held in a substantially rigid form with cable suspension.

16. The linear solar receiver of claim 1, wherein at least a portion of said absorbed flux of absorbed energy is used to perform an action chosen from the group consisting of generating electricity and completing an industrial process.

17. The linear solar receiver of claim 1, wherein said solar selective absorber is a plasmonic nanochain cermet structure.

* * * * *